US012766694B2

(12) United States Patent
Marsh et al.

(10) Patent No.: US 12,766,694 B2
(45) Date of Patent: Oct. 20, 2026

(54) POWER TOOL WITH INTEGRATED DEPTH STOP

(71) Applicant: MILWAUKEE ELECTRIC TOOL CORPORATION, Brookfield, WI (US)

(72) Inventors: Julia C. Marsh, Milwaukee, WI (US); Jeffery D. Spraggon, Milwaukee, WI (US); Joy A. Sodon, Wauwatosa, WI (US); Adam N. Carter, Wales, WI (US); Brittany A. Sellnow, Milwaukee, WI (US); Olivia M. Duero, Wauwatosa, WI (US); Allison J. Widzinski, Round Hill, VA (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/192,737

(22) Filed: Apr. 29, 2025

(65) Prior Publication Data

US 2025/0256387 A1 Aug. 14, 2025

Related U.S. Application Data

(63) Continuation of application No. 18/341,572, filed on Jun. 26, 2023, now Pat. No. 12,296,456, which is a continuation-in-part of application No. 17/711,834, filed on Apr. 1, 2022, now Pat. No. 11,872,665.

(60) Provisional application No. 63/355,475, filed on Jun. 24, 2022, provisional application No. 63/211,856, filed on Jun. 17, 2021, provisional application No. 63/169,611, filed on Apr. 1, 2021.

(51) Int. Cl.

| | |
|---|---|
| ***B25F 5/02*** | (2006.01) |
| ***B23Q 11/00*** | (2006.01) |

(52) U.S. Cl.
CPC .......... *B25F 5/026* (2013.01); *B23Q 11/0046* (2013.01)

(58) Field of Classification Search
CPC ............................ B23Q 11/0046; B25F 5/026
See application file for complete search history.

(56) References Cited

U.S. PATENT DOCUMENTS

| | | | |
|---|---|---|---|
| 1,969,318 | A | 8/1934 | Myers |
| 1,983,277 | A | 12/1934 | Emmons |
| 2,122,517 | A | 7/1938 | Curtis |
| 2,250,670 | A | 7/1941 | Joy |
| 3,339,435 | A | 9/1967 | Walter-Helmut |
| 3,511,322 | A | 5/1970 | Bixby et al. |
| 3,535,829 | A | 10/1970 | Dudek |
| 3,638,737 | A | 2/1972 | Moates |
| 4,097,176 | A | 6/1978 | Wanner et al. |

(Continued)

FOREIGN PATENT DOCUMENTS

| | | | |
|---|---|---|---|
| CN | 2917926 | Y | 7/2007 |
| CN | 101733737 | A | 6/2010 |

(Continued)

OTHER PUBLICATIONS

International Search Report and Written Opinion for Application No. PCT/US2022/023124 dated Jul. 25, 2022 (10 pages).

*Primary Examiner* — Eyamindae C Jallow
(74) *Attorney, Agent, or Firm* — Quarles & Brady LLP

(57) ABSTRACT

A power tool includes a housing and a guide rail fixed to the housing. A slide is moveable along the guide rail and a stop is lockable at a plurality of positions along the guide rail to limit movement of the slide along the guide rail.

20 Claims, 78 Drawing Sheets

(56) References Cited

U.S. PATENT DOCUMENTS

| | | | | |
|---|---|---|---|---|
| 4,192,390 | A | 3/1980 | Wanner et al. | |
| 4,209,069 | A | 6/1980 | Smith | |
| 4,921,375 | A | 5/1990 | Famulari | |
| 5,006,740 | A | 4/1991 | Palm | |
| 5,129,467 | A | 7/1992 | Watanabe et al. | |
| 5,199,220 | A | 4/1993 | Steiner et al. | |
| 5,688,082 | A | 11/1997 | Richardson | |
| 5,904,453 | A | 5/1999 | Gavia | |
| 6,295,953 | B1 | 10/2001 | Ohsawa et al. | |
| 6,793,568 | B2 | 9/2004 | Dotta | |
| 6,848,985 | B2 | 2/2005 | Lamprecht et al. | |
| 7,178,248 | B2 | 2/2007 | Richards | |
| 7,182,150 | B2 | 2/2007 | Grossman | |
| 7,235,006 | B2 | 6/2007 | Ikeda et al. | |
| 7,322,429 | B2 | 1/2008 | Kim | |
| 7,354,226 | B2 | 4/2008 | Britz | |
| 7,425,109 | B2 | 9/2008 | Simm et al. | |
| 7,510,356 | B2 | 3/2009 | Colon | |
| 7,740,086 | B2 | 6/2010 | Bleicher et al. | |
| 7,797,794 | B2 | 9/2010 | Bleicher et al. | |
| 7,901,164 | B2 | 3/2011 | Skradski et al. | |
| 8,152,602 | B2 | 4/2012 | Guth | |
| 8,186,453 | B2 | 5/2012 | Furusawa et al. | |
| 8,337,124 | B2 | 12/2012 | Nguyen | |
| 8,342,782 | B2 | 1/2013 | Nishikawa et al. | |
| 8,529,169 | B2 | 9/2013 | Nishikawa et al. | |
| 8,636,084 | B2 | 1/2014 | Ohlendorf | |
| 8,800,682 | B2 | 8/2014 | Walker | |
| 8,967,922 | B2 | 3/2015 | Yoshikane et al. | |
| 8,978,781 | B2 | 3/2015 | Burdick et al. | |
| 9,022,702 | B2 | 5/2015 | Kasuya et al. | |
| 9,296,079 | B2 | 3/2016 | Miwa et al. | |
| 9,393,658 | B2 | 7/2016 | Walker et al. | |
| 9,505,095 | B2* | 11/2016 | Machida ............ | B23Q 11/0046 |
| 9,579,762 | B2 | 2/2017 | Sullivan | |
| 9,956,659 | B2 | 5/2018 | Takeuchi et al. | |
| 9,981,360 | B2 | 5/2018 | Roeck et al. | |
| 9,999,967 | B2 | 6/2018 | Furusawa et al. | |
| 10,005,163 | B2 | 6/2018 | Johnson et al. | |
| 10,238,252 | B2 | 3/2019 | Buczek | |
| 10,328,541 | B2 | 6/2019 | Wong et al. | |
| 10,357,862 | B2 | 7/2019 | Arthur | |
| 10,507,557 | B2 | 12/2019 | Meiser et al. | |
| 10,596,693 | B2 | 3/2020 | Vasudeva | |
| 10,603,753 | B2 | 3/2020 | Lauer | |
| 10,639,758 | B2 | 5/2020 | Le et al. | |
| 10,744,609 | B2* | 8/2020 | Tada .................. | B23Q 11/0071 |
| 10,759,013 | B2 | 9/2020 | Arthur et al. | |
| 10,780,541 | B2 | 9/2020 | Arthur et al. | |
| 10,857,643 | B2 | 12/2020 | Cacchiotti et al. | |
| 10,864,609 | B2 | 12/2020 | Mori et al. | |
| 10,882,153 | B2 | 1/2021 | Arthur et al. | |
| 11,419,466 | B2* | 8/2022 | Johnson, III .......... | A47L 9/2842 |
| 12,459,069 | B2* | 11/2025 | Schlegel ................ | B25D 17/20 |
| 2001/0052429 | A1* | 12/2001 | Frenzel .............. | B23Q 11/0046<br>175/220 |
| 2002/0145724 | A1* | 10/2002 | Wursch ................ | B25H 1/0092<br>356/152.2 |
| 2002/0154960 | A1 | 10/2002 | Lin | |
| 2004/0020671 | A1 | 2/2004 | Lamprecht | |
| 2008/0202781 | A1 | 8/2008 | Nishikawa et al. | |
| 2011/0226502 | A1 | 9/2011 | Bito et al. | |
| 2011/0266015 | A1 | 11/2011 | Ohlendorf et al. | |
| 2011/0308830 | A1 | 12/2011 | Furusawa et al. | |
| 2012/0043101 | A1 | 2/2012 | Ishikawa et al. | |
| 2012/0063856 | A1 | 3/2012 | Miwa et al. | |
| 2012/0298391 | A1 | 11/2012 | Kakiuchi et al. | |
| 2012/0318553 | A1 | 12/2012 | Chen et al. | |
| 2013/0094915 | A1 | 4/2013 | Chen | |
| 2013/0213681 | A1 | 8/2013 | Ikuta | |
| 2013/0213683 | A1* | 8/2013 | Brewster ................. | B25F 5/026<br>173/198 |
| 2014/0138114 | A1 | 5/2014 | Takeuchi | |
| 2014/0251649 | A1 | 9/2014 | Kondo | |
| 2014/0251650 | A1 | 9/2014 | Kondo | |
| 2016/0001433 | A1 | 1/2016 | Furusawa et al. | |
| 2017/0066095 | A1 | 3/2017 | Chen | |
| 2018/0085873 | A1 | 3/2018 | Rompel et al. | |
| 2019/0091819 | A1* | 3/2019 | Mori .................. | B23Q 11/0046 |
| 2019/0168348 | A1 | 6/2019 | Wong et al. | |
| 2019/0193224 | A1* | 6/2019 | Furusawa ............... | B25F 5/003 |
| 2019/0193225 | A1 | 6/2019 | Beeson et al. | |
| 2019/0223669 | A1 | 7/2019 | Lauer et al. | |
| 2019/0291226 | A1 | 9/2019 | Tada | |
| 2019/0381618 | A1 | 12/2019 | Furusawa | |
| 2020/0077852 | A1 | 3/2020 | Bayha et al. | |
| 2020/0078922 | A1 | 3/2020 | Petrovic | |
| 2020/0156199 | A1* | 5/2020 | Richards ............... | A47L 9/1409 |
| 2020/0305665 | A1 | 10/2020 | Yoshikane et al. | |
| 2020/0361047 | A1 | 11/2020 | Arthur et al. | |
| 2021/0016405 | A1 | 1/2021 | Mori et al. | |
| 2021/0101289 | A1 | 4/2021 | Naderer | |
| 2021/0178568 | A1 | 6/2021 | Machida et al. | |
| 2021/0362292 | A1 | 11/2021 | Naderer | |
| 2022/0111476 | A1 | 4/2022 | Beeson et al. | |

FOREIGN PATENT DOCUMENTS

| | | | |
|---|---|---|---|
| CN | 201669686 | U | 12/2010 |
| CN | 102601416 | A | 7/2012 |
| CN | 101130242 | B | 8/2012 |
| CN | 103085036 | A | 5/2013 |
| CN | 203863532 | U | 10/2014 |
| CN | 203875855 | U | 10/2014 |
| CN | 104249171 | A | 12/2014 |
| CN | 105058328 | A | 11/2015 |
| CN | 104015127 | B | 5/2016 |
| CN | 104029127 | B | 8/2016 |
| CN | 205799418 | U | 12/2016 |
| CN | 106625438 | A | 5/2017 |
| CN | 107214595 | A | 9/2017 |
| CN | 107520815 | A | 12/2017 |
| CN | 108161844 | A | 6/2018 |
| CN | 108340321 | A | 7/2018 |
| CN | 207997288 | U | 10/2018 |
| CN | 109571374 | A | 4/2019 |
| CN | 109909955 | A | 6/2019 |
| CN | 208992640 | U | 6/2019 |
| CN | 209078678 | U | 7/2019 |
| CN | 110695411 | A | 1/2020 |
| CN | 112208001 | A | 1/2021 |
| CN | 213165204 | U | 5/2021 |
| CN | 213673417 | U | 7/2021 |
| CN | 215395050 | U | 1/2022 |
| DE | 2240346 | A1 | 2/1974 |
| DE | 2453791 | A1 | 5/1976 |
| DE | 2606122 | A1 | 8/1977 |
| DE | 3113913 | A1 | 10/1982 |
| DE | 8234786 | U1 | 1/1984 |
| DE | 3229183 | A1 | 2/1984 |
| DE | 2940362 | C2 | 11/1985 |
| DE | 3605204 | A1 | 8/1987 |
| DE | 4139603 | A1 | 6/1993 |
| DE | 9418453 | U1 | 1/1995 |
| DE | 4342484 | A1 | 4/1995 |
| DE | 19702053 | A1 | 7/1998 |
| DE | 10223072 | A1 | 5/2004 |
| DE | 19603528 | B4 | 1/2005 |
| DE | 102004045625 | A1 | 4/2006 |
| DE | 202007010514 | U1 | 10/2007 |
| DE | 102006039969 | A1 | 2/2008 |
| DE | 102007019704 | A1 | 11/2008 |
| DE | 102009054969 | A1 | 6/2011 |
| DE | 102012200543 | A1 | 7/2013 |
| DE | 102019102360 | A1 | 8/2019 |
| EP | 0296711 | A1 | 12/1988 |
| EP | 0558994 | B1 | 11/1995 |
| EP | 0548782 | B1 | 4/1997 |
| EP | 0855244 | B1 | 1/2003 |
| EP | 1714735 | B1 | 10/2007 |
| EP | 1627705 | B1 | 12/2007 |
| EP | 1923173 | B1 | 5/2009 |
| EP | 1842612 | B1 | 3/2010 |
| EP | 2253430 | B1 | 11/2011 |

(56) References Cited

FOREIGN PATENT DOCUMENTS

| | | | |
|---|---|---|---|
| EP | 2196284 | B1 | 1/2012 |
| EP | 2390053 | B1 | 7/2015 |
| JP | 2008207360 | A | 9/2008 |
| WO | WO9520440 | A1 | 8/1995 |
| WO | WO2005025792 | A1 | 3/2005 |
| WO | WO2010035395 | A1 | 4/2010 |
| WO | WO2013161444 | A1 | 10/2013 |
| WO | WO2014067497 | A2 | 5/2014 |
| WO | 2017/002518 | A1 | 1/2018 |
| WO | WO2019104603 | A1 | 6/2019 |

* cited by examiner

POWER TOOL WITH INTEGRATED DEPTH STOP

CROSS-REFERENCE TO RELATED APPLICATIONS

This application claims priority to U.S. Provisional Patent Application No. 63/169,611, filed on Apr. 1, 2021, to U.S. Provisional Patent Application No. 63/211,856, filed on Jun. 17, 2021, to U.S. Provisional Patent Application No. 63/355,475 filed on Jun. 24, 2022, to U.S. Non-provisional patent application Ser. No. 17/711,834, filed on Apr. 1, 2022, and to U.S. Non-provisional patent application Ser. No. 18/341,572, filed on Jun. 26, 2023, the entire content of each of which is incorporated herein by reference.

FIELD OF THE INVENTION

The present disclosure relates to power tools, and more particularly to dust collection assemblies for use with power tools.

BACKGROUND

Dust collection assemblies are typically used in tandem with hand-held drilling tools, such as rotary hammers, to collect dust and other debris during a drilling operation preventing dust and other debris from accumulating at a worksite. Such dust collection assemblies may be attached to a rotary hammer to position a suction inlet of the collector proximate a drill bit attached to the rotary hammer. Such dust collection assemblies may also include an on-board dust container in which dust and other debris is accumulated. Such dust containers are often removable from the dust collection assembly to facilitate disposal of the accumulated dust and debris.

SUMMARY

According to one aspect of the present disclosure, a power tool can include a housing, a guide rail fixed to the housing, a slide that is moveable along the guide rail, and a stop that is lockable at a plurality of positions along the guide rail to limit movement of the slide along the guide rail.

In some examples, the guide rail can be positioned within a channel formed in the housing.

In some examples, the guide rail can be formed as a single piece with the housing.

In some examples, the stop can include a first nut that is received in the channel and a second nut that is screwed to the first nut and can be tightened to lock the stop at a desired position and loosened to allow the stop to be moved along the guide rail.

In some examples, the first nut can be a T-nut and the second nut can be a thumb nut.

In some examples, the stop can further include a spacer between the first nut and the second nut.

In some examples, the spacer can include an alignment extrusion that is received in an alignment notch defined in the first nut.

In some examples, the guide rail can be positioned between the spacer and the first nut so that loosening the second nut increases a space between the spacer and the first nut to reduce friction on the guide rail.

In some examples, an end of the slide that engages the guide rail can include a flange.

In some examples, the slide can be coupled to move with a dust collection assembly that is attachable to the housing.

In some examples, the dust collection assembly can include a coupler configured to couple to the housing, an end cap that is coupled to the slide, and a dust tube that is collapsible between the coupler and the end cap.

In some examples, the coupler can include a first locking member and the end cap can include a second locking member that engages the first locking member to selectively lock the dust tube in a collapsed configuration.

According to another aspect of the present disclosure, a rotary hammer can include a housing defining a channel in an external surface of the housing, a chuck supported on and rotatable relative to the housing, a slide that is moveable within the channel, and a stop that is lockable at a plurality of positions along the channel to limit movement of the slide along the channel.

In some examples, the rotary hammer can further include a handle coupled to the housing opposite the chuck, wherein the channel can extend from the chuck to the handle in parallel with a rotational axis of the chuck.

In some examples, the rotary hammer can further include a dust container positioned along a bottom end of the housing, wherein the channel can be positioned along a top end of the housing that is opposite the bottom end of the housing.

In some examples, the dust container can be coupled directly to the housing.

According to yet another aspect of the present disclosure, a method of using a depth stop assembly of a power tool can include loosening a depth stop that is at a first position along a channel that is formed in an exterior surface of a housing of the power tool, moving the depth stop to a second position along the channel that is spaced away from the first position, tightening the depth stop to lock the depth stop at the second position, and moving a slide along the channel toward the depth stop, the depth stop preventing further movement of the slide when the slide contacts the depth stop.

In some examples, loosening the depth stop can include turning a thumb nut that is screwed to a T-nut to reduce friction between a spacer and a guide rail that is positioned within the channel.

In some examples, the method can further include attaching a dust collection assembly over a chuck that is rotatable relative to the housing, and inserting the slide into an open end of the channel that faces the chuck.

In some examples, the second position can be at a closed end of the channel that is opposite the open end of the channel, and the method can further include locking the dust collection assembly in a collapsed configuration, and moving the slide to a fully-inserted position within the channel.

Other features and aspects of the disclosure will become apparent by consideration of the following detailed description and accompanying drawings.

Figure 1:
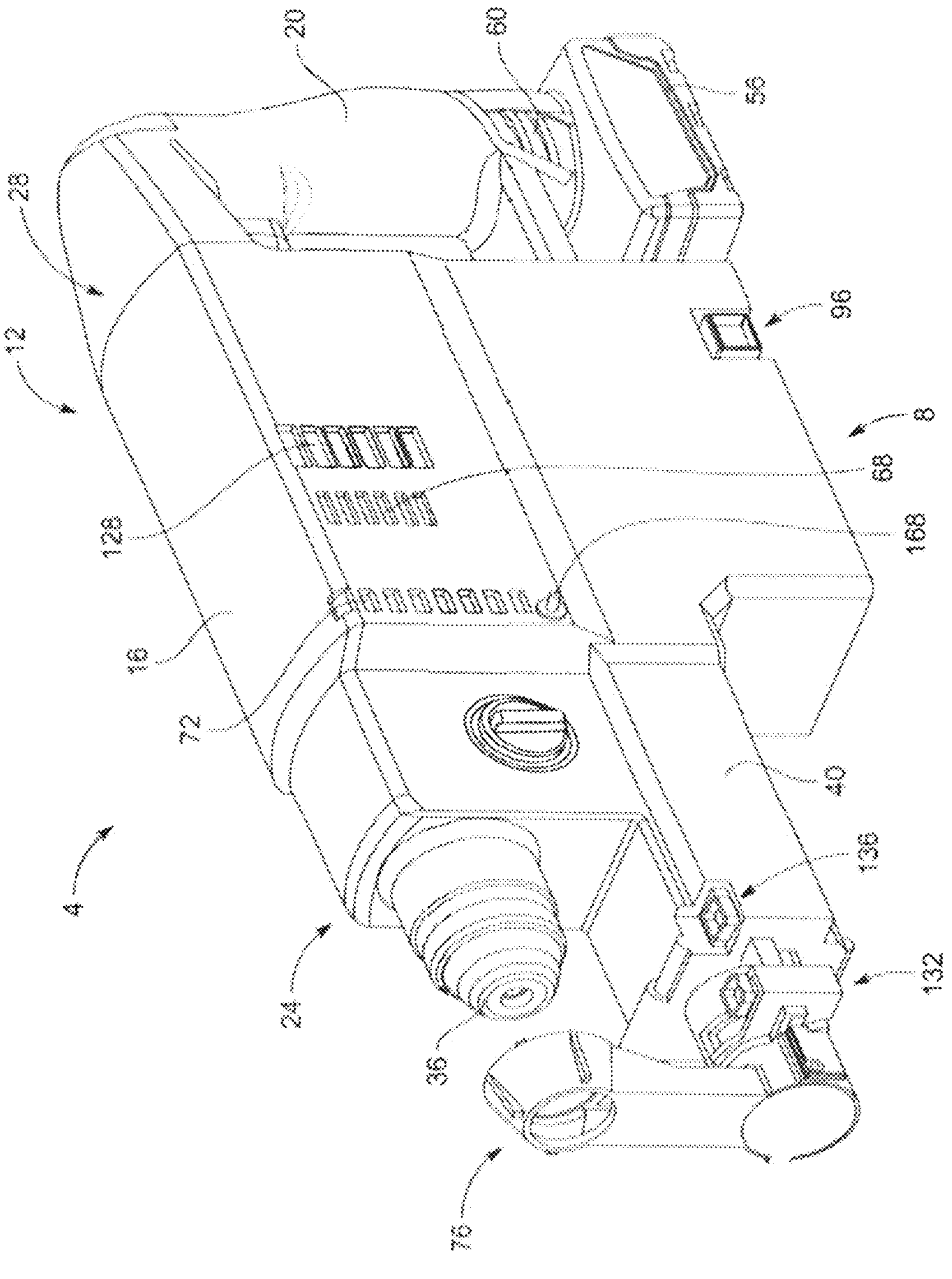
FIG. 1 is a front perspective view of a rotary hammer including an integrated dust collection assembly according to one embodiment.

Before any embodiments of the disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. Also, it is to be understood that the phraseology and terminology used herein is for the purpose of description and should not be regarded as limiting.

DETAILED DESCRIPTION

Power tools, such as rotary hammers, generate a large amount of dust and debris when operating the tool. Accordingly, dust extractors or dust collection systems have been implemented to try and capture the dust rather than allowing the dust to be expelled into the air or breathed in by a user. Existing dust collection systems are generally separate tools that may be used in conjunction with the power tool. For example, some dust collections systems are contained within a separate tool housing and may be connected to the housing of the power tool. Other dust collection systems utilize a separate shop vacuum and dust passage to collect dust. Current dust collections systems can be bulky, awkward, or heavy when connected to the power tool. Likewise, dust collection systems that utilize a separate shop vacuum may limit movement and maneuverability of the power tool due to the fact that it is restrained by the shop vacuum. Furthermore, because existing dust collections are typically realized as an independent tool, the overall tool system may be more costly since duplicate parts may be included in the power tool and the dust collection system. For example, the power tool and the dust collection systems may each have their own battery, motor, fan, controller, housing, etc.

The present disclosure addresses some of these issues and provides a series of other improvements that may be implemented to one or both a power tool and/or a dust collection assembly. The present disclosure provides a power tool with an integrated dust collection assembly contained within the power tool. As used in the present disclosure, integration of the dust collection assembly is intended to mean that at least some parts of the dust collection assembly are not removable from the power tool and/or are integrated within the same housing as the power tool. While some parts of the dust collection assembly may be removably coupled to the power tool, such as a dust tube and/or a dust container, other parts, such as a fan and/or a fan motor are not intended to be removed from the power tool. Additionally, integration of the dust collection assembly into the power tool may result in at least some of the components being utilized in a shared manner between the power tool and the dust collection assembly. However, this does not require all parts to be shared. Some parts of dust collection assembly may be separate from the power tool or may be duplicative of the parts in the power tool.

The integration of the dust collection assembly within the power tool may provide several different benefits. For example, the integration of the dust collection assembly within the power tool may allow for a reduced number of parts for the operation of the power tool and dust collection assembly. This may in turn reduce the overall cost of the system. Additionally, in some embodiments, the reduction of parts may also reduce the overall weight and size of the system. Likewise, in some embodiments, the profile of the tool system is more compact, which may allow a user to maneuver and hold the tool system more easily.

As will be understood by a person of ordinary skill in the art, although the present disclosure is described with respect to a rotary hammer, the features described herein may be applied to other handheld power tools which generate dust when operating. For example, in some embodiments, the present disclosure may be applied to other types of power tools, such as drills, grinders, polishers, sanders, cutting tools, or other power tools which generate dust.

Figure 2:
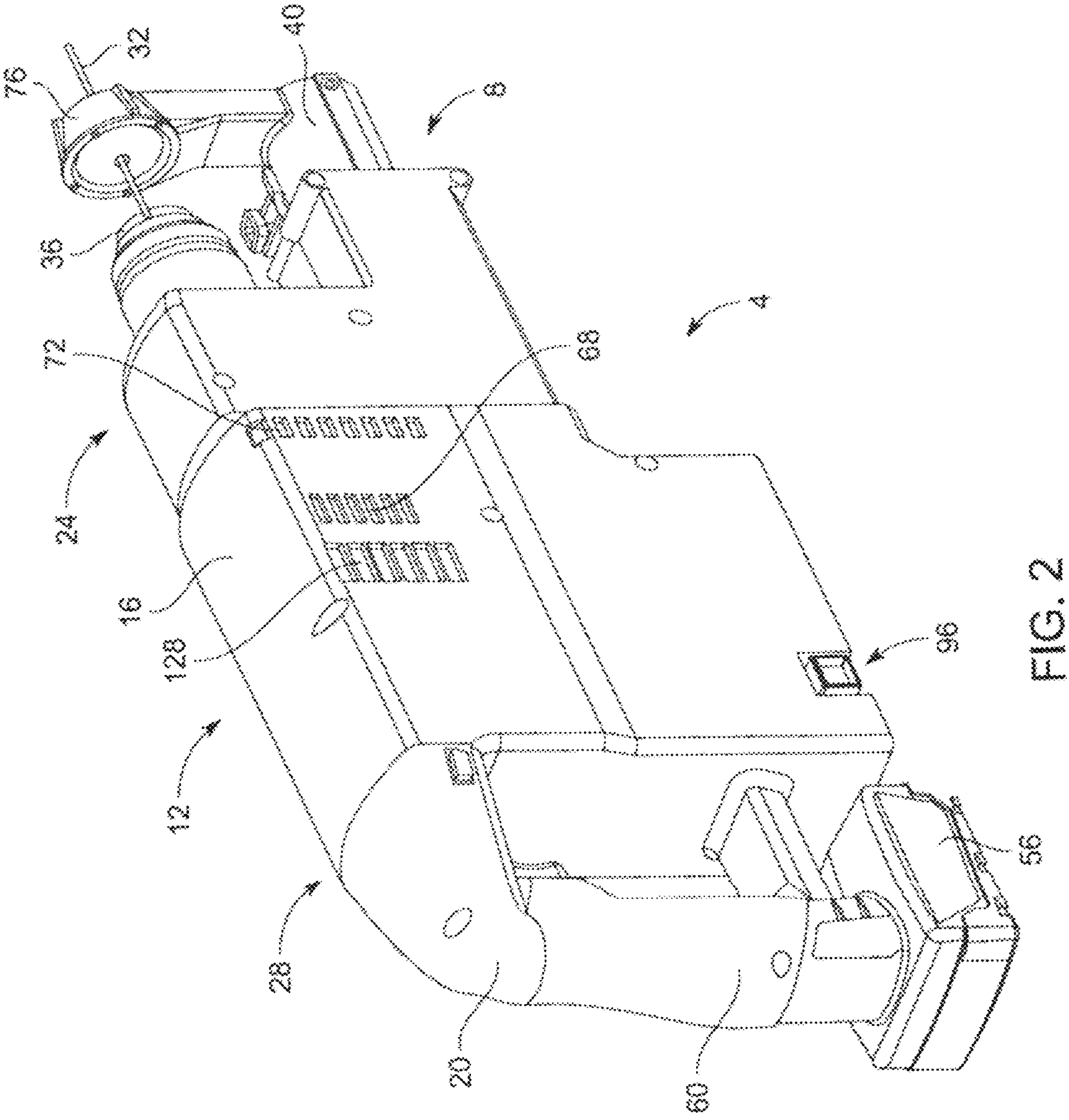
FIG. 2 is a rear perspective view of a rotary hammer including an integrated dust collection assembly according to one embodiment.

FIGS. 1 and 2 illustrate a power tool, such as a rotary hammer 4, according to one embodiment. The illustrated rotary hammer 4 includes a dust collection assembly 8 integrated within the body of the tool. In other embodiments, one or more portion of the dust collection assembly 8 may be realized as a separate element from the rotary hammer 4 or may be positioned externally of the rotary hammer 4. As will be appreciated based on the present disclosure, the integration of the dust collection assembly 8 within the rotary hammer 4 may allow for a reduced number of parts for the operation of the rotary hammer 4 and dust collection assembly 8. For example, in some embodiments, the dust collection assembly 8 and the rotary hammer 4 may share certain parts. In some embodiments, this may reduce the overall cost of the system. Similarly, in some embodiments, this may reduce the overall weight and size of the system. Likewise, in some embodiments, the profile of the tool system is more compact, which may allow a user to maneuver and hold the tool system more easily. It should be understood that the various features and embodiments described in the present disclosure may be mixed or interchanged into different combinations of features and embodiments. In other words, the specific combinations of features disclosed herein are not intended to be limiting but are purely for the sake of illustrating example embodiments including various features of the overall disclosure.

Figure 3A:
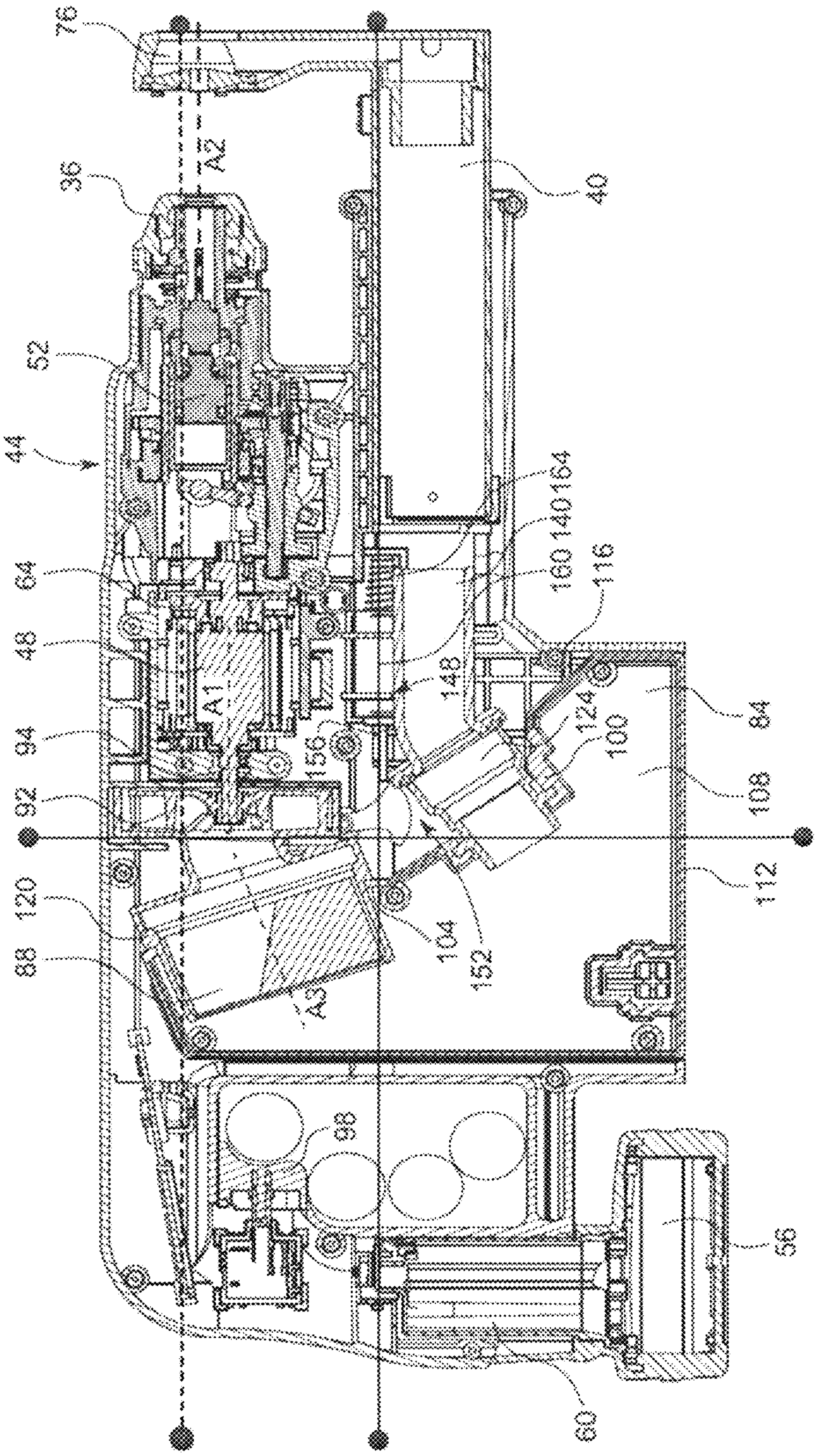
FIG. 3A is a first cross-sectional view of the rotary hammer of FIG. 1.
Figure 3B:
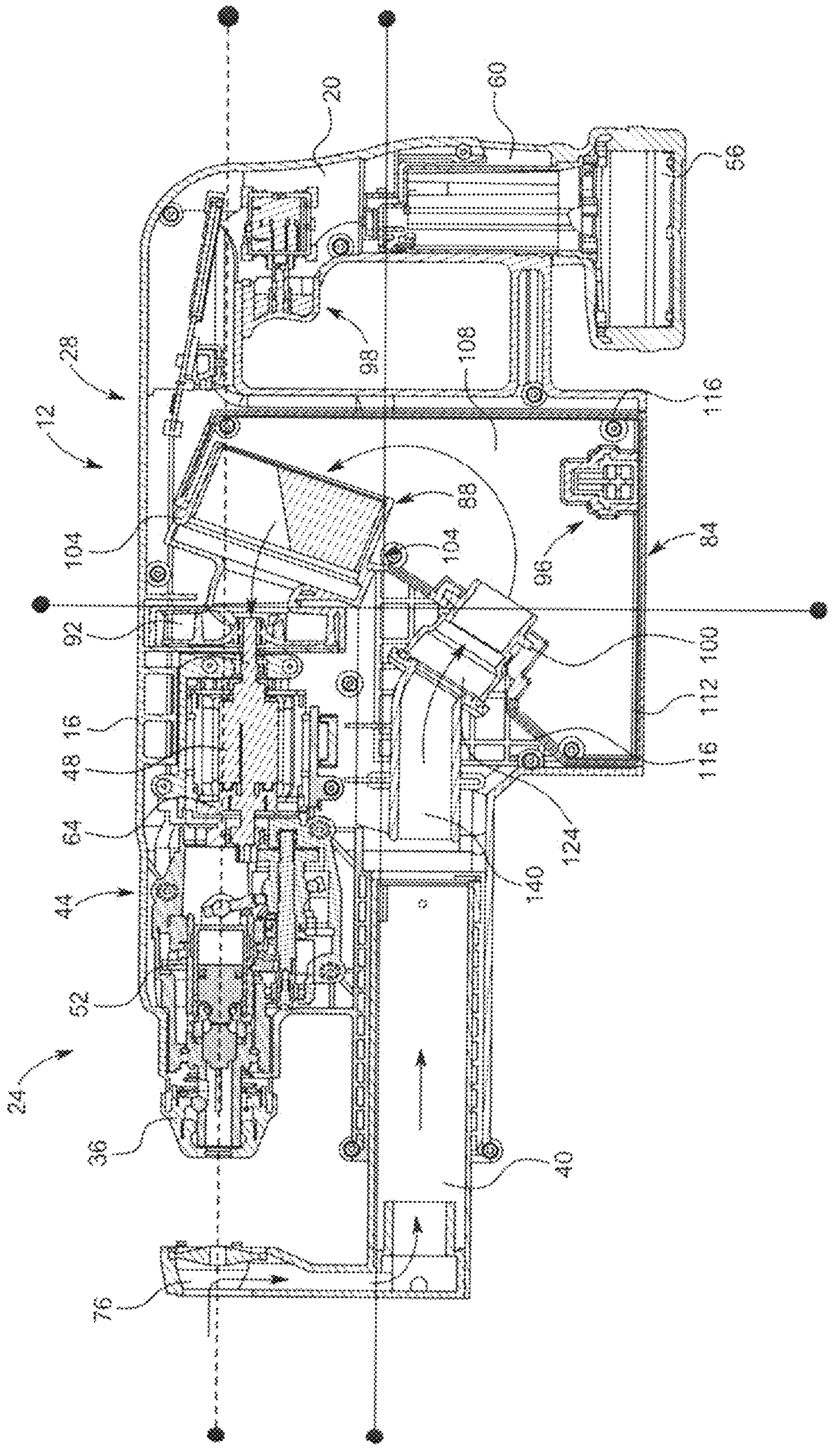
FIG. 3B is a second cross-sectional view of the rotary hammer of FIG. 1.

The rotary hammer 4 includes a housing 12 having a main body 16 and a handle 20 extending rearward of the main body 16. The main body 16 includes a first end 24 to which a tool bit 32 may be coupled, and a second end 28 from which the handle 20 extends. The tool bit 32 may be received within a chuck assembly 36 formed in the first end 24 of the main body 16. Additionally, a suction pipe 40 is slidably engaged with the first end 24 of the main body 16. As shown in FIGS. 3A and 3B, the housing 12 may be divided into quadrants defined by an upper half, a lower half, a front half, and a rear half. In the illustrated embodiment, the upper half begins above the suction pipe 40 of the dust collection assembly 8. Additionally, in the illustrated embodiment, the front half begins at the first end 24 of the housing 12 and extends to a midway point between the first end 24 of the main body 16 and a rear end of the handle 20. Accordingly, this provides for an upper front quadrant (UFQ), an upper rear quadrant (URQ), a lower front quadrant (LFQ), and a lower rear quadrant (LRQ). However, in other embodiments, the quadrants may be defined by different divisions.

A drive unit 44 is positioned within the main body 16 of the housing 12. The drive unit 44 includes a motor 48 and a drive assembly 52 operatively coupled to the motor 48 for receiving torque from the motor 48. The motor 48 defines a motor axis A1 that is parallel with a working axis A2 of the rotary hammer 4. The working axis A2 of the rotary hammer 4 is defined as the axis through the tool bit 32 and the drive assembly 52. Power to the motor 48 is provided by a battery 56, which may be received within a battery receptacle 60 on a bottom portion of the handle 20. However, in other embodiments, the battery receptacle 60 may be disposed within other portions of the housing 12.

A cooling fan 64 is operably coupled to the motor 48 and shares a rotational axis with the motor axis A1. The motor 48 thereby drives both the drive assembly 52 and the cooling fan 64. In the illustrated embodiment, the cooling fan 64 is positioned on a forward side of the motor 48 between the chuck 36 and the motor 48. In another embodiment, the cooling fan 64 is operably coupled to the motor 48 and positioned below the drive unit 44. As will be described in further detail herein, the cooling fan 64 draws air along an airflow path which extends across the motor 48 to cool the motor 48. More specifically, the cooling fan 64 draws in air via a cooling air intake 68 disposed in the housing 12 on a rearward side of the motor 48, and exhausts air via a cooling air exhaust 72 disposed in the housing 12 on a forward side of the motor 48.

In the illustrated embodiment, the drive unit 44 and the cooling fan 64 are positioned within the upper half of the housing 12. Accordingly, the drive unit 44 and the cooling fan 64 are positioned above the suction pipe 40. Further, the drive unit 44 and the cooling fan 64 are positioned within a front half of the housing 12. The arrangement of the drive unit 44 and the cooling fan 64 within the upper front quadrant provides for additional space for the dust collection assembly 8. For example, the drive unit 44 does not extend (or only minimally extends) into the upper rear quadrant. Accordingly, a space exists between the drive unit 44 and the second end 28 of the main body 16. Likewise, the drive unit 44 does not extend (or only minimally extends) into the lower front quadrant and the lower rear quadrant, leaving sufficient space for the dust collection assembly 8.

The rotary hammer 4 also includes a dust collection assembly 8. In the illustrated embodiment, the dust collection assembly 8 is integrated within the main body 16 of rotary hammer 4. However, in other embodiments, one or more part of the dust collection assembly 8 may be disposed within the handle 20 of the rotary hammer 4 or may be positioned externally of the housing 12. With reference to FIGS. 3A-3B, the dust collection assembly 8 includes a nozzle 76, a telescoping suction pipe 40, a dust container 84, a filter 88, and a suction fan 92. The nozzle 76 is located at a first end of the telescoping suction pipe 40 and proximate to the tool bit 32 of the rotary hammer 4 such that the tool bit 32 extends through the nozzle 76. A second end of the telescoping suction pipe 40 extends into the housing 12 such that the suction pipe 40 extends and retracts from the first end 24 of the main body 16.

Figure 14:
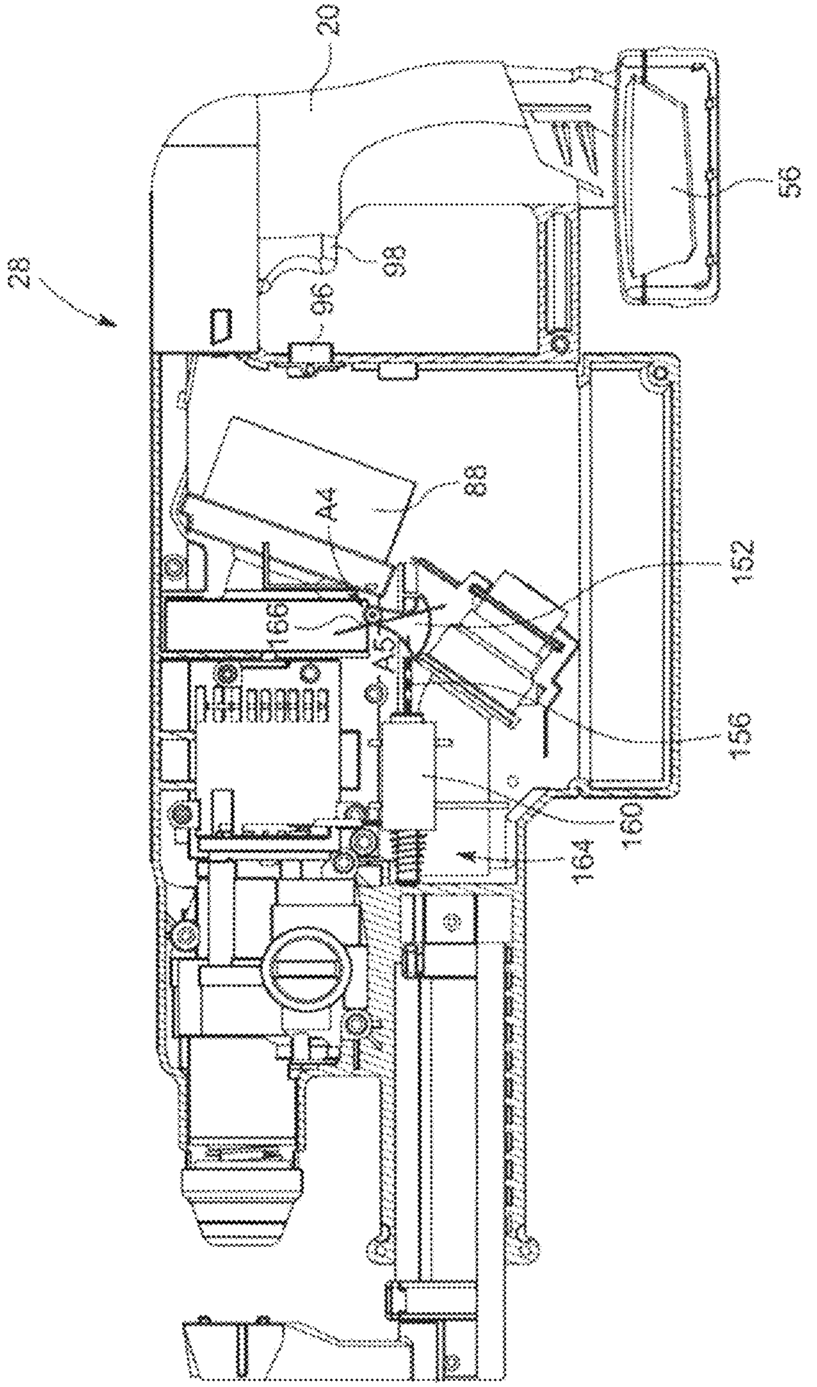
FIG. 14 is a cross-sectional view of a rotary hammer including an integrated dust collection assembly according to yet another embodiment.

The dust container 84 is selectively attachable to the housing 12. The dust container 84 is detachable from the housing 12 of the rotary hammer 4 and may be removed to allow an operator to empty the dust and other debris from the dust container 84. A latch 96 operable by a user to selectively decouple the dust container 84 from the housing 12 is located on the housing 12 proximate the handle 20. In the embodiment of FIG. 2, the latch 96 is positioned near the bottom edge of the housing 12. In another embodiment, as shown in FIG. 14, the latch 96 may be located on the second end 28 of the housing 12 such that it is facing the handle 20 and positioned to be operated by a user while the user grasps the handle 20. In the illustrated embodiment, the latch 96 is located opposite a trigger switch 98 which selectively operates the rotary hammer 4. In the illustrated embodiment, the dust container 84 is prevented from being secured to the housing 12 without the filter 88 in place. For example, the filter 88 acts as a portion of the connection between the dust container 84 and the housing 12. Thus, without the filter 88 in place, the dust container 84 is prevented from being coupled to the housing 12.

When coupled to the rotary hammer 4, the dust container 84 is substantially received within the main body 16 of the housing 12 such that it does not extend (or only minimally extends) outside of the housing 12 when coupled to the housing 12. However, in other embodiments, the dust container 84 may only be partially received within the housing 12 or may be attached to an outer portion of the housing 12. In the illustrated embodiment, the dust container 84 extends along the width of bottom portion of the main body 16. Additionally, the dust container 84 extends into the upper rear quadrant and into the space between the drive unit 44 and the second end 28 of the main body 16.

The dust container 84 includes an inlet 100 for a dust laden air stream and an outlet 104 defined by an outlet end of the filter 88. More specifically, the dust container 84 includes opposite side walls 108 and a bottom wall 112 extending between the side walls 108. The dust container 84 additionally includes end walls 116 adjacent each of the side walls 108 and the bottom wall 112. An opening 120 is defined in a first end wall 116 through which the filter 88 is received. The first end wall 116 further includes the inlet 100 for dust laden air. A connection port 124 extends through the inlet 100 to direct the dust laden air from the suction pipe 40 into the dust container 84. In some embodiments, the connection port 124 is a DEC 26 connection. The dust container 84 is operable to collect dust and other debris from a workpiece during drilling and/or hammering operation performed by the rotary hammer 4 to maintain a user's work area substantially clear of dust and other debris.

As mentioned, the dust container 84 extends upward into to the housing 12 of the rotary hammer 4 between the motor 48 and the handle 20. The filter 88 is positioned within the dust container 84 in the section of the dust container 84 extending into the space between the motor 48 and the second end 28 of the main body 16 (i.e., the upper rear quadrant). In other embodiments, the filter 88 may be positioned in other sections of the dust container 84. In some embodiments, the filter 88 is a high efficiency particulate air ("HEPA") filter positioned between the dust container 84 and a suction fan 92.

The suction fan 92 is positioned rearwardly of the motor 48 adjacent the filter 88 to draw dust laden air through the filter 88. The suction fan 92 is directly mounted to an output shaft 94 of the motor 48 and shares a rotational axis with the motor axis A1. In some embodiments, however, the suction fan 92 is operatively coupled to the motor 48 via other mechanical means such as a clutch, belt, or power take off. The motor 48, suction fan 92, and filter 88 are located within the upper half of the housing 12 as seen in FIG. 3. More specifically, the filter 88 is in-line with the suction fan 92, motor 48, the cooling fan 64, and drive unit 44. An axis A3 through the center of the filter 88 intersects the rotational axis A1 of the suction fan 92 at an obtuse angle. In the illustrated embodiment, the axis A3 through the filter 88 is defined as extending perpendicular from the surface of the filter 88 facing the suction fan 92. The angled orientation of the filter 88 results in an overall length of the rotary hammer 4 as measured from a rearmost point on the handle 20 of the housing 12 to a forwardmost point on the nozzle 76 of the dust collection assembly 8 being reduced. The obtuse angle of the filter 88 may improve the vertical-up operation of the rotary hammer 4. Additionally, the obtuse angle of the filter 88 may provide for an improved sealing surface between the dust container 84 and the filter 88.

When rotated by the motor 48, the suction fan 92 creates an air flow which generates a vacuum in the suction pipe 40 to draw dust and other debris into the dust container 84 and through the filter 88. After the dust is separated from the air via the filter 88, the clean air is exhausted through an exhaust port 128 formed in the housing 12 adjacent the suction fan 92. As shown in FIG. 1, the exhaust port 128 is positioned rearward of the motor 48 and adjacent the suction fan 92.

With continued reference to FIGS. 3A-3B, the suction pipe 40 extends longitudinally within the rotary hammer 4 housing in a direction parallel to the working axis A2. The suction pipe 40 is configured to move along the same longitudinal axis, thereby adjusting the length of the suction pipe 40 and the location of the nozzle 76. As the tool bit 32 plunges into the workpiece, the suction pipe 40 retracts into the housing 12 in a telescoping manner. Included within the rotary hammer housing 12 is a plunge depth stop 132, which limits the extent to which the suction pipe 40 may retract into the housing 12, and in turn, limits the extent to which the tool bit 32 can plunge into the workpiece. The plunge depth stop 132 is movable along the length of the suction pipe 40 and is selectively fixed to limit the extent to which the suction pipe 40 may retract into the housing 12. Also included on the housing 12 is an extension stop 136. The extension stop 136 limits the extent to which the suction pipe 40 may extend out of the housing 12 by selectively fixing to the suction pipe 40 along the length of the suction pipe 40. This feature can be used to adjust the extension length of the suction pipe 40 to correspond to the size of the tool bit 32 being used. For example, when using a 2-inch tool bit, the extension length of the suction pipe 40 can be reduced to 2 inches to correspond to the length of the tool bit 32. If the length of the suction pipe 40 is not limited, then the end of the suction pipe 40 may extend far beyond the end of the tool bit 32.

Coupled to the suction pipe 40 is a transfer tube 140. The transfer tube 140 is stationary with respect to the housing 12 and functions as a connection between the suction pipe 40 and dust container 84. A first end of the transfer tube 140 proximate the dust container 84 has a bend of between 0 and 90 degrees. The connection port 124 is coupled to the first end of the transfer tube 140 to facilitate the connection with the dust container 84. In some embodiments the connection port 124 may be a DEC 26 port. The bend in the transfer tube 140 and the connection port 124 may provide for an improved seal between the transfer tube 140 and dust container 84. Additionally, the connection port 124 allows a user to remove the dust container 84, for the purpose of emptying the dust container 84, without exposure to the dust within the dust container 84.

Figure 4:
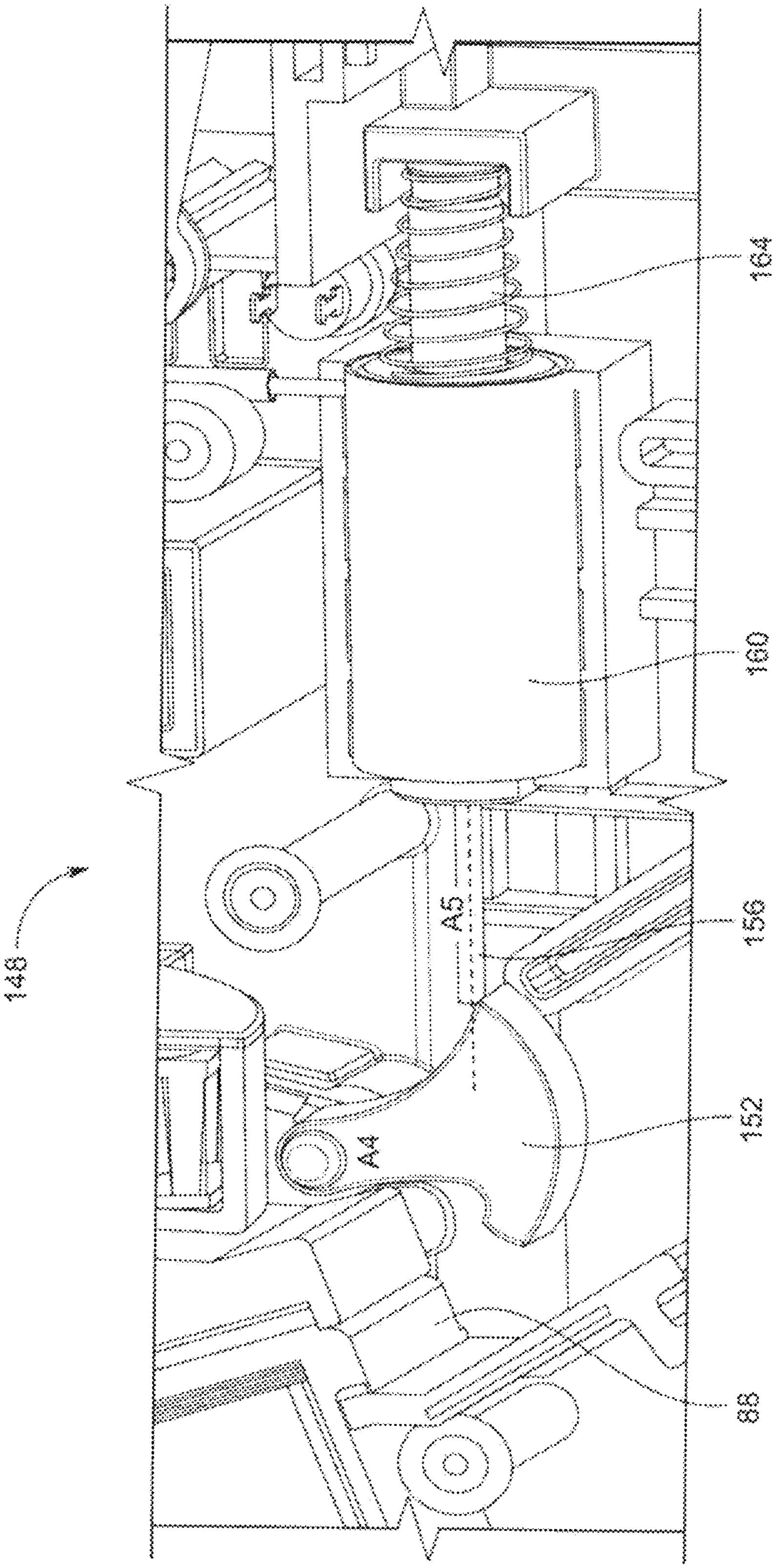
FIG. 4 is an enlarged cross-sectional view of the rotary hammer of FIG. 3.

With reference to FIGS. 3A and 4, a filter cleaning mechanism 148 is disposed within the housing 12 and positioned proximate a forwardmost edge of the filter 88. In other embodiments, the filter cleaning mechanism 148 can be positioned proximate any edge of the filter 88. The filter cleaning mechanism 148 includes an anvil 152 for impacting the filter 88, a striker 156 for striking the anvil 152, a solenoid 160 for causing the striker 156 to strike the anvil 152, and a biasing member 164 for biasing the striker 156. The anvil 152 is positioned proximate the filter 88 and coupled to the housing 12 about an anvil axis A4. The anvil 152 rotates about the anvil axis A4 to move between a first anvil position spaced from the filter 88 and a second anvil position in contact with an impact location on the filter 88. The striker 156 has a longitudinal axis A5 parallel to the working axis A2 of the rotary hammer 4 along which the striker 156 moves between a first striker position and a second striker position. In the first striker position, the striker 156 is in contact with the anvil 152 at the first anvil position. In other embodiments, the striker 156 may be spaced from the anvil 152 while in the first striker position. In the second striker position, the striker 156 is in contact with the anvil 152 such that the anvil 152 rotates to the second anvil position and contacts the filter 88 at an impact location. In some embodiments, the filter cleaning mechanism 148 does not include an anvil 152. Rather, the striker 156 directly impacts the filter 88 when in the second striker position. The solenoid 160 is supported by the housing 12 and surrounds at least a portion of the striker 156. The biasing member 164 is located on the opposite end of the striker 156 and solenoid 160 with respect to the anvil 152 and filter 88. In the illustrated embodiment, the biasing member 164 is a compression spring. The biasing member 164 biases the striker 156 toward the first striker position until the solenoid 160 is activated, at which point the solenoid 160 overpowers the biasing member 164 causing the striker 156 to move to the second striker position. In the embodiment of FIG. 14, a second biasing member 166, illustrated as a torsion spring, is coupled to the anvil 152 for biasing the anvil 152 to the first anvil position.

The filter cleaning mechanism 148 operates as follows. In one embodiment, the filter cleaning mechanism 148 is automatically actuated when the suction fan 92 becomes inactive. A controller (not shown) controls activation of the solenoid 160 to move the striker 156. Triggering the solenoid 160 may be based on detection of inactivity of the suction fan 92 or inactivity of the motor 48. As used herein, the suction fan 92 may be considered inactive when it has stopped rotating, or the suction fan 92 may be considered inactive when the suction fan 92 is rotating at a speed below a predetermined threshold when the airflow induced by the suction fan 92 has effectively stopped. Similarly, the motor 48 may be considered inactive when it has stopped rotating, or it is operating below a predetermined threshold of rotational speed. In another embodiment, the filter cleaning mechanism 148 may be actuated while the suction fan 92 or motor 48 is active. In the illustrated embodiment an actuator, such as a push button 168, is disposed on the outside of the housing 12 and allows the user to manually initiate the filter cleaning mechanism 148 (FIG. 1). The push button 168 allows an operator to clean the filter 88 at will or intermediately between the automatic cleaning operation.

In a rest state, the anvil 152 is in the first anvil position, the striker 156 is in the first striker position, and the solenoid 160 is not energized. To initiate the operational state, the solenoid 160 must be energized either automatically or through the push button 168. Once energized, the solenoid 160 overpowers the biasing member 164 causing the striker 156 to move from the first striker position to the second striker position. Once at the second striker position, the striker 156 strikes the anvil 152 causing the anvil 152 to move from the first anvil position to the second anvil position and impact the filter 88 at the impact location. The impact of the anvil 152 on the filter 88 causes the dislodging of dust and other debris from the filter 88. After the anvil 152 impacts the filter 88, the solenoid 160 is automatically deactivated, thereby allowing the anvil 152 and striker 156 to return to the first anvil and striker positions, respectively.

The rotary hammer 4 of the embodiment of FIGS. 1-4 utilizes a single power source (e.g., a battery 56) and single electric motor 48 to operate the drive assembly 52 and dust collection assembly 8. Portions of the dust collection assembly 8 being integral with the housing 12 may allow for an improved component layout for vertical up operations. Two distinct air flow paths are designated within the housing 12. The first air flow path is the dust collector flow path in which dust laden air enters through a suction air inlet in the nozzle 76, travels through the suction pipe 40, into the transfer tube 140, and deposits the dust with the help of the filter 88 into the dust container 84. After passing through the dust container 84 and filter 88, the now clean air exits the housing 12 through the suction air exhaust 128. The air flow in the dust collector flow path is driven by the suction fan 92 and motor 48. The second air flow path is characterized as a cooling air flow path. The cooling air flow path includes the cooling air intake 68 on the housing 12 and the cooling air exhaust 72 on housing 12 spaced away from the cooling air intake 68. Air in the cooling air flow path enters through the cooling air intake 68, is directed over the motor 48 to cool the motor 48 and exits through the cooling air exhaust 72. The cooling air path is powered by the cooling fan 64 which is mounted coaxially on the motor 48 with the suction fan 92.

Figure 5:
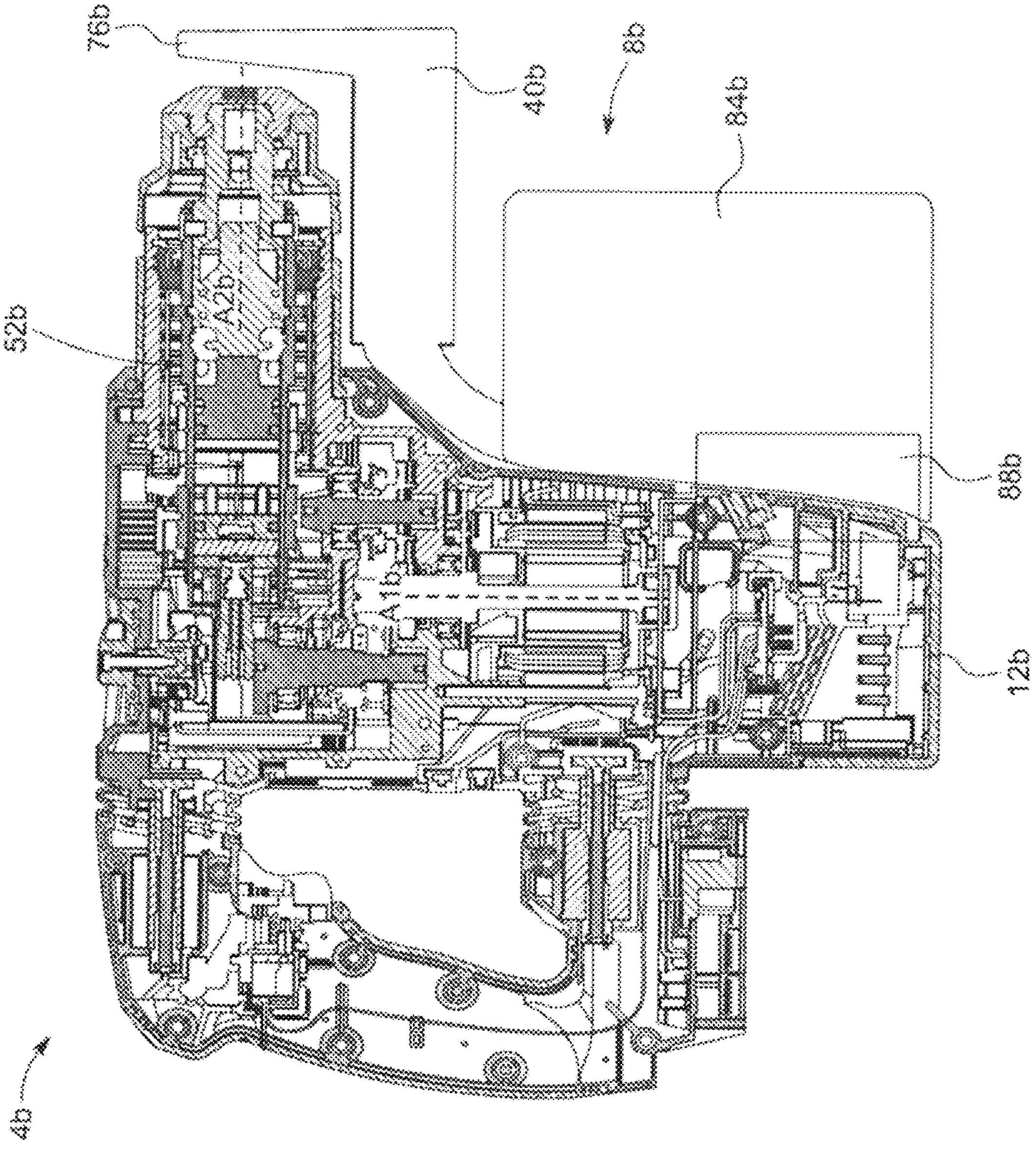
FIG. 5 is a schematic illustration of a rotary hammer including an integrated dust collection assembly according to another embodiment.

FIG. 5 illustrates another embodiment of a rotary hammer **4*b* with an integrated dust collection assembly 8*b*, with like parts having like reference numerals plus the letter "b", and the following differences explained below. In the embodiment illustrated in FIG. 5, the motor axis Alb of this embodiment is perpendicular to the drive assembly 52*b*** and working axis A2*b*. The dust container **84*b* is selectively coupled to the housing 12*b* on a lower front portion beneath the drive assembly 52*b*. The orientation of this embodiment may improve vertical down operation and results in a rotary hammer 4*b*** of reduced length.

Figure 6:
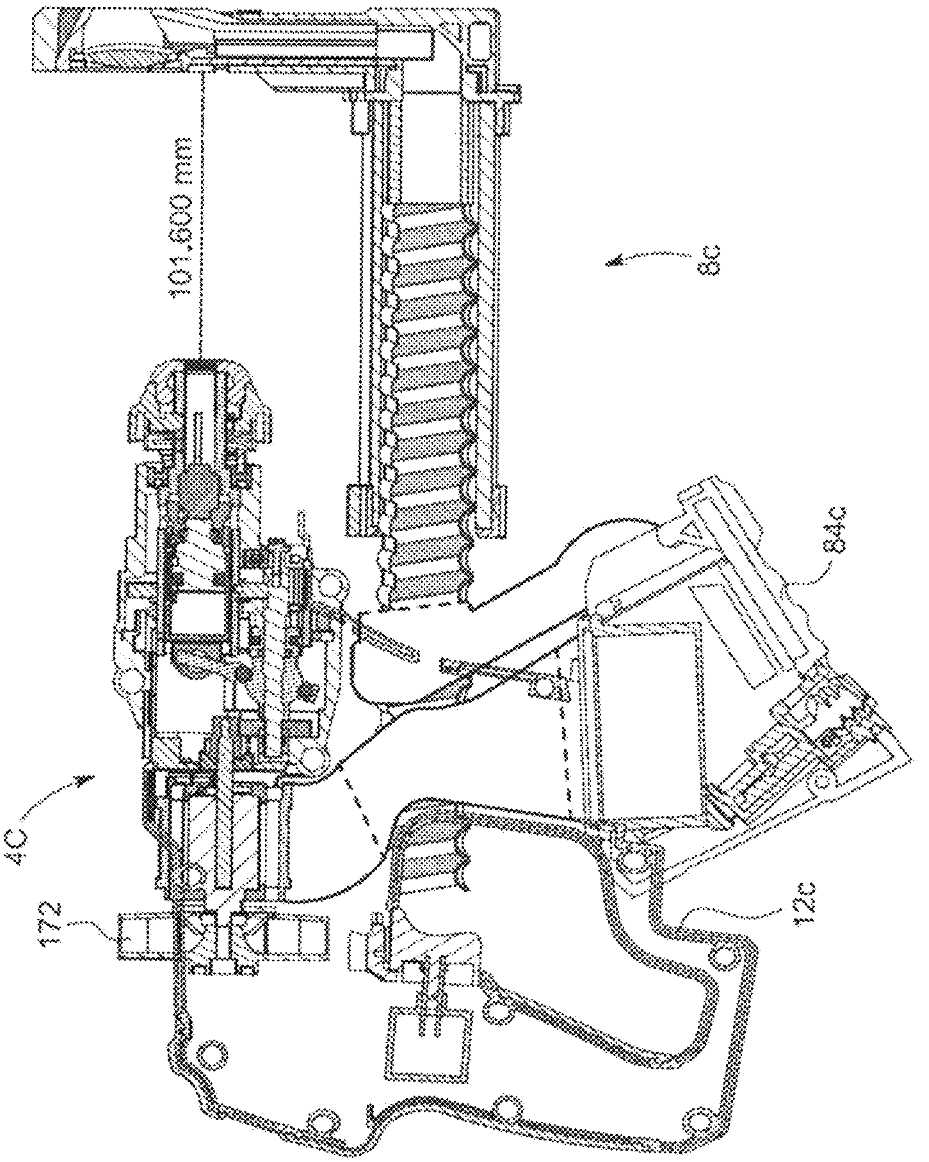
FIG. 6 is a schematic illustration of a rotary hammer including an integrated dust collection assembly according to yet another embodiment.

FIG. 6 illustrates yet another embodiment of a rotary hammer **4*c* with an integrated dust collection assembly 8*c*, with like parts having like reference numerals plus the letter "c", and the following differences explained below. The housing 12*c* includes a lower housing portion designed to interface with a dust container 84*c*. A single fan 172, driven by the motor 48*c*, provides suction for the dust collector air flow and the cooling air flow. The rotary hammer 4*c* of this embodiment may improve horizontal drilling. Advantageously, this embodiment has only a single fan 172** for cooling the motor and driving the dust extractor.

Figure 7:
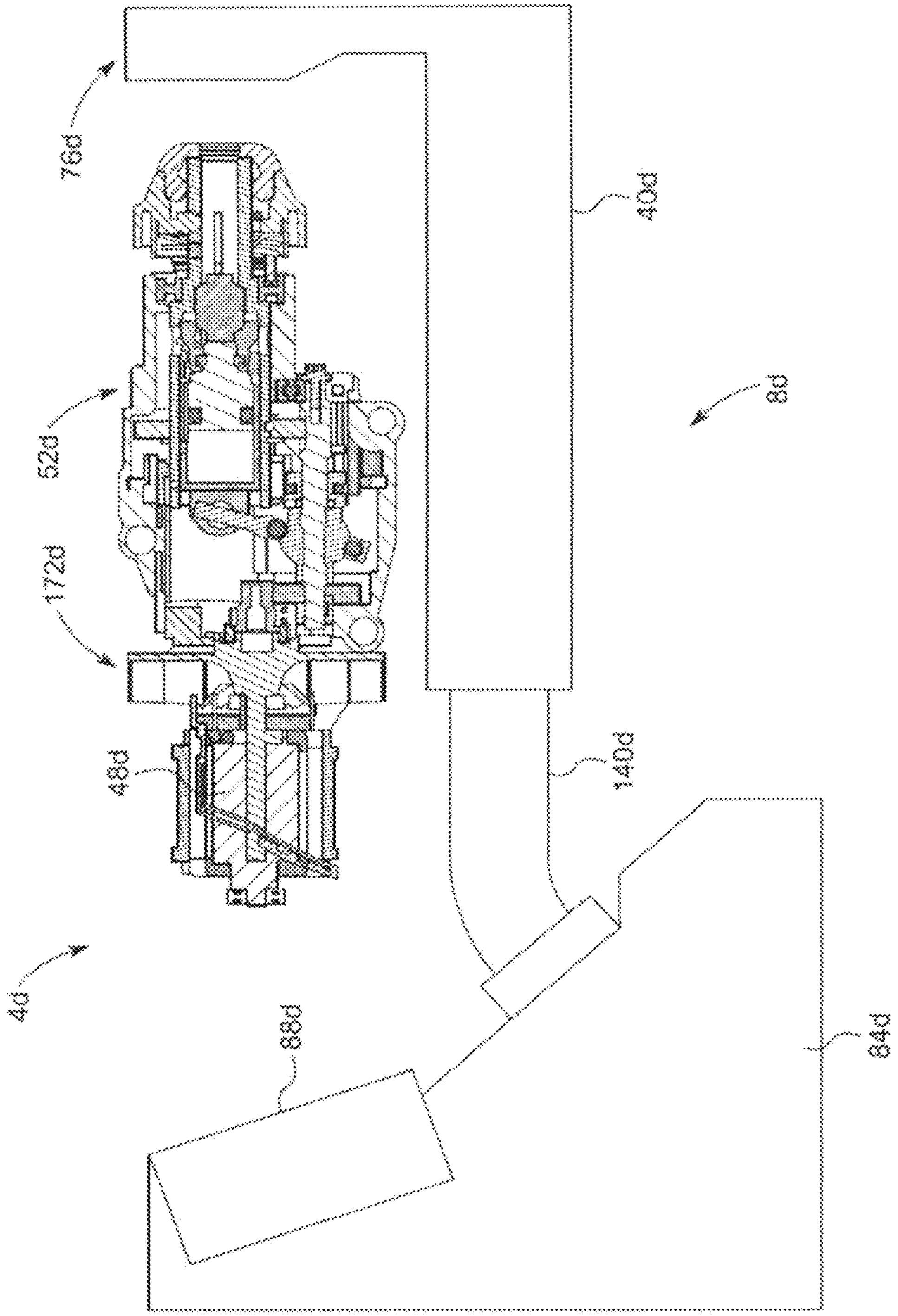
FIG. 7 is a schematic illustration of a rotary hammer including an integrated dust collection assembly according to yet another embodiment.

FIG. 7 illustrates yet another embodiment of a rotary hammer **4*d* with an integrated dust collection assembly 8*d*, with like parts having like reference numerals plus the letter "d", and the following differences explained below. A single fan 172*d*, located axially between the motor 48*d* and drive assembly 52*d* within the housing 12*d*, provides the suction for both the dust collector air flow and cooling air flow. The arrangement of dust collection assembly 8*d* components, namely the filter 88*d*, dust container 84*d*, transfer tube 140*d*, suction pipe 40*d*, and nozzle 76*d*, remains unchanged from the embodiment of FIGS. 1-4. This orientation results in a rotary hammer 4*d*** with improved vertical up operations.

Figure 8:
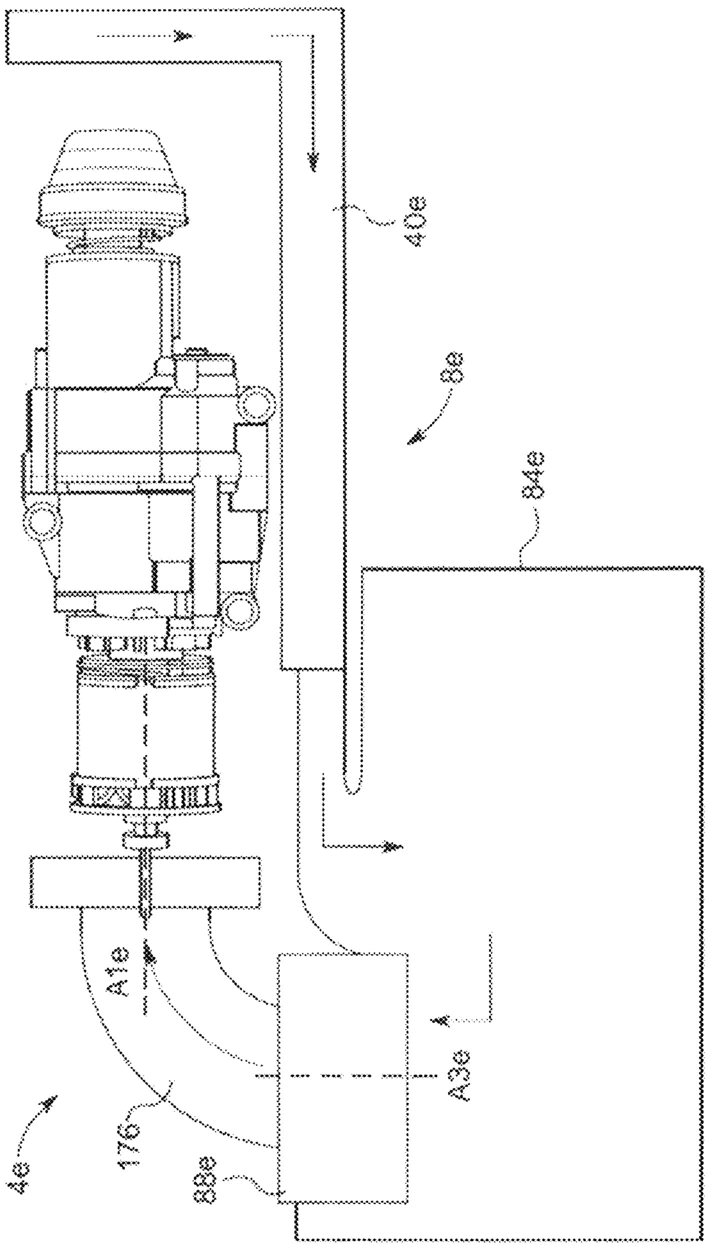
FIG. 8 is a schematic illustration of a rotary hammer including an integrated dust collection assembly according to yet another embodiment.

FIG. 8 illustrates yet another embodiment of a rotary hammer **4*e* with an integrated dust collection assembly 8*e*, with like parts having like reference numerals plus the letter "e", and the following differences explained below. A secondary transfer tube 176 is located between the filter 88*e* and the suction pipe 40*e***. Additionally, the filter axis A3*e* is oriented perpendicularly to the motor axis Ale. This housing **12*e*** orientation results in a reduced tool height and increased tool length. The tool orientation of this embodiment may improve horizontal operations.

Figure 9:
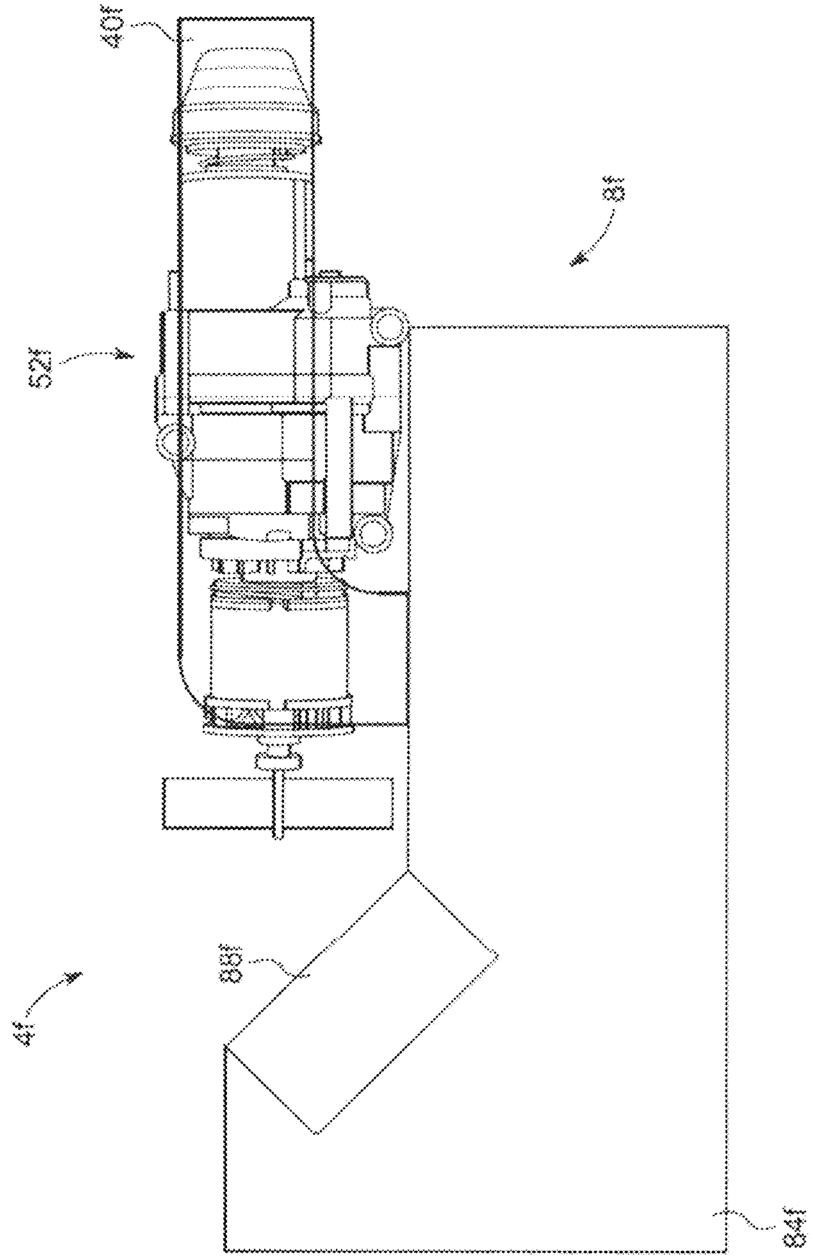
FIG. 9 is a schematic illustration of a rotary hammer including an integrated dust collection assembly according to yet another embodiment.

FIG. 9 illustrates yet another embodiment of a rotary hammer **4*f* with an integrated dust collection assembly 8*f*, with like parts having like reference numerals plus the letter "f", and the following differences explained below. The suction pipe 40*f* is located horizontally next to the drive assembly 52***f*. This results in a shorter tool height and is optimized for horizontal drilling.

Figure 10:
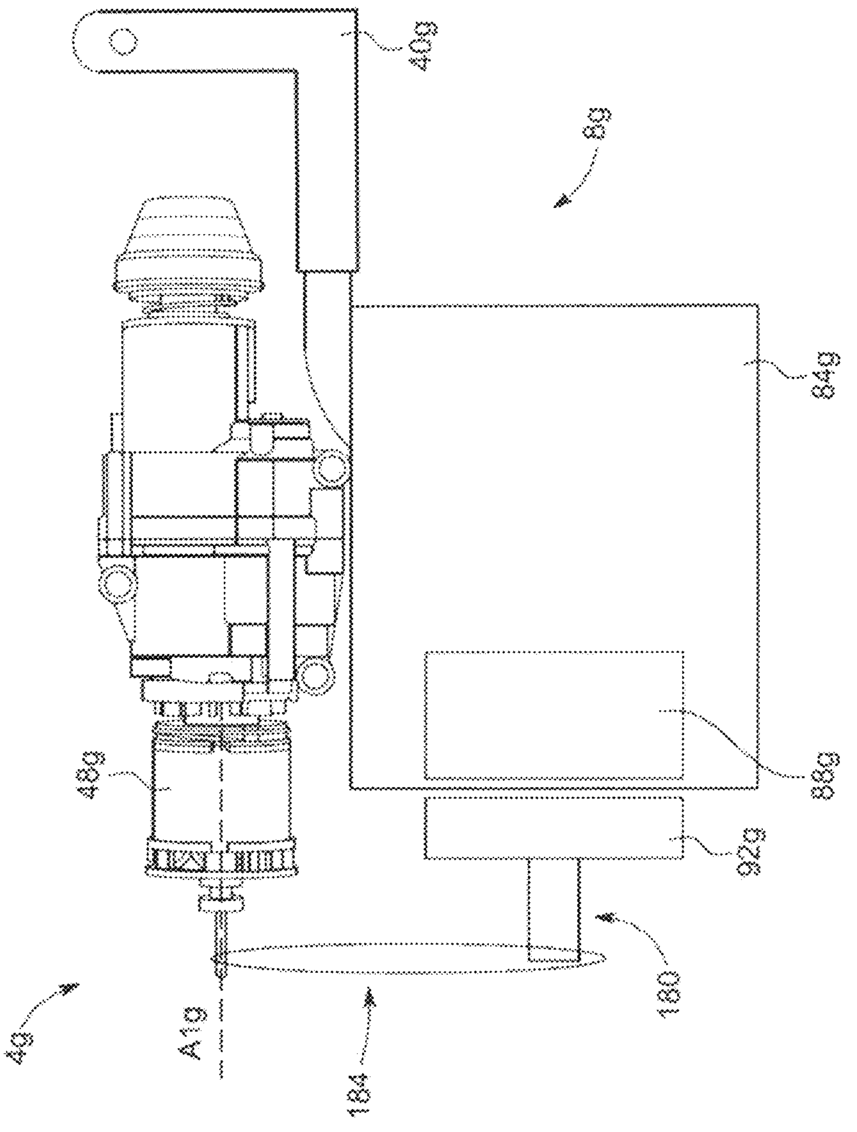
FIG. 10 is a schematic illustration of a rotary hammer including an integrated dust collection assembly according to yet another embodiment.

FIG. 10 illustrates yet another embodiment of a rotary hammer 4*g* with an integrated dust collection assembly 8*g*, with like parts having like reference numerals plus the letter "g", and the following differences explained below. The suction fan 92*g* is located on a suction fan drive shaft 180, separate from the motor 48*g*. The suction fan drive shaft 180 is parallel to the motor axis Alg. A belt or chain 184 couples the suction fan drive shaft 180 to the motor 48*g* and allows the motor 48*g* to drive the suction fan 92*g*. Advantageously, the suction drive of this embodiment allows for different rotational speeds of the motor 48*g* and suction fan 92*g*.

Figure 11:
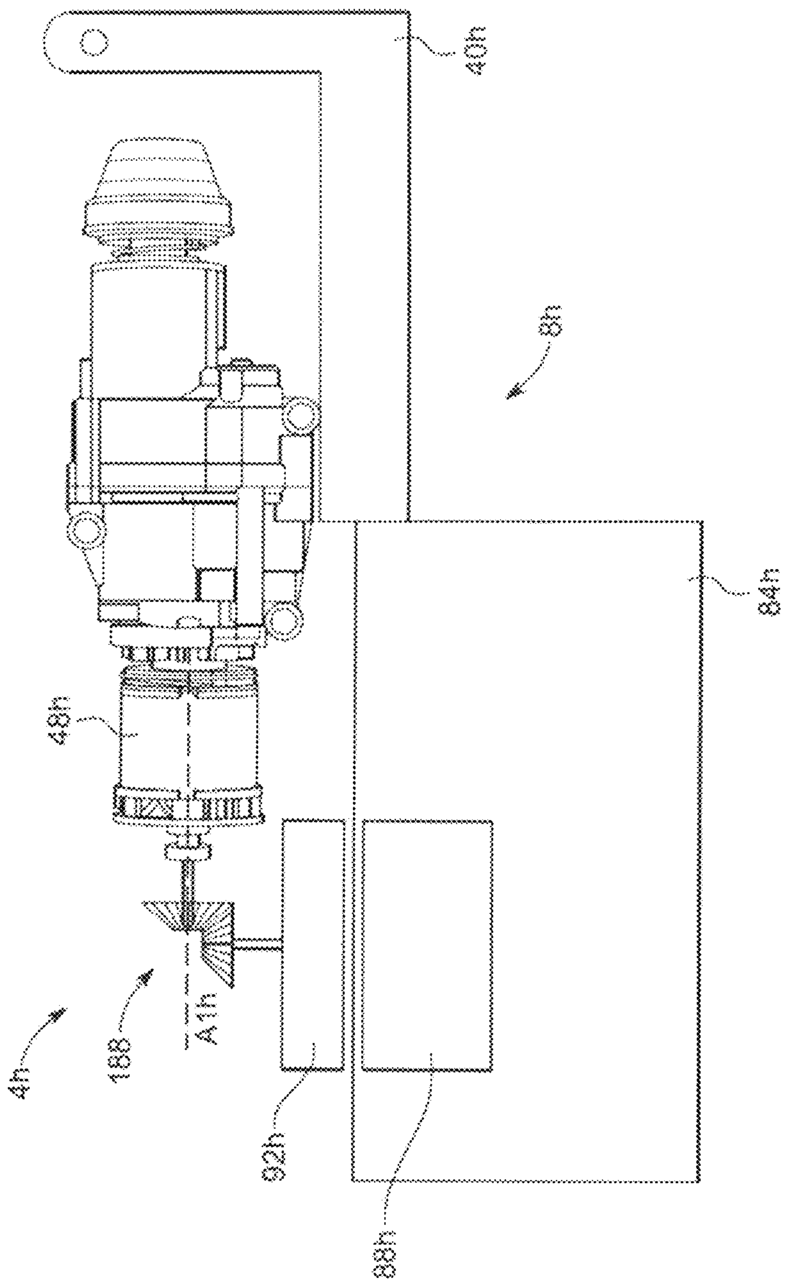
FIG. 11 is a schematic illustration of a rotary hammer including an integrated dust collection assembly according to yet another embodiment.

FIG. 11 illustrates yet another embodiment of a rotary hammer 4*h* with an integrated dust collection assembly 8*h*, with like parts having like reference numerals plus the letter "h", and the following differences explained below. The suction fan 92*h* is oriented perpendicular to the motor axis A1*h* and driven through a bevel gear train 188.

Figure 12:
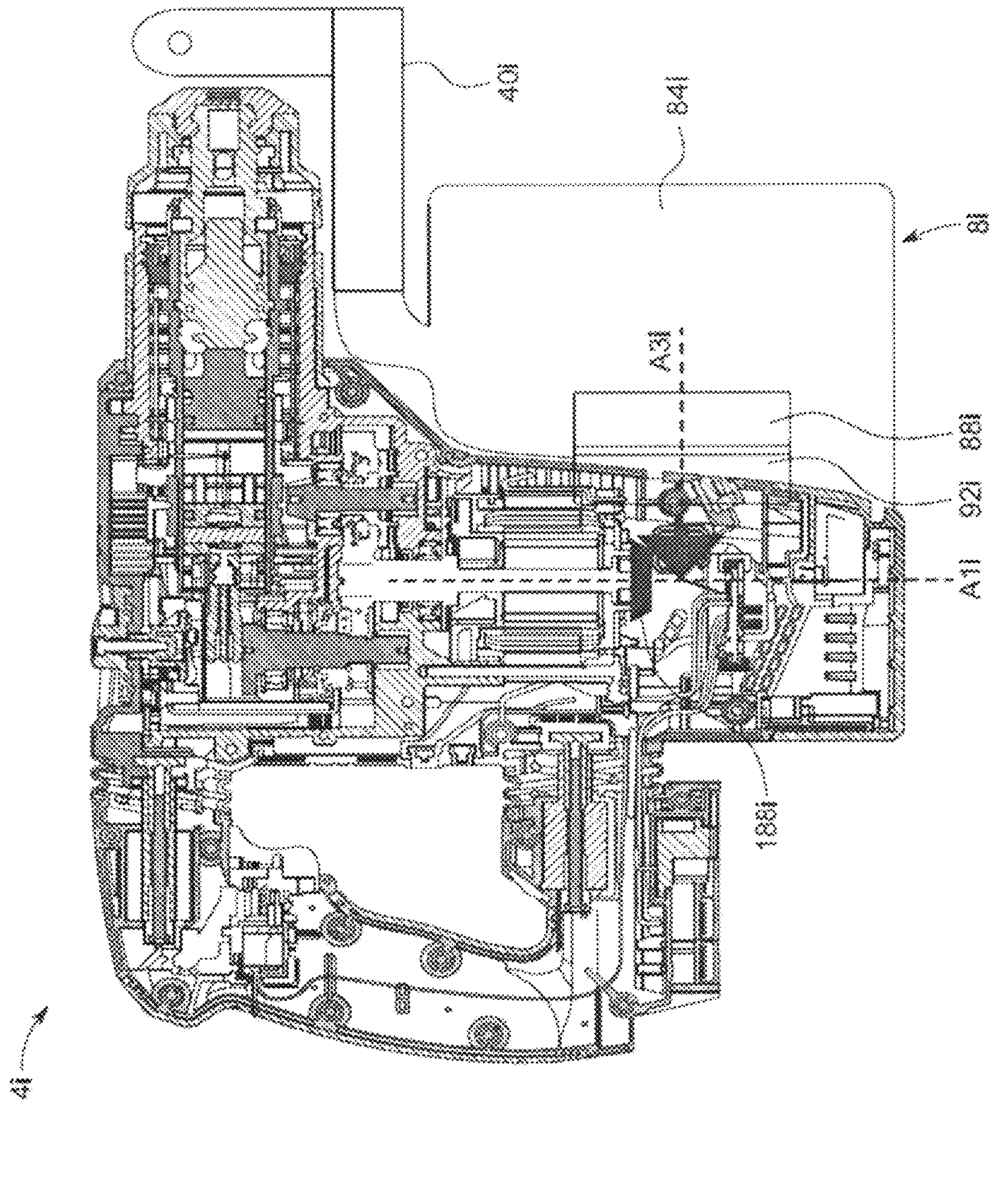
FIG. 12 is a schematic illustration of a rotary hammer including an integrated dust collection assembly according to yet another embodiment.

FIG. 12 illustrates yet another embodiment of a rotary hammer 4*i* with an integrated dust collection assembly 8*i*, with like parts having like reference numerals plus the letter "i", and the following differences explained below. The dust collection assembly 8*i* is oriented similar to the embodiment of FIG. 6; however, the suction fan 92*i* is oriented perpendicularly to the motor axis Ali and driven through a bevel gear train 188*i*.

Figure 13:
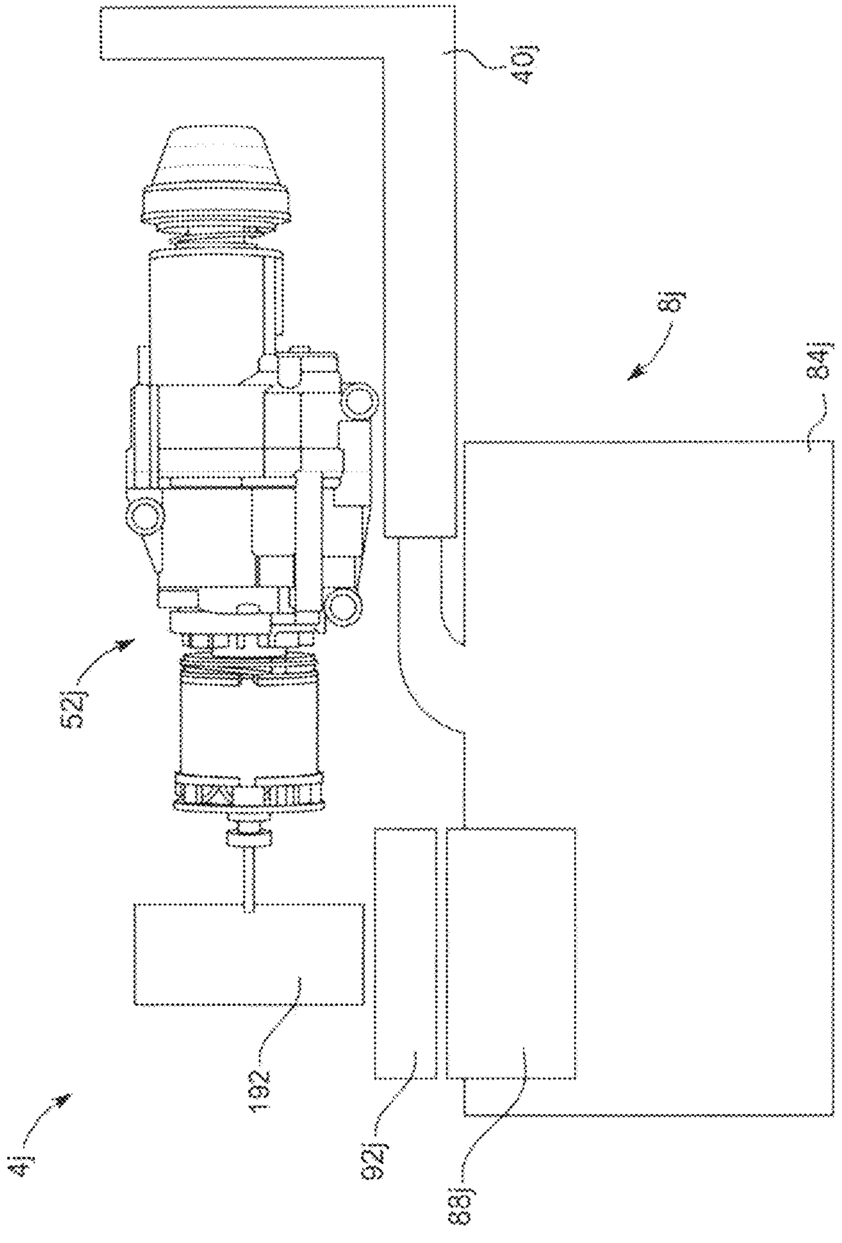
FIG. 13 is a schematic illustration of a rotary hammer including an integrated dust collection assembly according to yet another embodiment.

FIG. 13 illustrates yet another embodiment of a rotary hammer 4*j* with an integrated dust collection assembly 8*j*, with like parts having like reference numerals plus the letter "j", and the following differences explained below. A second motor 192 is disposed within the housing 12*j* for driving the suction fan 92*j* of the dust collection assembly 8*j*. Advantageously, this embodiment allows for independent control of the dust collection assembly 8*j* and drive assembly 52*j* speeds. In this embodiment, the dust collection assembly 8*j* is operable even when the drive assembly 52*j* is not engaged.

Figure 15:
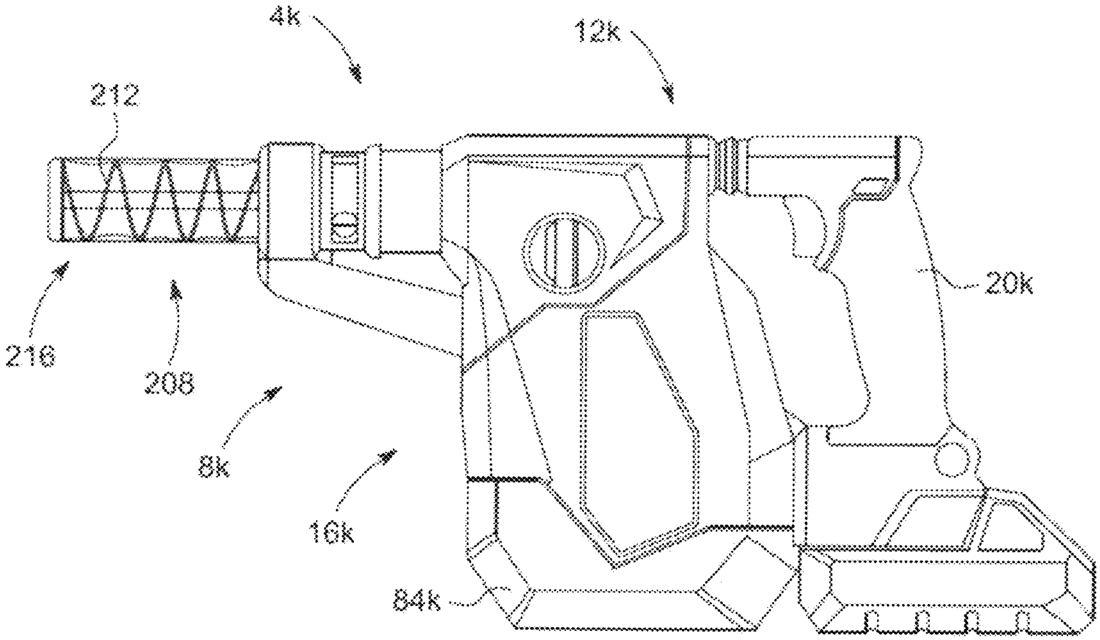
FIG. 15 is a side view of a rotary hammer including an integrated dust collection assembly according to yet another embodiment.
Figure 16:
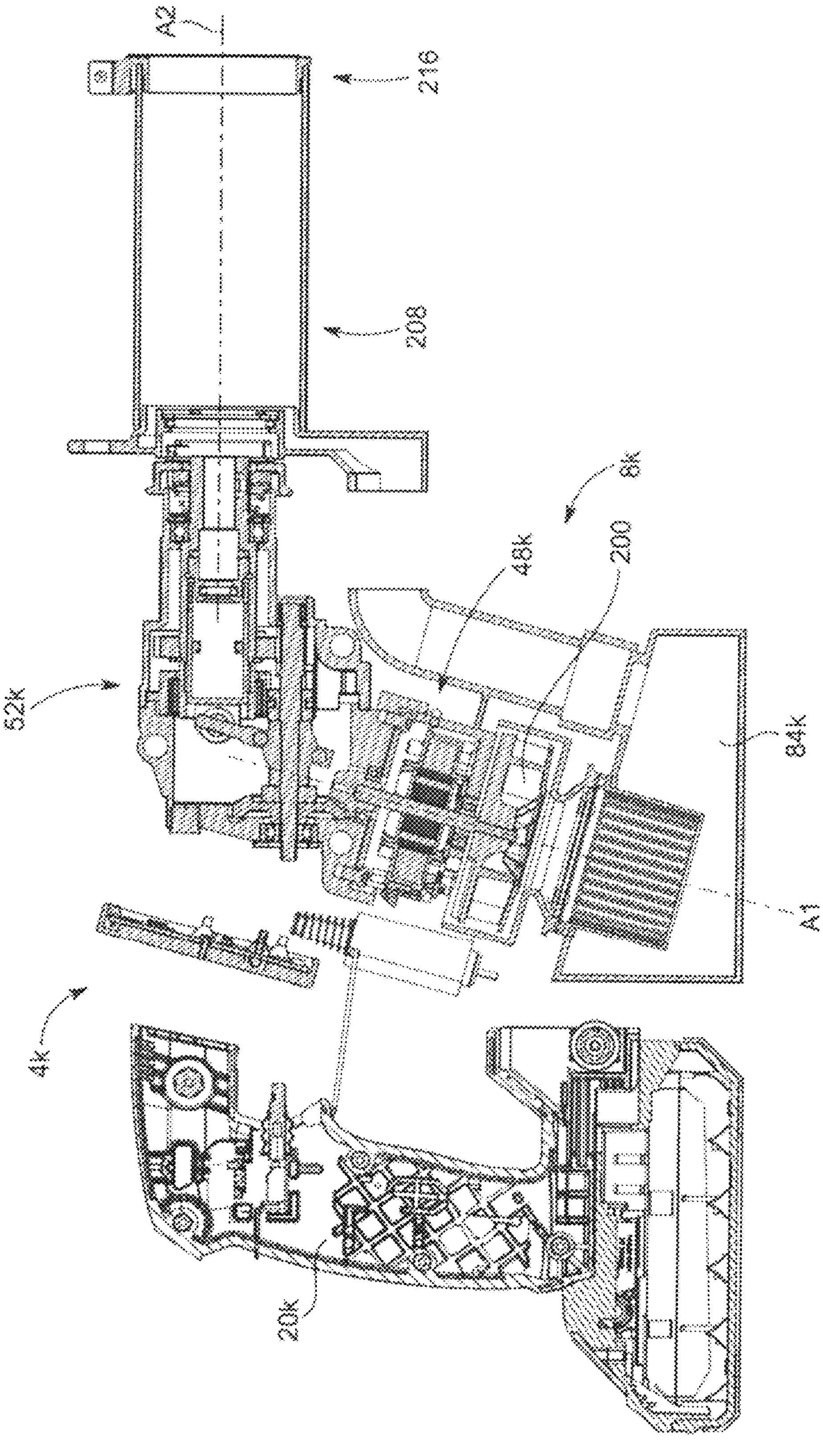
FIG. 16 is a side view of the rotary hammer of FIG. 15, with portions of the rotary hidden for clarity.

FIGS. 15-18 illustrate yet another embodiment of a rotary hammer 4*k* with an integrated dust collection assembly 8*k*, with like parts having like reference numerals plus the letter "k", and the following differences explained below. Referring to FIG. 15, the rotary hammer 4*k* includes a housing 12*k* having a main body 16*k* and a handle 20*k* extending rearward of the main body 16*k*. Referring to FIG. 16, disposed within the main body 16*k* are a motor 48*k*, a drive assembly 52*k*, and a fan 200. Each of the drive assembly 52*k* and the fan 200 are operatively coupled to the motor 48*k* for receiving torque from the motor 48*k*. The motor 48*k* is oriented within the main body 16*k* to be non-parallel with the working axis A2 of the rotary hammer 4*k*. In particular, the motor 48*k* is oriented such that the motor axis A1, defined as the rotational axis of the motor 48*k*, is transverse to the working axis A2 of the rotary hammer 4*k*. In some embodiments, the motor 48*k* may be oriented such that the motor axis A1 is vertically oriented and perpendicular to the working axis A2. The main body 16*k* of the rotary hammer 4*k* supports the dust container 84*k* at a lower half such that the motor 48*k*, the fan 200, and the dust container 84*k* are aligned along the motor axis A1 with the fan 200 disposed between the motor 48*k* and the dust container 84*k*.

Figure 17:
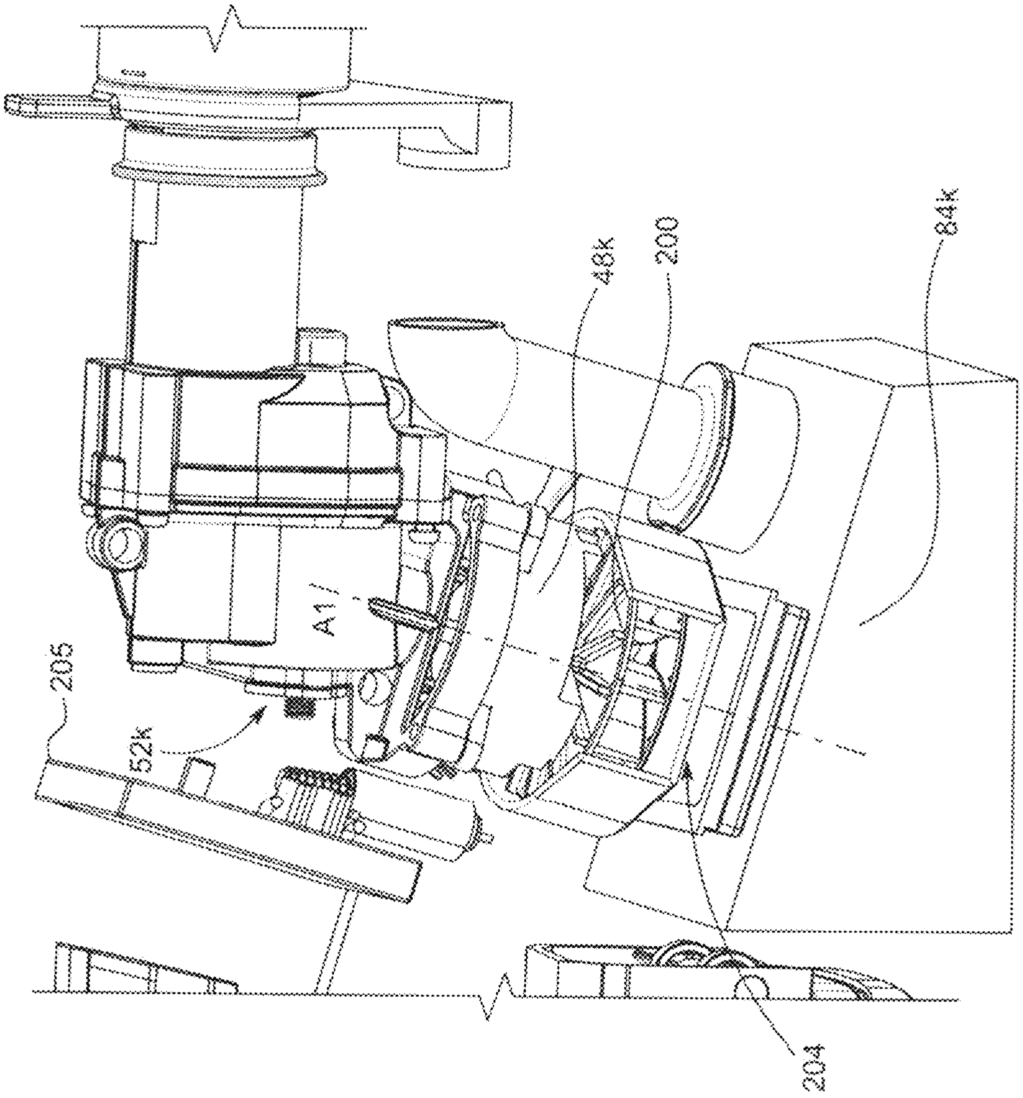
FIG. 17 is detail view of a portion of the rotary hammer of FIG. 15 illustrating the motor and fan.
Figure 18:
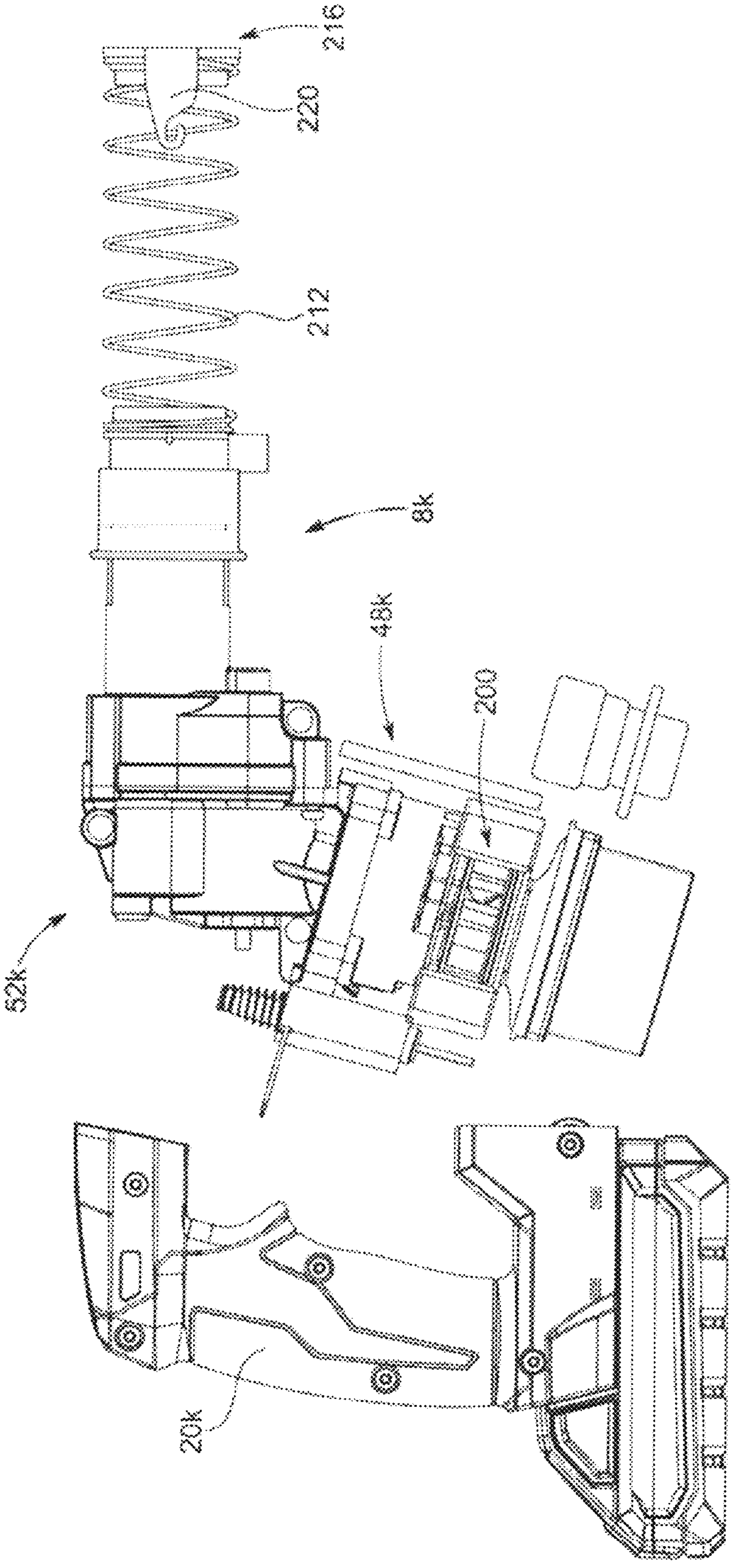
FIG. 18 is a side view of the rotary hammer of FIG. 15 with portions of the rotary hammer hidden for clarity.

With reference to FIG. 17, the fan 200 is a bi-axial fan. Torque from the motor 48*k* causes rotation of the fan 200 which draws air towards the fan 200. In the illustrated embodiment, air enters the fan 200 along the rotational axis A1 of the fan 200 from two opposing directions, as shown by the arrows in FIG. 17. Specifically, a first air flow enters the fan 200 from a top side of the fan 200 while a second air flow enters the fan 200 from a bottom side of the fan 200. Once the air reaches the fan 200, the air is directed radially outwards from the fan 200 to be exhausted. In particular, the fan 200 draws cooling air into the rotary hammer 4K through openings in the housing of the rotary hammer 4K. The cooling airflow is then drawn over the motor 48*k* to cool the motor 48K. The fan 200 may further draw cooling air across a controller 205 to cool the controller 205. After passing one or both the motor 48K and the controller 205, the cooling airflow enters the fan 200 from a top side of the fan 200.

The fan 200 also creates a suction air flow in which air is directed through the dust collection assembly 8*k* toward the fan 200, in an opposite direction of the cooling air flow, before being directed radially out the exhaust 204. Rotation of the fan 200 simultaneously creates the motor cooling air flow and the suction air flow. In some embodiments, the cooling air flow and the dust extraction air flow may be two separate streams of air, which are isolated from one another until merging within the fan 200 and being exhausted together as a merged air flow stream. In some embodiments, the cooling air flow is directed over other components (e.g., circuit boards) of the rotary hammer 4*k* to cool these components as well. As will be described in greater detail later, the suction air flow draws dust and/or debris into the dust container.

Figure 19:
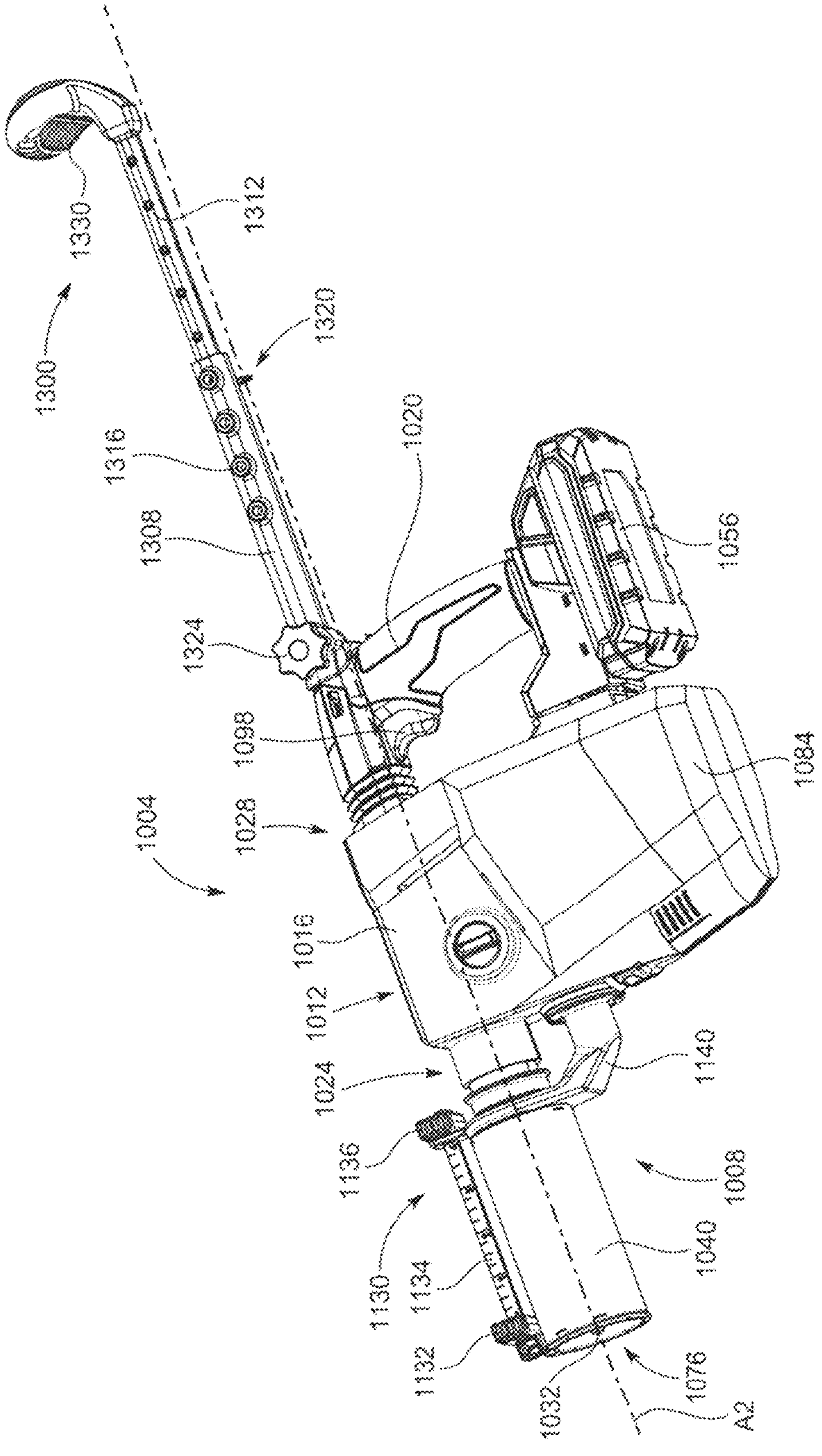
FIG. 19 is a first perspective view of a rotary hammer including an integrated dust collection assembly according to yet another embodiment.

With reference to FIGS. 15-18, the dust collection assembly 8*k* includes a collapsible suction pipe 208 in place of the telescoping suction pipe 40. The collapsible suction pipe 208 is configured to be selectively coupled to the housing 12*k* of the rotary hammer 4*k* and to surround the tool bit 32*k*. In other words, the dust collection assembly 8*k* utilizes an over-bit suction pipe 208. In the illustrated embodiment, the collapsible suction pipe 208 is secured to the housing 12*k* via a snap fit. However, other securement methods, such as a threaded connection or a latch connection, will be understood by one of ordinary skill in the art to perform the same function as the snap fit and may be used in place of the snap fit. With reference to FIG. 19, the collapsible suction pipe 208 includes a biasing member 212, illustrated as a spring, configured to bias the suction pipe 208 to an extended state. As the tool bit 32*k* is inserted into a workpiece, a front end 216 of the suction pipe 208 will engage the workpiece. Further insertion of the tool bit 32*k* into the workpiece results in the suction pipe 208 collapsing, or folding, against the force of the spring 212 while the front end 216 maintains contact with the workpiece. The entirety of the collapsible suction pipe 208 remains outside of the housing 12*k* of the rotary hammer 4*k*, even when collapsed, thereby creating more room for the other components of the rotary hammer 4*k* within the housing 12*k* without increasing the overall size of the housing 12*k*.

In some embodiments, the collapsible suction pipe 208 further includes a locking mechanism 220, illustrated as a hook, to selectively secure the collapsible suction pipe 208 in the collapsed state. When collapsed, the hook 220 engages a corresponding lock on the housing 12*k* to counteract the force from the biasing spring 212. Securement of the suction pipe 208 in the collapsed state allows for easy changing of the tool bit 32*k* without removal of the collapsible suction pipe 208 from the housing 12*k*.

When the collapsible suction pipe 208 is secured to the housing 12*k*, an uninterrupted fluid pathway is formed between an opening in the front end 216 of the suction pipe 208 and the fan 200. Therefore, the suction air flow draws dust and/or debris created by the tool bit 32*k* through the collapsible suction pipe 208 and into the dust container 84*k* before the air is combined with the motor cooling air flow to be expelled through the exhaust 204.

Figure 20:
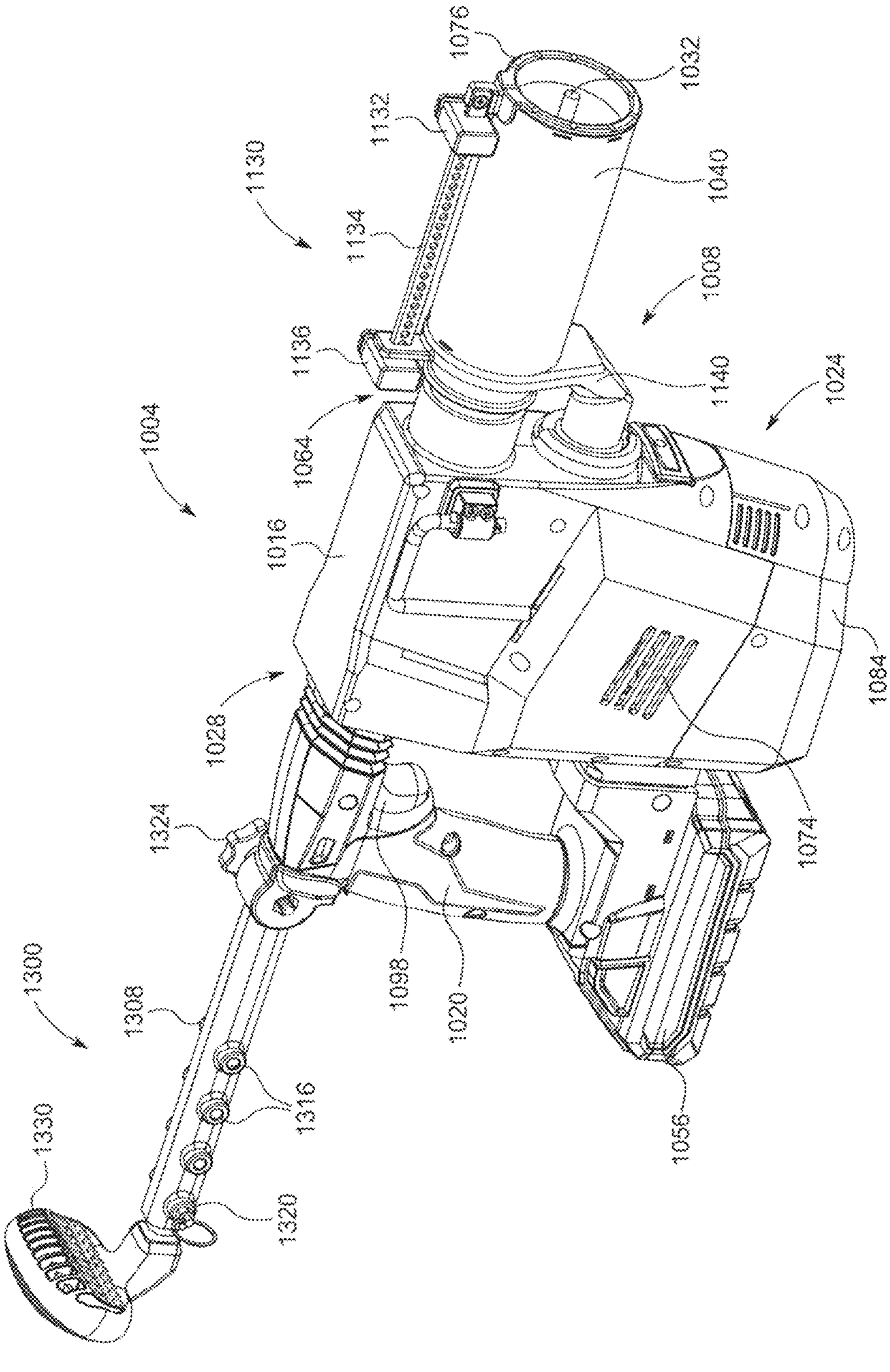
FIG. 20 is a second perspective view of the rotary hammer shown in FIG. 19.
Figure 21:
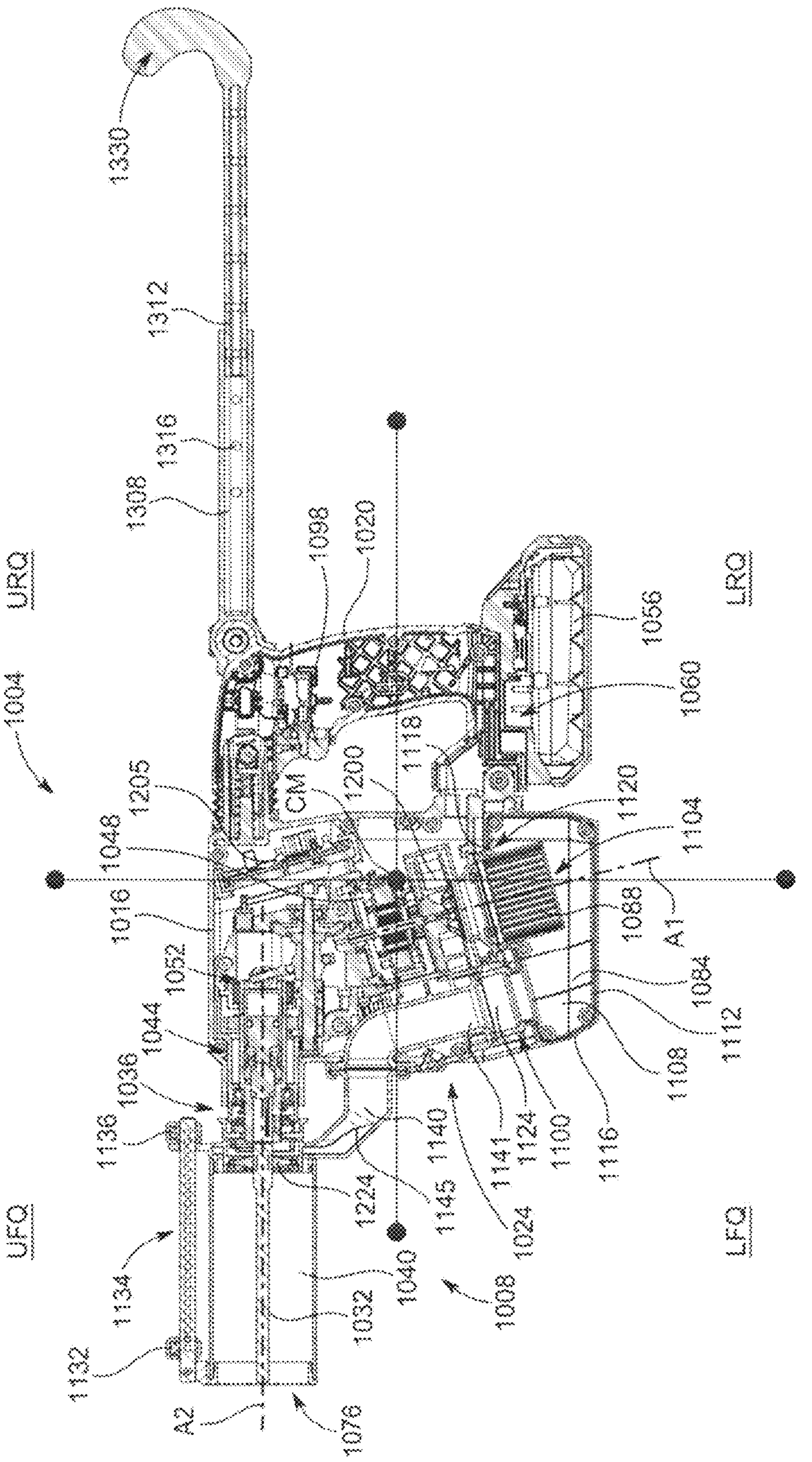
FIG. 21 is a cross-sectional view of the rotary hammer of FIG. 20.

FIGS. 19-21 illustrate a power tool, such as a rotary hammer 1004, according to another embodiment of the present disclosure. The illustrated rotary hammer 1004 includes a dust collection assembly 1008 integrated within the body of the tool. In some embodiments, one or more portion of the dust collection assembly 1008 may be realized as a separate element from the rotary hammer 1004 or may be positioned externally of the rotary hammer 1004.

The rotary hammer 1004 includes a housing 1012 having a main body 1016 and a handle 1020 extending rearward of the main body 1016. The main body 1016 includes a first end 1024 to which a tool accessory may be coupled, and a second end 1028 from which the handle 1020 extends. The tool accessory may be, for example, a tool bit 1032, a polisher, a sander, a grinder, a cutter, or any other accessory intended to operate on a worksurface, which may result in dust being expelled during machining operation of the rotary hammer 1004. The tool bit 1032 may be received within a chuck assembly 1036 formed in the first end 1024 of the main body 1016. The tool bit 1032 defines a working axis A2 (FIG. 21) of the rotary hammer 1004. The handle 1020 includes a trigger 1098 adapted to actuate the rotary hammer 1004. In the illustrated embodiment, the trigger 1098 is disposed on the handle 1020 in a position proximate the working axis A2 of the rotary hammer 1004. In other words, the vertical position (i.e., the vertical direction as shown in the Figures) of the trigger 1098 along the handle 1020 is close to or along the working axis A2 of the rotary hammer 1004. This allows the trigger 1098 to be generally aligned with the tool bit 1032 so that user's finger is also aligned with the tool bit 1032.

In some embodiments, the rotary hammer 1004 may be equipped with an auxiliary handle 1300, which is selectively coupled to a rear of the handle 1020. The auxiliary handle 1300 may help the user control the rotary hammer 1004, particular when engaging in overhead drilling or when positioned at an awkward angle relative to a working surface. For example, the auxiliary handle 1300 may function as an extension arm, which allows the user to reach farther away while still being able to hold and support the rotary hammer 1004. On the other hand, the auxiliary handle 1300 also allows the user to hold the rotary hammer 1004 closer to the user's body so that the user does not have to extend his/her arms out as far. Holding the rotary hammer 1004 closer to the user's body provides for a more secure and steady support of the rotary hammer 1004. Furthermore, like the trigger 1098, the auxiliary handle 1300 is aligned generally along the working axis A2 of the rotary hammer 1004. This arrangement provides for better aim and control of the working axis A2 all the way from one end to the other end of the rotary hammer 1004. In other words, the user has greater control and stability over the orientation of the working axis A2 and can more easily adjust and/or maintain the angle of the working axis A2 relative to the worksurface.

Figure 29:
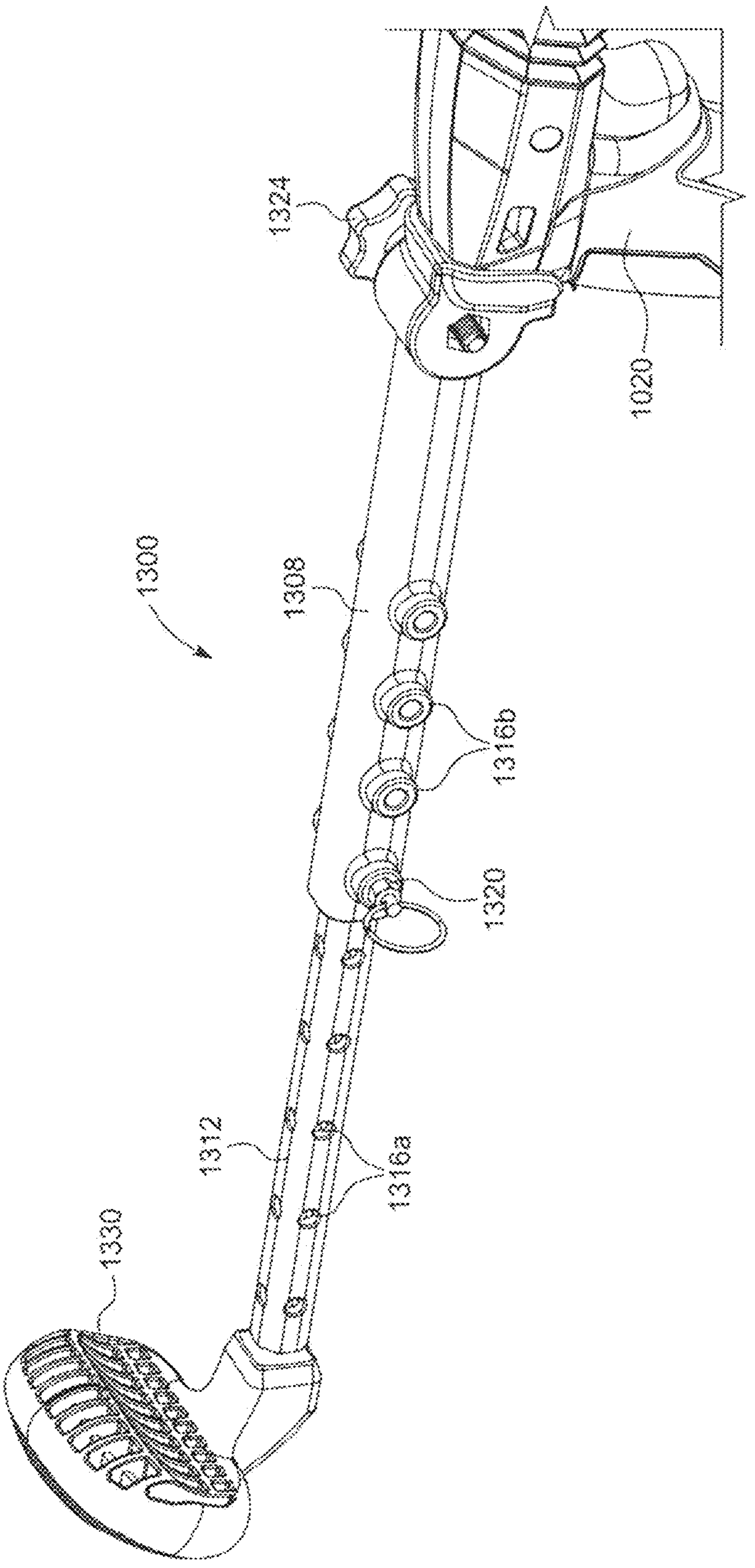
FIG. 29 is an auxiliary handle according to one embodiment.
Figure 30:
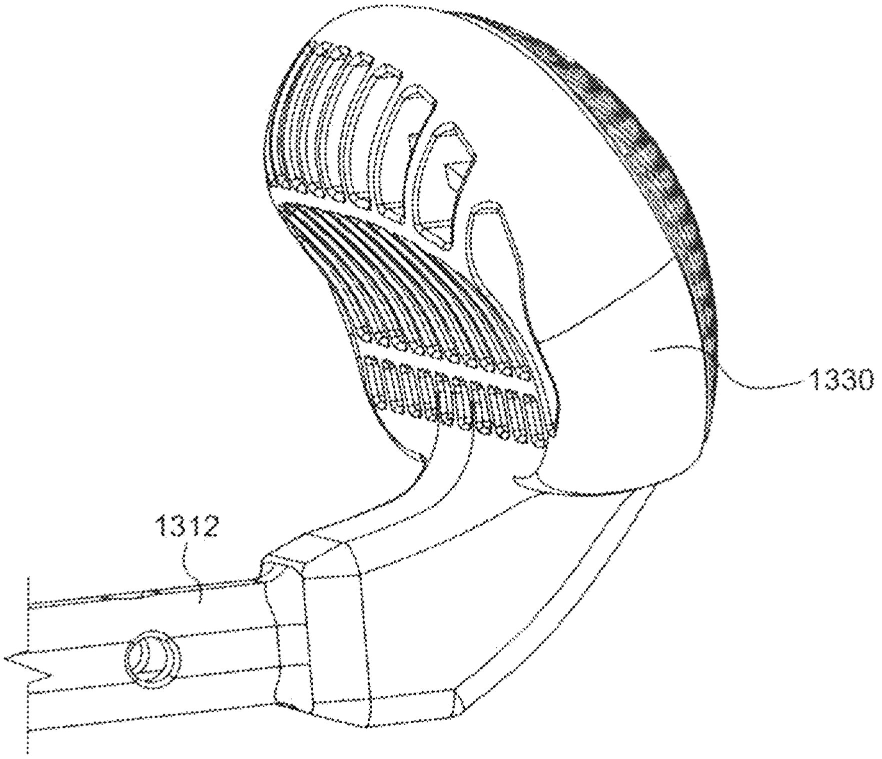
FIG. 30 is a detailed view a portion of the auxiliary handle.
Figure 31:
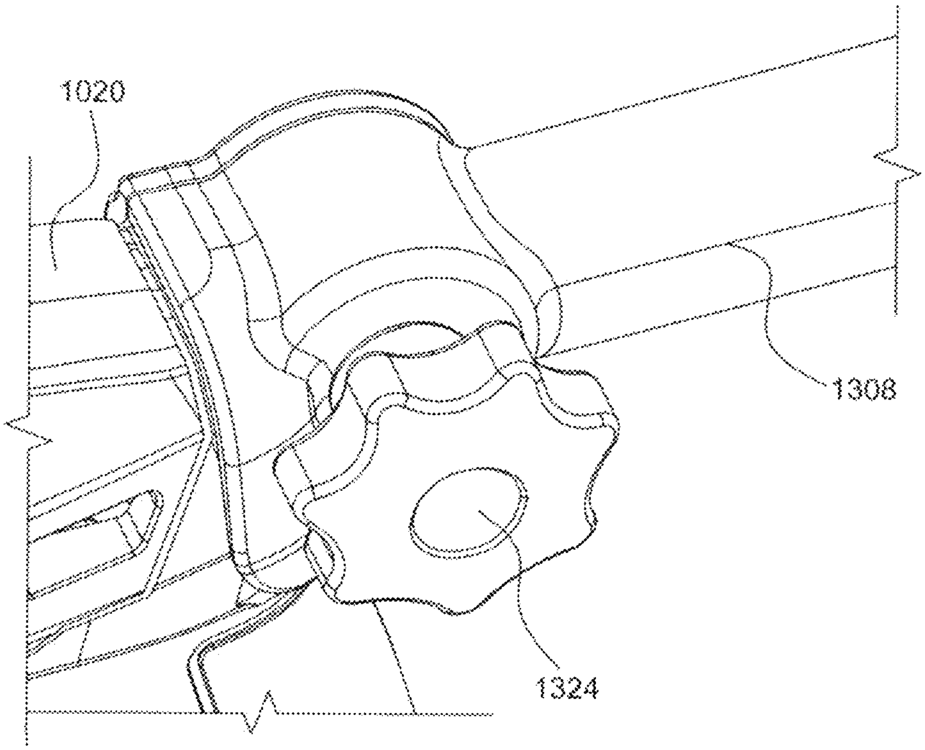
FIG. 31 is a detailed view of a connection between the auxiliary handle and the rotary hammer.

FIGS. 29-31 provide detailed views of the auxiliary handle 1300. The auxiliary handle 1300 includes a curved grip 1330, which allows a user to grasp the grip 1330 in the palm of their hands and wrap their fingers around toward the front of the grip. This style of grip allows the user to grip the auxiliary handle 1300 directly from behind to help support the weight of the rotary hammer 1004 when engaging in overhead drilling. Additionally, because the user may hold the curved grip 1330 directly from behind, it is also easier to maneuver the rotary hammer without twisting or torque their wrist. The illustrated auxiliary handle 1300 includes a telescoping body having a first shaft 1308 and a second shaft 1312 slidable within the first shaft 1308. Accordingly, the telescoping body allows the auxiliary handle 1300 to be extended to different lengths. For example, FIG. 19 illustrates the auxiliary handle 1300 in a fully extended state, while FIG. 20 illustrates the auxiliary handle 1300 in a retracted state. However, the auxiliary handle 1300 may be extended to a plurality of different lengths between the full extended and the retracted state. Specifically, the first shaft 1308 and the second shaft 1312 include securement holes 1316 that, when aligned, allow for a securement pin 1320 to secure the second shaft 1312 relative to the first shaft 1308. This helps maintain the auxiliary handle 1300 at a desired length.

Additionally, the auxiliary handle 1300 may be rotated to a stowed position when not in use. For example, the auxiliary handle 1300 may be rotated towards the top of the rotary hammer 1004 (counterclockwise in FIG. 19) and stowed along the top surface of the main body 1016. Alternatively, the auxiliary handle may be rotated towards the rear end of the handle 1020 (clockwise in FIG. 19) and stowed along the length of the handle. This may be accomplished through a rotation lock 1324, which selectively couples the auxiliary handle 1300 to the rotary hammer 1004 at various orientations. Specifically, the rotational lock 1324 both releasably couples the auxiliary handle 1300 to the rear end of the rotary hammer 1004 and maintains the auxiliary handle 1300 in different orientations relative to the rotary hammer 1004. The rotational lock 1324 may include a hinge, which allows for rotation of the auxiliary handle 1300 relative to the rotary hammer 1004. Furthermore, the auxiliary handle 1300 may be removable from the rotary hammer 1004 altogether.

Referring to FIG. 21, the housing 1012 may be divided into quadrants defined by an upper half, a lower half, a front half, and a rear half. In the illustrated embodiment, the upper half begins proximate the electric motor 1048. Additionally, in the illustrated embodiment, the front half begins at the first end 1024 of the housing 1012 and extends to a midway point between the first end 1024 of the main body 1016 and a rear end of the handle 1020. Accordingly, this provides for an upper front quadrant (UFQ), an upper rear quadrant (URQ), a lower front quadrant (LFQ), and a lower rear quadrant (LRQ). In the illustrated embodiment, a center of mass CM of the tool is positioned proximate the intersection of the upper front quadrant (UFQ), the upper rear quadrant (URQ), the lower front quadrant (LFQ), and the lower rear quadrant (LRQ).

Figure 22:
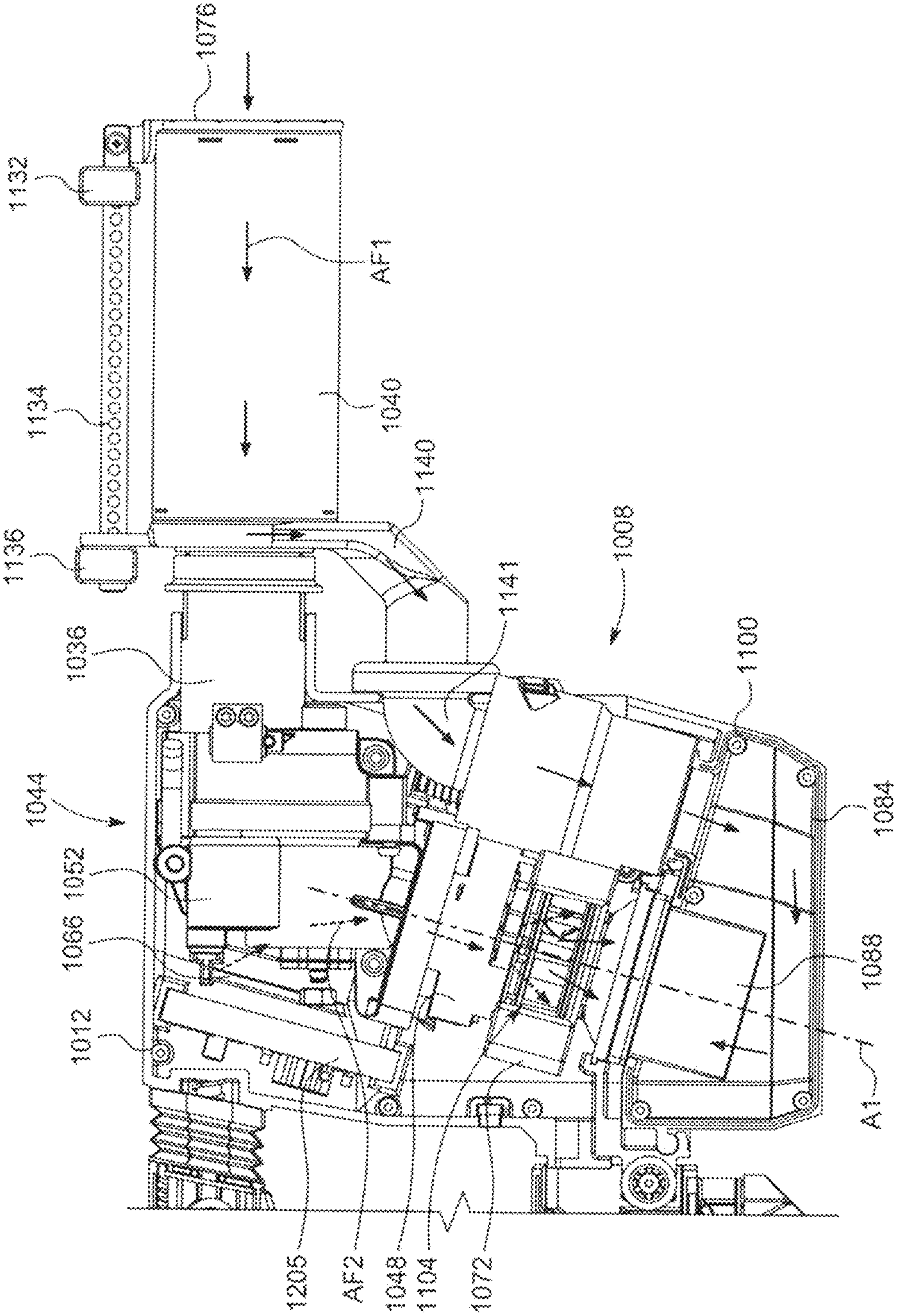
FIG. 22 is a detailed view of a drive unit and dust collection assembly from a first side.
Figure 23:
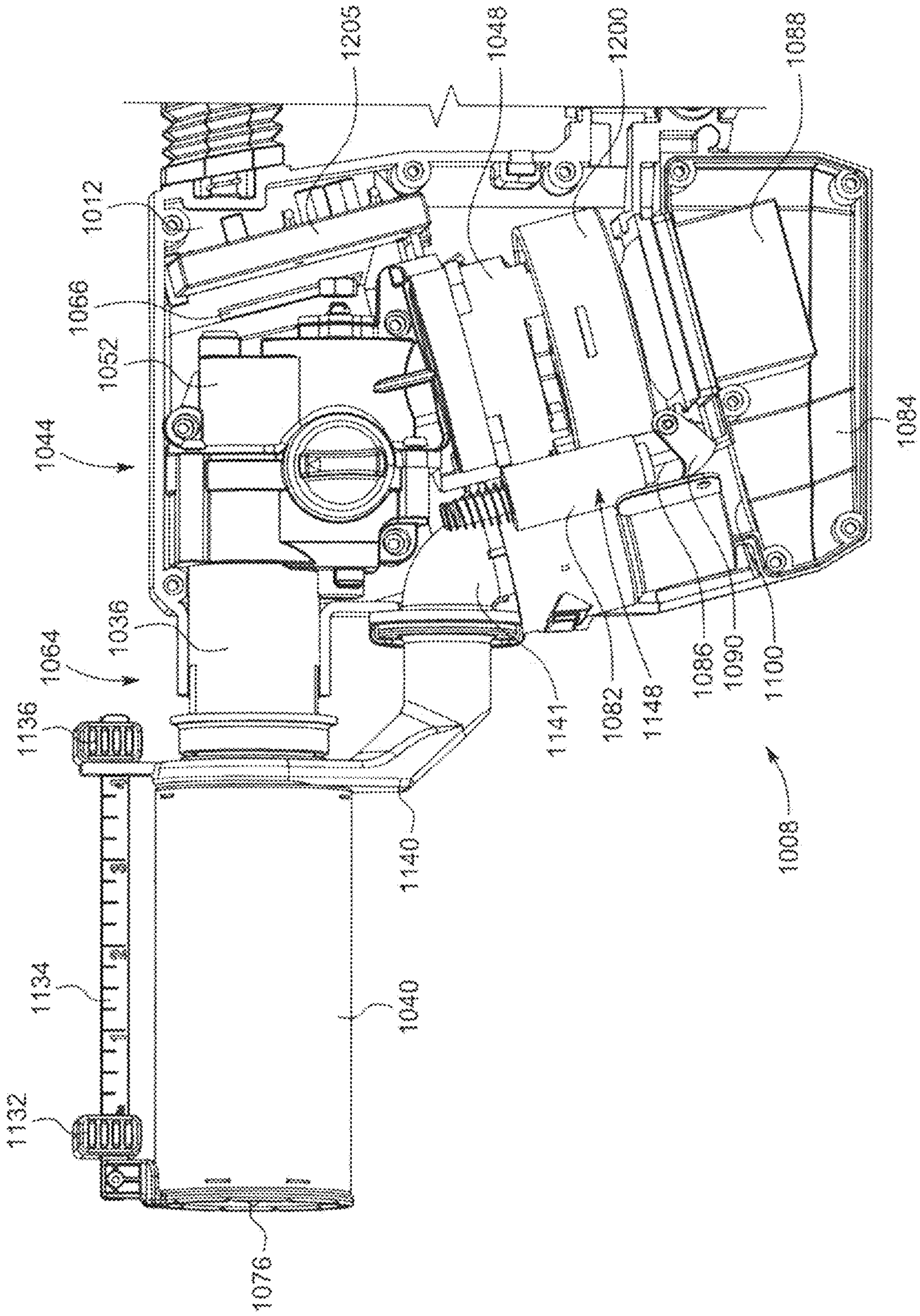
FIG. 23 is a detailed view of the drive unit and dust collection assembly from a second side.

Referring to FIGS. 21-23, a drive unit 1044 is positioned within the main body 1016 of the housing 1012. However, in other embodiments, one or more component of the drive unit 1044 may be positioned in the handle 1020. In the illustrated embodiment, the drive unit 1044 is positioned primarily within the upper half of the housing 1012. The arrangement of the drive unit 1044 provides for additional space for the dust collection assembly 1008. The drive unit 1044 includes a motor 1048 and a drive assembly 1052 operatively coupled to the motor 1048 for receiving torque from the motor 1048. The motor 1048 defines a motor axis A1 that is angled relative to the working axis A2 of the rotary hammer 1004. For example, in some embodiments, the included angle between the motor axis A1 and the working axis A2 is between 80 and 135 degrees. In some embodiments the included angle between the motor axis A1 and the working axis A2 is between 90 and 115 degrees. In some embodiments, the angle is 105 degrees. In yet other embodiments, the angle is 90 degrees so that the motor axis A1 extends perpendicular to the working axis A2. The working axis A2 of the rotary hammer 1004 is defined as the axis through the tool bit 1032 and the drive assembly 1052. In the illustrated embodiment, the motor 1048 is positioned proximate the center of mass CM. In some embodiments, the motor 1048 is positioned in the front half near the center line between the upper half and the lower half of the housing 1012.

Power for the motor 1048 is provided by a battery 1056, which may be received within a battery receptacle 1060 on a bottom portion of the handle 1020. In other embodiments, the battery receptacle 1060 may be disposed within other portions of the housing 1012. In some embodiments, the battery 1056 may be a removable rechargeable battery.

Operation of the rotary hammer 1004 is controlled by a single controller 1205. The illustrated controller 1205 controls both the motor 1048 as well as the dust collection assembly 1008. However, in other embodiments, there may be two or more controllers included in the rotary hammer 1004 for separately controlling various components of the drive unit 1044 and the dust collection assembly 1008. The controller 1205 is located in the upper rear quadrant (URQ). In particular, the controller 1205 is positioned behind the drive assembly 1052 and above the motor 1048.

A fan 1200 is operably coupled to the motor 1048 and shares a rotational axis with the motor axis A1. The motor 1048 thereby drives both the drive assembly 1052 and the fan 1200. In the illustrated embodiment, the fan 1200 is positioned below the motor 1048 and the drive assembly 1052. Therefore, in the illustrated embodiment, the fan 1200 is positioned below the center of mass of the rotary hammer 1004. As will be described in further detail herein, the fan 1200 draws air along a cooling air flow path which extends across the motor 1048 to cool the motor 1048. In some embodiments, the cooling air flow path is directed over other components (e.g., controller 1205, circuit boards) of the rotary hammer 1004 to cool these components as well. Simultaneously, the fan 1200 draws air along a suction air flow path to draw dust and/or debris into the dust collection assembly 1008. However, in other embodiments, there may be two separate fans generating a cooling air flow and a dust collection air flow.

The rotary hammer 1004 also includes a dust collection assembly 1008. In the illustrated embodiment, the dust collection assembly 1008 is integrated within the main body 1016 of the rotary hammer 1004. However, in other embodiments, one or more part of the dust collection assembly 1008 may be positioned within the handle 1020 or externally of the housing 1012. The dust collection assembly 1008 includes a nozzle 1076, a dust tube 1040, a dust container 1084, a filter 1088, and the fan 1200.

Figure 24:
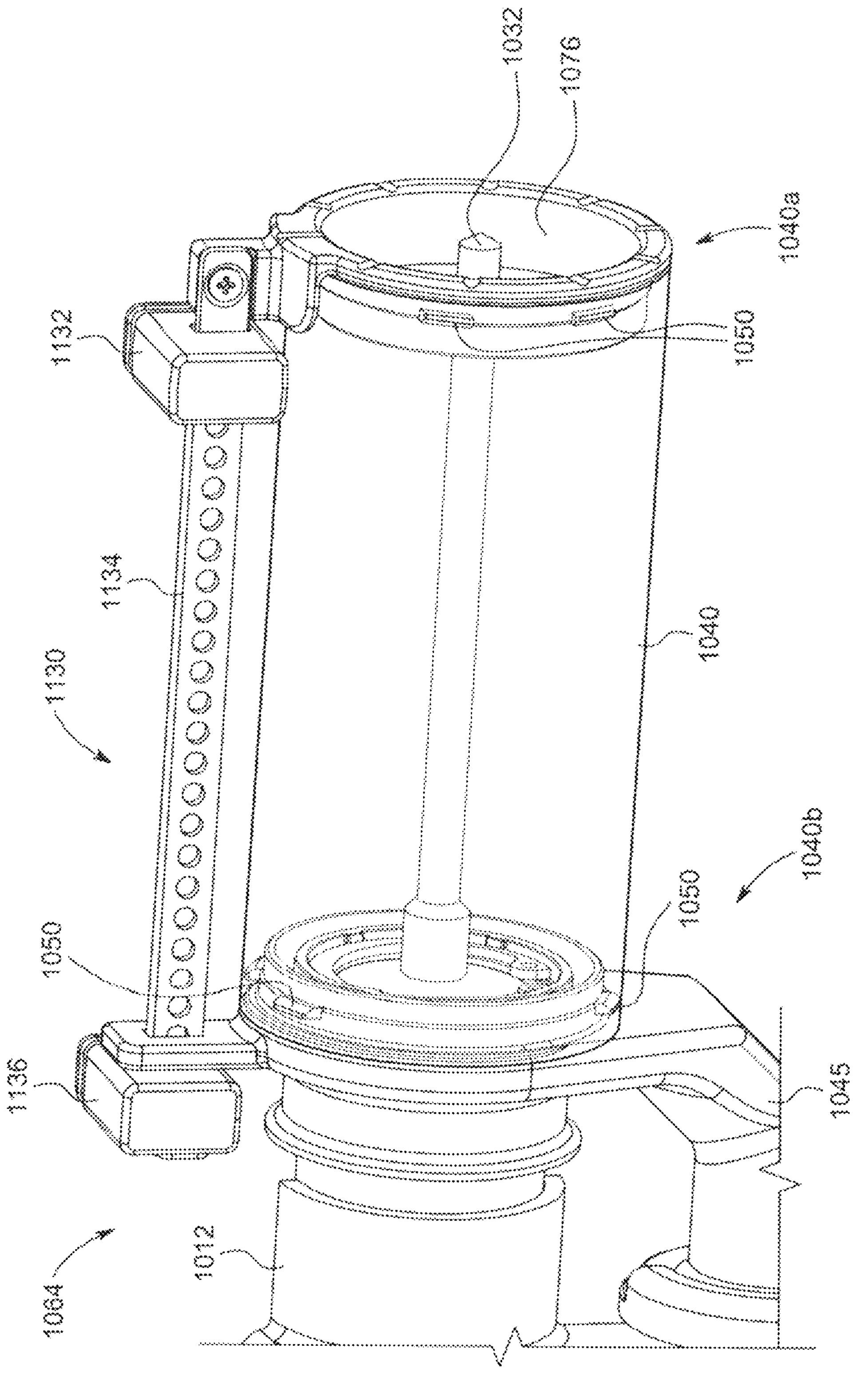
FIG. 24 is a detailed view of a dust tube.

As shown in FIG. 24, the nozzle 1076 is located at a first end 1040*a* of the dust tube 1040. The nozzle 1076 and the dust tube 1040 surround at least a portion of the tool bit 1032 of the rotary hammer 1004. In other words, the dust collection assembly 1008 utilizes an over-bit dust tube 1040. Additionally, in the illustrated embodiment, the dust tube 1040 is a collapsible style dust tube. In other words, the dust tube 1040 is composed of a compressible material that may expand and collapse in an accordion style manner. A spring, such as the spring 212, biases the dust tube 1040 towards an expanded position. As the tool bit 1032 is inserted into a workpiece, the nozzle 1076 will engage the workpiece. Further insertion of the tool bit 1032 into the workpiece results in the dust tube 1040 collapsing, or folding, against the force of the spring 212 while the nozzle 1076 maintains contact with the workpiece.

In some embodiments, a depth stop 1130 is coupled to the dust tube 1040 to limit the extent to which the tool bit 1032 can be inserted into a workpiece. The depth stop 1130 includes a plunge depth stop 1132, which limits the extent to which the dust tube 1040 may retract, and in turn, limits the extent to which the tool bit 1032 can plunge into the workpiece. The plunge depth stop 1132 is movable along a length of a rule 1134 coupled to the dust tube 1040 and is selectively fixed to limit the extent to which the dust tube 1040 may retract. Also included on an extension stop 1136. The extension stop 1136 limits the extent to which the dust tube 1040 may extend by selectively fixing to the rule 1134. This feature can be used to adjust an extension length of the dust tube 1040 to correspond to the size of the tool bit 1032 being used. Furthermore, in some embodiments, the dust tube 1040 may not include a depth stop 1130 or may only include one of the plunge depth stop 1132 or the extension stop 1136.

Furthermore, in some embodiments, the dust tube 1040 may also be equipped with a locking mechanism 220, as shown in an earlier embodiment, to maintain the dust tube 1040 in a collapsed state. However, in other embodiments, the dust tube 1040 may be a sliding style dust tube or a telescoping dust tube (e.g., as shown in FIGS. 3A and 3B) rather than a collapsible dust tube. Additionally, in other embodiments, the dust tube 1040 may be arranged adjacent to the tool bit 1032 instead of being configured as an over-bit dust tube 1040. For example, the dust tube 1040 may be arranged above, below, or on the side of the tool bit 1032 with only the nozzle 1076 extending over the tool bit 1032.

With continued reference to FIG. 24, a first end of the dust tube 1040 is coupled to the nozzle 1076 and a second end 1040*b* of the dust tube 1040 is coupled to the housing 1012 of the rotary hammer 1004. In the illustrated embodiment, the second end 1040*b* of the dust tube 1040 is coupled to the housing 1012 via an exterior transfer tube 1140. The dust tube 1040 is secured to the nozzle 1076 and exterior transfer tube 1140 by tabs 1050 which help retain and support the dust tube 1040 at each end. In turn, the exterior transfer tube 1140 is removably coupled to the housing 1012 via a combination of a snap fit and rotational connection.

Figure 25:
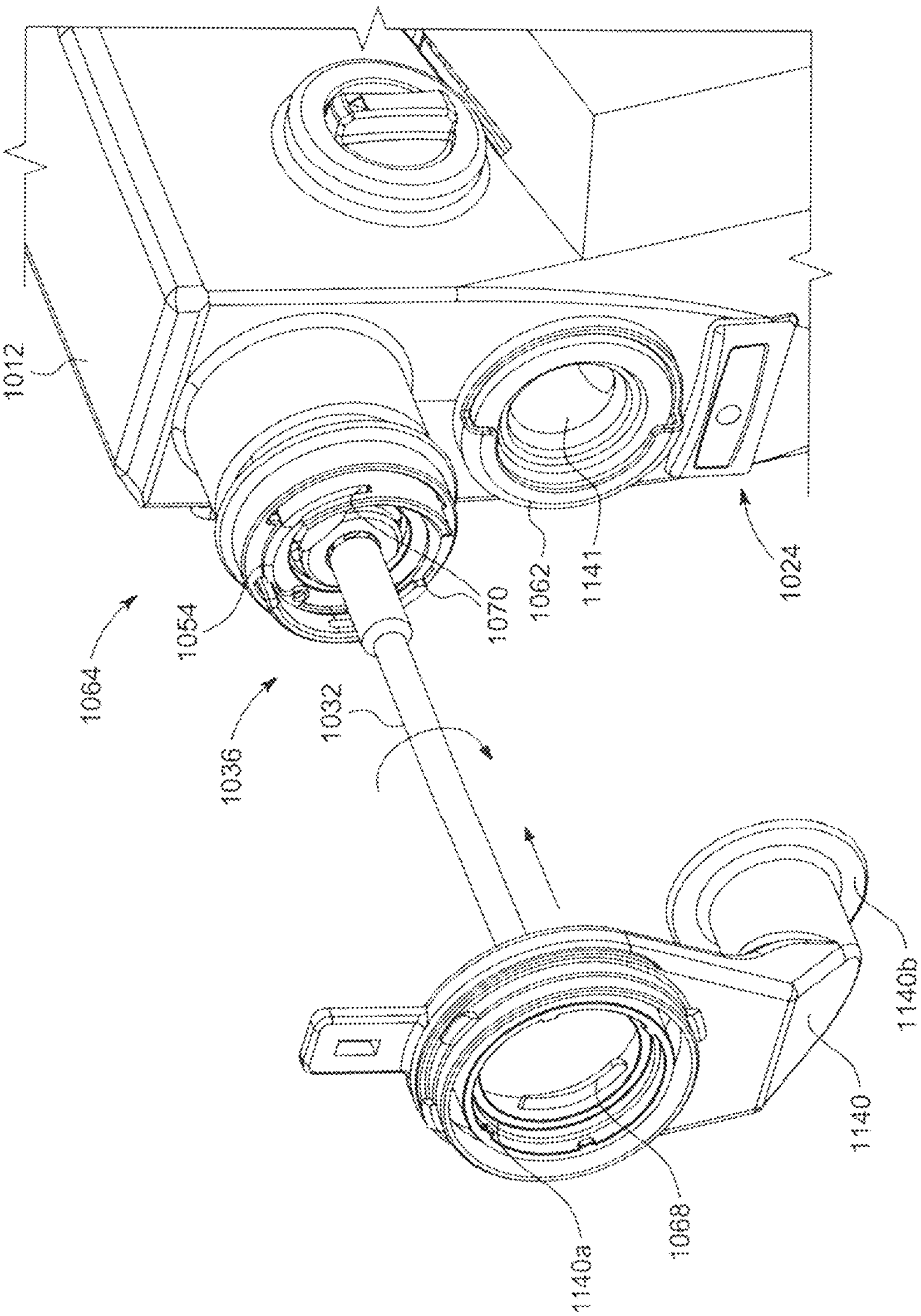
FIG. 25 is a detailed view of a portion of a dust transfer tube.

As illustrated in FIG. 25, the exterior transfer tube 1140 is first snap fit onto the first end 1024 of the housing 1012 and then rotated (e.g., clockwise in FIG. 25) to secure the exterior transfer tube 1140 to the housing 1012. Specifically, a first end 1140*a* of the exterior transfer tube 1140 is snap fit onto the housing 1012 while a second end 1140*b* of the exterior transfer tube 1140 is rotated into a locked position. The first end 1140*a* of the exterior transfer tube 1140 forms a collar, which may be is snap fit onto a nose 1064 of the rotary hammer 1004 by a snap ring 1054. The snap fit is accomplished by moving the exterior transfer tube 1140 linearly until a snap ring 1054 axially locks the first end 1140*a* of the exterior transfer tube 1140 to the housing 1012. Once secured to the housing 1012, the first end 1140*a* of the exterior transfer tube 1140 (i.e., the collar) surrounds the circumference of the nose 1064 such that the chuck assembly 1036 and/or tool bit 1032 extend through an opening in the first end 1140*a* of the exterior transfer tube 1140.

In order to rotationally lock the exterior transfer tube 1140, the exterior transfer tube 1140 is rotated until it reaches a locked position. To accomplish this, the first end 1140*a* of the exterior transfer tube 1140 includes one or more annular projection 1068 formed within the opening of the collar which are received within corresponding annular recesses 1070 on the nose 1064 of the rotary hammer 1004 to help rotational engagement therebetween. The exterior transfer tube 1140 is rotated until the second end 1140*b* is received within an annular groove 1062 formed on the first end 1024 of the housing 1012. The annular groove 1062 prevents further rotation of the exterior transfer tube 1140 relative to the housing 1012. Furthermore, the annular groove 1062 helps align the second end 1140*b* of the exterior transfer tube 1140 with an opening in the housing 1012 that meets an internal transfer tube 1141. Together, the external transfer tube 1140 and the internal transfer tube 1141 lead dust laden air from the dust tube 1040 into the dust container 1084. The second end 1140*b* of the exterior transfer tube 1140 is fluidly connected to the internal transfer tube 1141 in order to form an airtight connection. It should be understood by one of ordinary skill in the art that other securement methods, such as a threaded or latch connection, which perform the same function as the snap fit and rotational connection may be used in the alternative.

Figure 26:
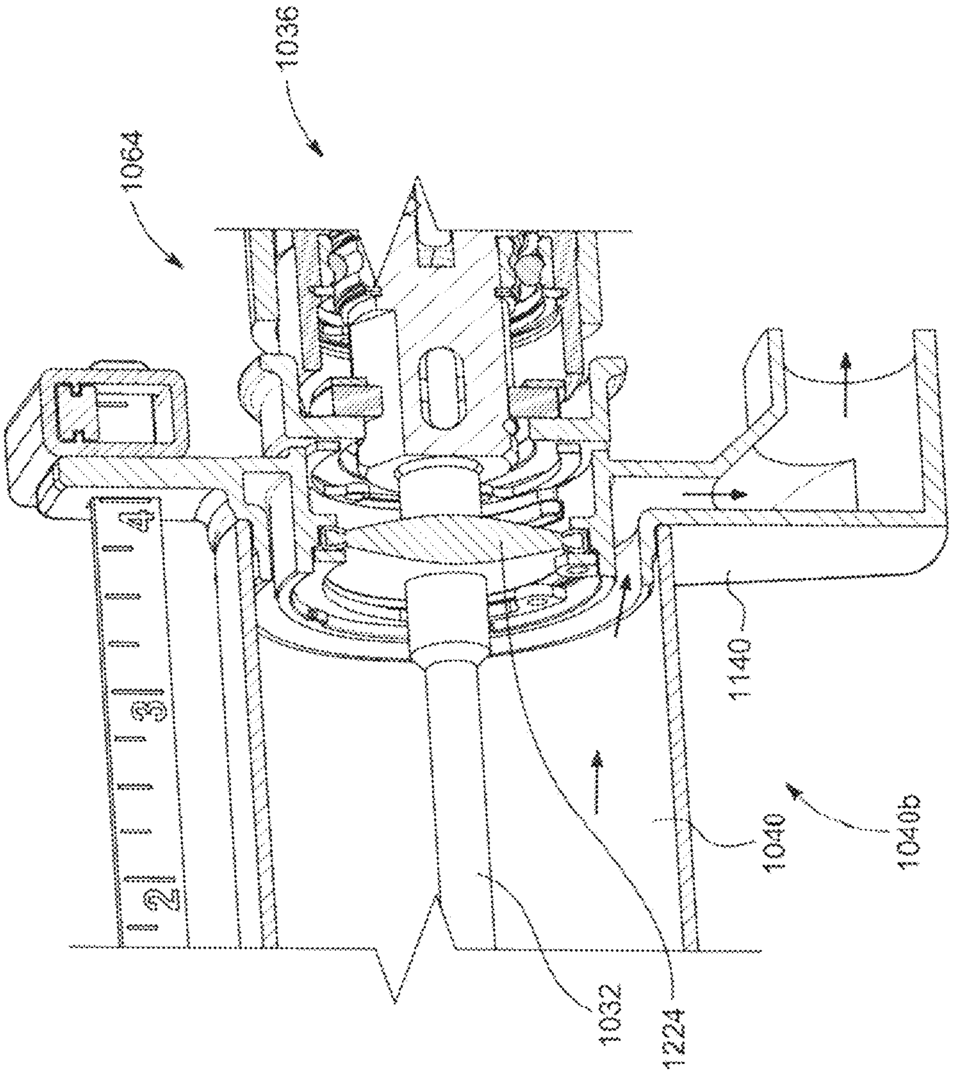
FIG. 26 is a detailed view of a connection between the dust tube and the nose of the rotary hammer.

As shown in FIG. 26, the rotary hammer 1004 includes a brush seal 1224 disposed within the dust tube 1040 to prevent dust from entering the main body 1016 via the chuck assembly 1036. In the illustrated embodiment, the brush seal 1224 is positioned proximate the second end 1040*b* of the dust tube 1040, which connects to the housing 1012. However, in other embodiments, the brush seal 1224 may be disposed within a bit retention area of the housing 1012, rather than within the dust tube 1040. In yet another embodiment, the brush seal 1224 may be disposed proximate the first end 1040*a* of the dust tube 1040. The illustrated brush seal 1224 surrounds and engages a portion of the tool bit 1032 to prevent dust and/or debris that is drawn into the dust tube 1040 from entering the housing 1012. The brush seal 1224 prevents the dust transferred via the dust extractor air flow to enter through the nose 1064 of the tool and/or the bit retention assembly 1036. Rather, air will flow through the dust tube 1040, through the exterior transfer tube 1140, through the interior transfer tube 1141, and into the dust container 1084 without entering the chamber of the main body 1016 that houses the drive unit 1044 and the controller 1205.

Referring back to FIGS. 21-23, the exterior transfer tube 1140 extends from the dust tube 1040 to the housing 1012, and the interior transfer tube 1141 extends from the exterior transfer tube 1140 to the inlet 1100 of the dust container 1084. Together, the exterior transfer tube 1140 and the interior transfer tube 1141 form the dust transfer tube 1145. As discussed, the exterior transfer tube 1140 is selectively coupled to the dust tube 1040 and the nose 1064 of the rotary hammer 1004 to create the suction air flow path for the dust extractor. The interior transfer tube 1141 extends along the first end 1024 of the main body 1016 from the upper portion to the lower portion, at which point it is coupled to the inlet 1100 of the dust container 1084.

The dust container 1084 is selectively attachable to the housing 1012. The dust container 1084 is detachable from the housing 1012 of the rotary hammer 1004 and may be removed to allow an operator to empty the dust or other debris from the dust container 1084. In the illustrated embodiment, the dust container 1084 is prevented from being secured to the housing 1012 without the filter 1088 in place. For example, the filter 1088 acts as a portion of the connection between the dust container 1084 and the housing 1012. Thus, without the filter 1088 in place, the dust container 1084 is prevented from being coupled to the housing 1012. The filter 1088 is connected to a bottom side of the fan 1200. In particular, the filter 1088 is connected to a shroud 1072 of the fan 1200 that extends around the circumference of the fan 1200 and below the fan 1200. Both the fan 1200 and the filter 1088 are positioned in the lower portion of the main body 1016 below the center of mass (CM).

The dust container 1084 includes an inlet 1100 for a dust laden air stream and an outlet 1104 defined by an outlet end of the filter 1088. More specifically, the dust container 1084 includes opposite side walls 1108 and a bottom wall 1112 extending between the side walls 1108. The dust container 1084 additionally includes end walls 1116 adjacent each of the side walls 1108 and the bottom wall 1112. An opening 1120 is defined in a top wall 1118 through which the filter 1088 is received. The top wall 1118 further includes an inlet 1100 for dust laden air. A connection port 1124 extends through the inlet 1100 to direct dust laden air from the dust tube 1040 into the dust container 1084. In some embodiments, the connection port 1124 is a DEC 26 connection. The dust container 1084 is operable to collect dust and other debris from a workpiece during drilling and/or hammering operation performed by the rotary hammer 1004 to maintain a user's work area substantially clear of dust and other debris.

As previously mentioned, the fan 1200 creates both a suction air flow path (AF1) and a cooling air flow path (AF2). The fan 1200 is a bi-axial, radial exhaust fan positioned between the motor 1048 and the filter 1088. The fan 1200 is mounted to an output shaft of the motor 1048 such that torque from the motor 1048 drives rotation of the fan 1200. Accordingly, the rotational axis of the fan 1200 is coaxial with the motor axis A1. As best shown in FIG. 22, air enters the fan 1200 along the rotational axis A1 of the fan 1200 from two opposing directions. Specifically, the cooling air flow path (AF2) enters the fan 1200 from a top side of the fan 1200 while the suction air flow path (AF1) enters the fan 1200 from a bottom side of the fan 1200. Once the air from either air flow path reaches the fan 1200, the air is directed radially outwards from the fan 1200 to be exhausted.

In particular, the fan 1200 draws cooling air into the rotary hammer 1004 through inlet openings 1066 in the housing 1012 of the rotary hammer 1004. The cooling airflow (AF2) is then drawn over the motor 1048 to cool the motor 1048. In some embodiments, an inner surface of the housing 1012 includes a rib to guide the cooling airflow (AF2) into the motor 1048, thereby ensuring that the cooling airflow (AF2) passes over the motor 1048. The fan 1200 may further draw cooling air across a controller 1205 to cool the controller 1205. After passing one or both the motor 1048 and the controller 1205, the cooling airflow (AF2) enters the fan 1200 from a top side of the fan 1200 and exits radially through an outlet 1104 of the fan 1200. The cooling air flow (AF2) is then exhausted from the rotary hammer 1004 through outlet openings 1074 (FIG. 20) in the housing 1012 of the rotary hammer 1004. Specifically, the outlet 1104 is formed as a radial opening in a shroud 1072 of the fan 1200, which is aligned with the outlet openings 1074 to direct air exterior of the rotary hammer 1004. In some embodiments, the outlet openings 1074 are provided on a single side of the housing 1012, and the outlet 1104 of the shroud 1072 is provided on a single side of the housing 1012.

The fan 1200 also creates a suction air flow (AF1) in which air is directed through the dust collection assembly 1008 toward the fan 1200, in an opposite direction of the cooling air flow (AF2), before being directed radially out the exhaust 1204. In particular, air is suctioned into the nozzle 1076, through the dust tube 1040, through the dust transfer tube 1045 (i.e., the exterior transfer tube 1140 and the interior transfer tube 1141), and into the dust container 1084 where the dust is trapped. Clean air is the drawn up through the filter 1088 into the fan 1200 and exhausted through the outlet 1104 and openings 1074. After dust is separated from the air via the filter 1088, the clean air is exhausted. In some embodiments, the filter 1088 is a high efficiency particulate air ("HEPA") filter.

Figure 27:
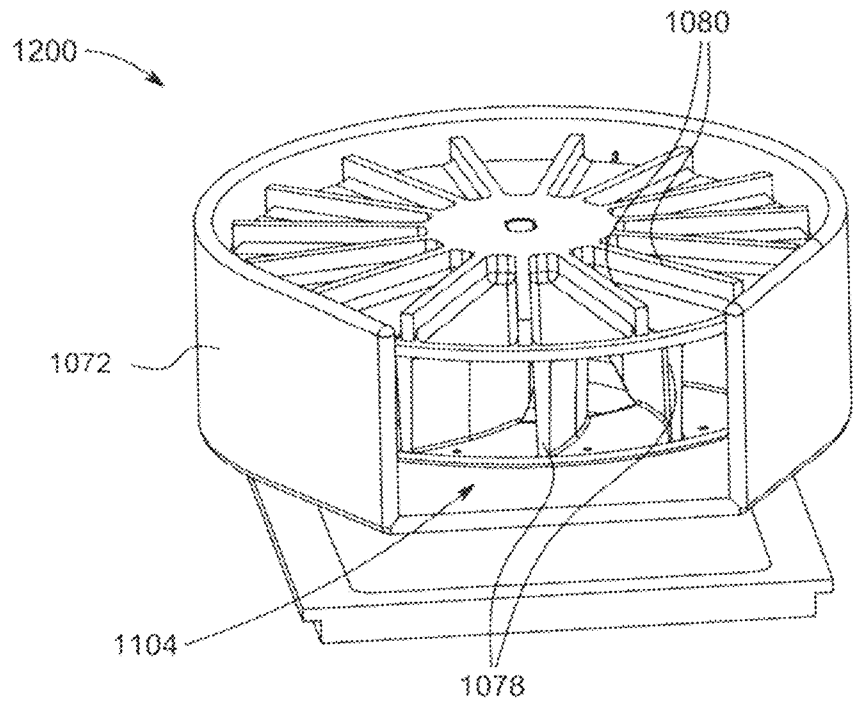
FIG. 27 is a detailed view of a fan according to one embodiment.

Accordingly, rotation of the fan 1200 simultaneously creates the suction air flow (AF1) and the cooling air flow (AF2). In the illustrated embodiment, the fan 1200 is a dual finned fan with a first set of fan blades 1078 and a second set of fan blades 1080, as best shown in FIG. 27. The first set of fan blades 1078 is used to create the suction air flow (AF1) and the second set of fan blades 1080 is used to create the cooling air flow (AF2). However, other types of fans may be used to create one or both airflows. For example, in some embodiments, a fan having a single set of fan blades may create both the suction airflow (AF1) and the cooling airflow (AF2). In some embodiments, the cooling air flow (AF2) and the dust extraction air flow (AF2) may be two separate streams of air, which are isolated from one another until merging within the fan 1200 and being exhausted together as a merged air flow stream. In some embodiments, the cooling air flow is directed over other components (e.g., circuit boards) of the rotary hammer 1004 to cool these components as well.

In some embodiments, the dust collection assembly 1008 may have additional features. For example, in the illustrated embodiment, the hall board for the motor 1048 is positioned between the motor 1048 and the fan 1200. Additionally, a bearing 1202 supporting the output shaft of the motor 1048 is also disposed between the motor 1048 and the fan 1200 so that the cooling air flow travels over the bearing 1202. This arrangement allows air from the suction air flow to move from the dust tube 1040 into the filter 1088 and through the fan 1200 without having to be guided around any bearings. Furthermore, this arrangement causes the cooling air to cool the motor 1048 and/or the fan to move through the stator of the motor 1048 and guided around the bearing support structure before reaching the fan 1200.

The dust collection assembly 1008 may further include a filter cleaning mechanism 1148 (FIG. 23), which clears dust from the filter 1088. In one embodiment, the filter cleaning mechanism 1148 includes a solenoid 1082, which is activated to extend a pin 1086. The pin 1086, in turn, engages an anvil 1090, which rotates to knock on the filter 1088 and release debris. As mentioned above, the controller 1205 is adapted to operate the dust collection assembly 1008 and the drive unit 1044. This allows for coordination between both assemblies. In one embodiment, the filter cleaning mechanism 1148 is automatically actuated when the fan 1200 transitions from an active state to an inactive state. In another embodiment, the filter cleaning mechanism 1148 is automatically actuated when the motor 1048 transitions from an active state to an inactive state. As used herein, the fan 1200 transitions from the active state to the inactive state when the fan 1200 stops rotating, or when the fan 1200 slows to a rotational speed below a predetermined threshold such that the airflow induced by the fan 1200 has effectively stopped. The controller 1205 may monitor an indicator of the rotational state of the fan 1200. In some embodiments, the controller 1205 may be configured to monitor the rotation of the fan 1200 by using a Hall-effect sensor for directly detecting the rotational speed of the fan 1200 (e.g., by using a magnet that rotates with the fan 1200). In another embodiment, the fan 1200 transitions from the active state to the inactive state when the motor 1048 is no longer transmitting a rotational force to the fan 1200. Similarly, the motor 1048 can transition from an active state to an inactive state when the motor 1048 stops rotating or when the motor 1048 slows to a predetermined threshold of rotational speed. For example, the controller 1205 may monitor a sensor that detects the voltage or current applied to the motor 1048 to determine whether the motor 1048 has transitioned from the active state (i.e., providing torque to the fan 1200) to the inactive state.

Figure 28:
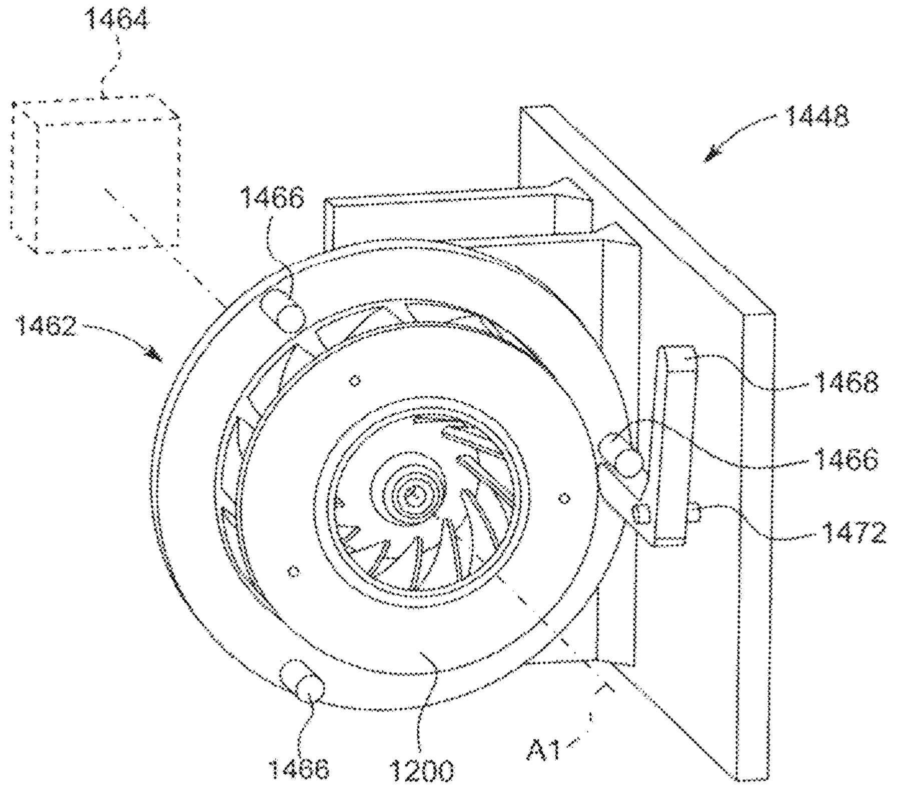
FIG. 28 is a detailed view of a fan and filter cleaning mechanism according to one embodiment.

FIG. 28 provides another embodiment of a filter cleaning mechanism 1448. In the illustrated embodiment, the filter cleaning mechanism 1448 includes an actuator in in the form of a clutch bearing 1464 (i.e., a one-way bearing) located between the shaft of the motor 1048 and a rotatable plate 1462 having a plurality of cogs 1466. Under normal operation, the motor 1048 and the fan 1200 rotate about the rotational axis A1 in a first direction (i.e., in a counterclockwise direction in FIG. 28). When rotating in the first direction, the torque from the motor 1048 is not transferred to the plate 1462. However, once the fan 1200 transitions from the active state to the inactive state (i.e., slows to a stop or slows to below a predetermined threshold speed), the motor 1048 is configured to pulse in a second, or a reverse direction (i.e., in a clockwise direction in FIG. 28). Due to the effect of the clutch bearing 1464, torque is transferred to the plate 1462 when the motor 1048 pulses in the reverse direction. The cogs 1466 extending from the plate 1462 sequentially engage a linkage 1468, which in turn, impacts the filter 1088. In the illustrated embodiment, the linkage 1468 rotates about a pivot 1472.

The integration of the dust collection assembly 1008 within the rotary hammer 1004 may provide several different benefits. For example, the integration of the dust collection assembly 1008 within the rotary hammer 1004 may allow for a reduced number of parts for the operation of the rotary hammer 1004 and dust collection assembly 1008. This may in turn reduce the overall cost of the system. Additionally, in some embodiments, the reduction of parts may also reduce the overall weight and size of the system. Likewise, in some embodiments, the profile of the tool system is more compact, which may allow a user to maneuver and hold the tool system more easily. It should be understood that the various features and embodiments described in the present disclosure may be mixed or interchanged into different combinations of features and embodiments.

For example, the disclosed rotary hammer 1004 utilizes a single power source (e.g., the battery 1056) and a single electric motor 1048 to operate the drive assembly 1052 and the dust collection assembly 1008. Furthermore, the rotary hammer 1004 includes a single controller adapted to control operation of the drive assembly 1052 and the dust collection assembly 1008. Additionally, a single fan 1200 may be used to generate two distinct air flow paths, including a suction air flow path and a cooling air flow path. The first air flow path is the dust collector flow path in which dust laden air enters through the nozzle 1076, travels through the dust tube 1040, into the exterior and interior transfer tubes 1140, 1141, and deposits the dust with the help of the filter 1088 into the dust container 1084. The air flow in the dust collector flow path is driven by the fan 1200 and the motor 1048. The second flow path is characterized as a cooling flow path, which directs clean air over the motor 1048 and/or the controller 1205, or other components of the drive assembly to cool these components.

In some embodiments, the rotary hammer 1004 is compatible with ONE-KEY®. In particular, the rotary hammer 1004 is capable of wireless communication (e.g., using Bluetooth or other nearfield communication protocol), thereby allowing the rotary hammer 1004 to be monitored and/or controlled via a remote device (e.g., a smartphone). When wirelessly connected to the remote device, it is possible for the remote device to track a location of the rotary hammer 1004, monitor the battery 1056, remotely lock the trigger 1098, and control other aspects of the rotary hammer 1004. For example, a user can control or adjust the rotational speed and/or torque output of the motor 1048. Likewise, a user can adjust other operational settings of the tool. In some embodiments, the ONE-KEY electronics are incorporated within the controller 1205. However, in other embodiments, the ONE-KEY electronics may be provided through a separate controller PCB.

While multiple embodiments of a rotary hammer have been described above, it will be understood by one of ordinary skill in the art that the various features and components of the described embodiments are interchangeable. Furthermore, although the disclosure has been described in detail with reference to certain preferred embodiments, variations and modifications exist within the scope and spirit of one or more independent aspects of the disclosure as described.

Figure 32:
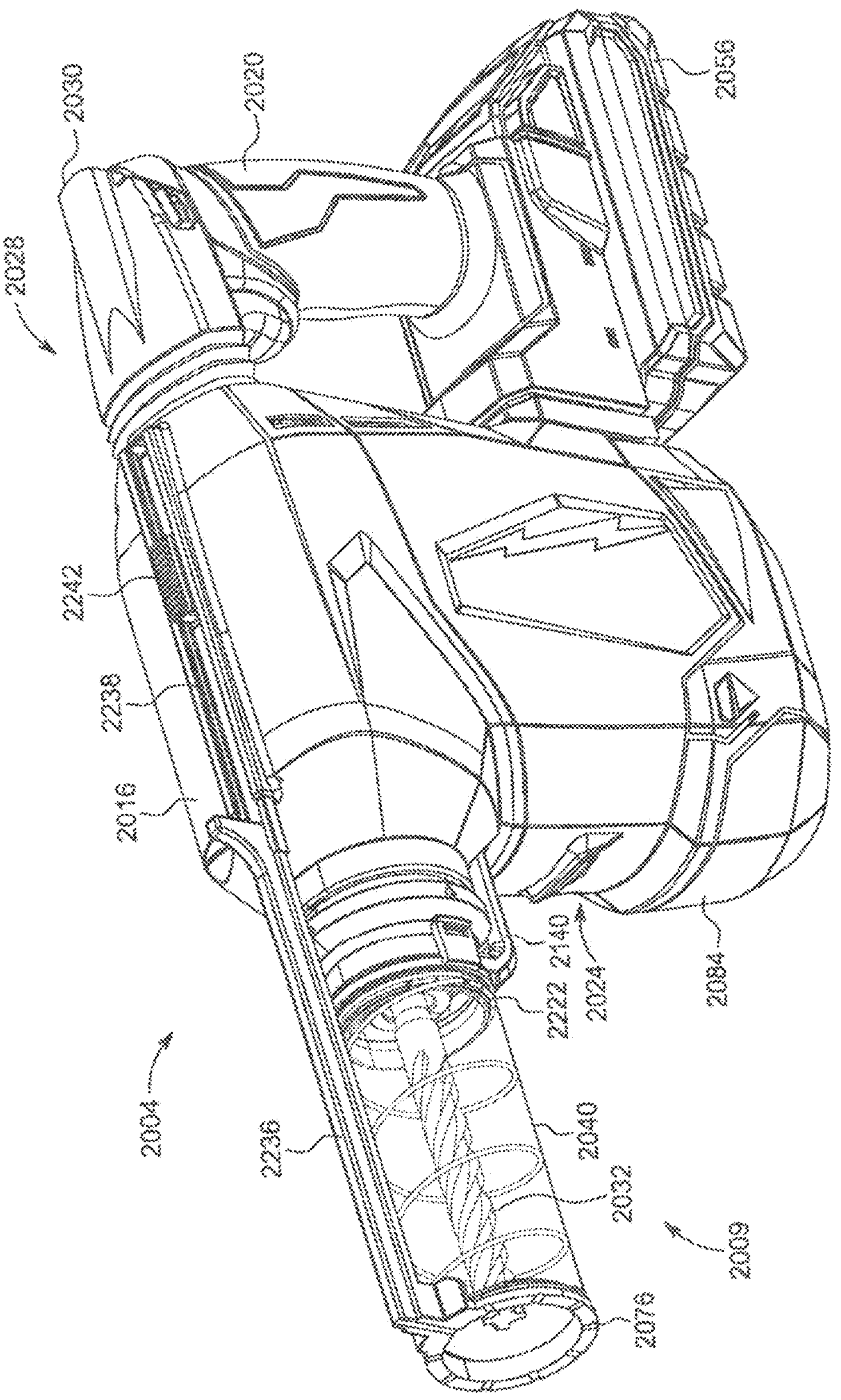
FIG. 32 is a perspective view of a rotary hammer including an integrated dust collection assembly according to yet another embodiment.
Figure 33:
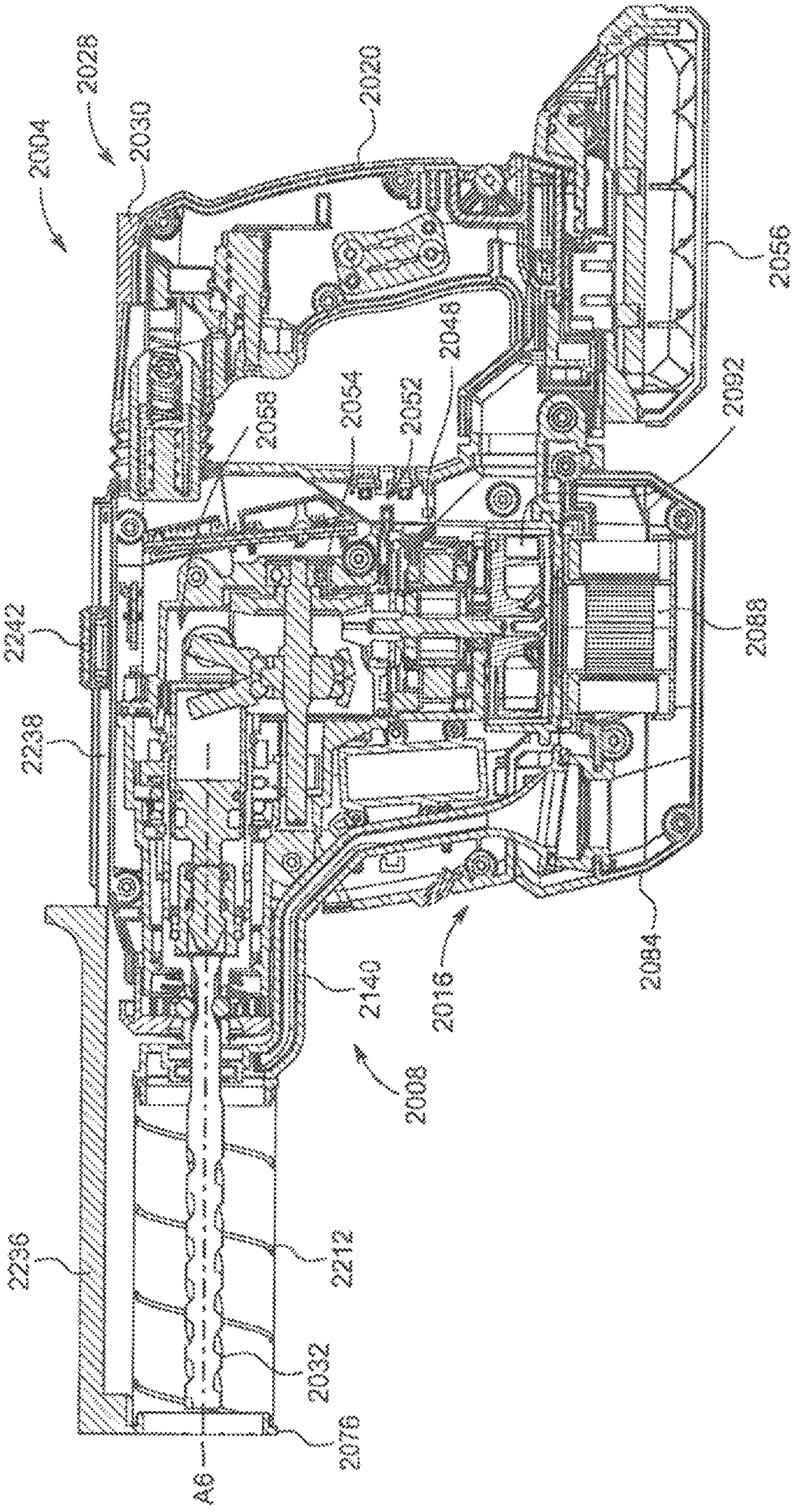
FIG. 33 is a section view of a rotary hammer shown in FIG. 32.

FIGS. 32-33 illustrates a rotary hammer 2004, according to one embodiment, including a main body 2016, a dust collection assembly 2008, and a drive assembly 2052. The main body 2016 includes a front end 2024 and a back end 2028. The front end 2024 includes a tool accessory such as a tool bit 2032, a polisher, a sander, a grinder, a cutter, or other accessories. The dust collection assembly 2008 is also positioned on the front end 2024 and fluidly connects an area around the tool bit 2032 to a dust collection bin 2084. The dust collection bin 2084 is removably coupled to a bottom of the main body 2016 and receives dust and debris from a transfer tube 2140. The back end 2028 includes a handle 2020 and a dovetail rail 2030 able to receive an auxiliary handle 2300 (shown in FIGS. 39, 40, and 42). Referring to FIG. 33, the drive assembly 2052 positioned inside the main body 2016 and is powered by a single power source (e.g., a battery 2056) and an electric motor 2048. The motor 2048 drives an impact mechanism 2058 through a set of bevel gears 2054 and causes the tool bit 2032 to reciprocate and perform work on a workpiece. The impact mechanism 2058 utilized for this rotary hammer 2004 may include or otherwise be similar to the impact mechanism disclosed in U.S. Pat. No. 9,289,890.

Figure 34A:
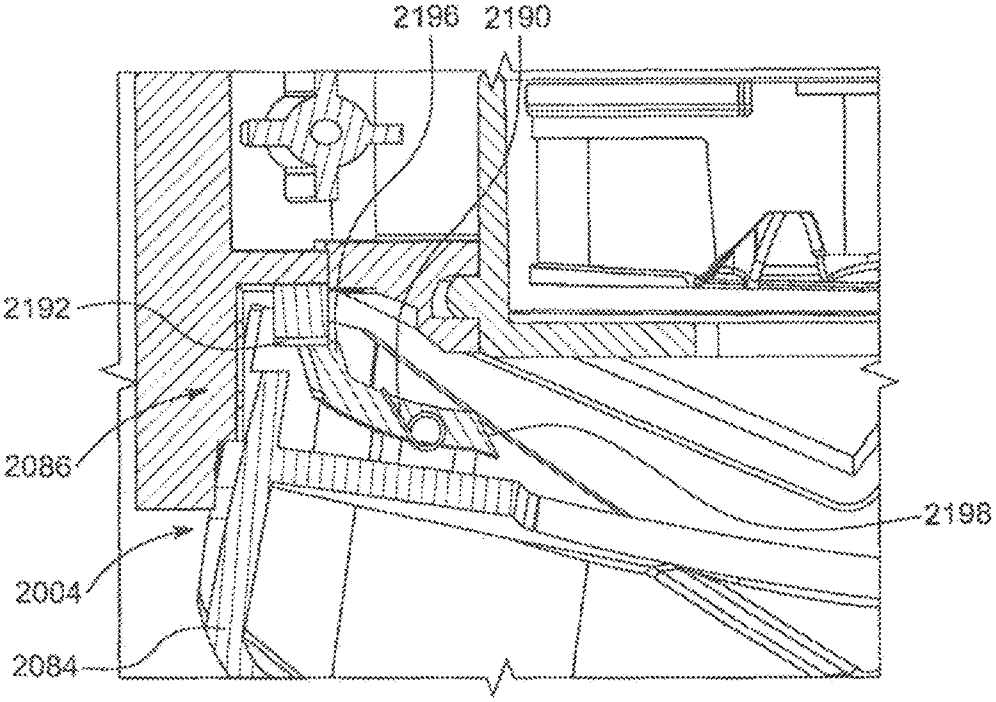
FIG. 34A is a first close-up section view of a lockout system in a first position.
Figure 34B:
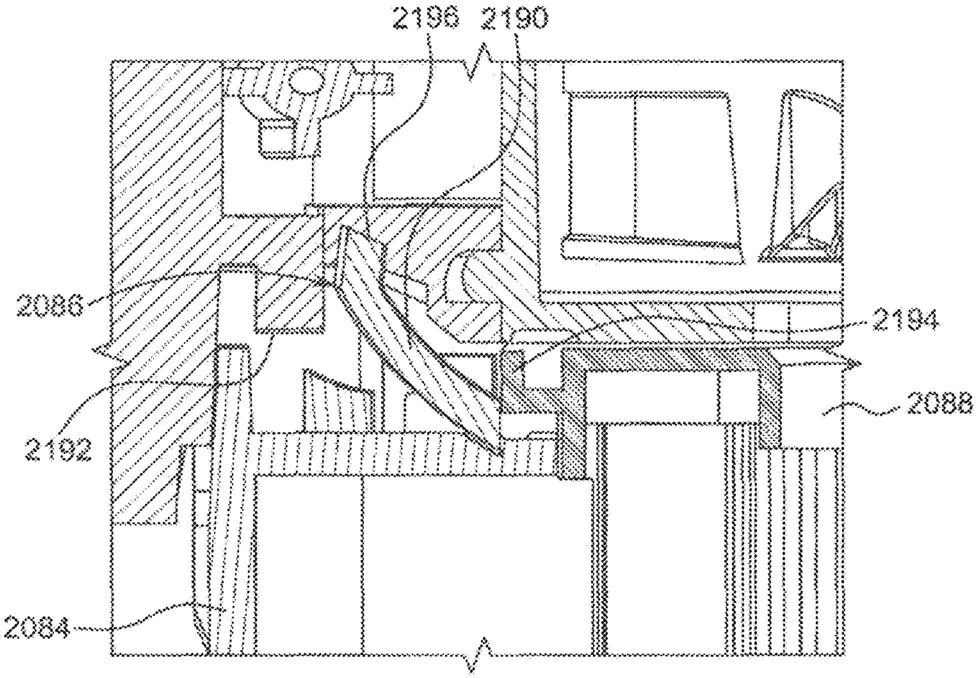
FIG. 34B is a second close-up section view of the lockout system of FIG. 34A in a second position.

As illustrated in FIGS. 34A and 34B, the dust collection bin 2084 may include a lockout system 2086, which prevents the dust collection bin 2084 from connecting to the main housing 2016 when a filter 2088 is not installed. It should be understood that some parts of the lockout system 2086 may be disposed on the dust collection bin 2084 while other parts of the lockout system 2086 may be disposed on the main housing 2016. The lockout system includes a stopping lever 2190, a stopping surface 2192, and an actuation feature 2194. The stopping lever 2190 and the stopping surface 2192 may function to interfere with the attachment of the dust collection bin 2084 to the main housing 2016 when the filter 2088 is not installed. For example, the stopper surface 2192 and the stopping lever 2190 may collide or be arranged in an incompatible manner unless the filter 2088 is installed. The actuator feature 2194 may be operated to adjust one or both the stopping surface 2192 and the stopping lever 2190 so that they may be arranged in a compatible manner which allows the connection of the dust collection bin 2084 to the main housing 2016. For example, the actuation feature 2194 may be a component on the filter 2088 or a component activated by installation of the filter 2088, which adjusts one or both the stopper surface 2192 and the stopping lever 2190 so that they no longer interfere with the installation of the dust bin 2084 on the main housing 2016.

FIGS. 34A and 34B illustrate one exemplary embodiment of a lockout system 2086. However, it should be understood that variations may be applicable so long as the components function in a manner as described. In the illustrated embodiment, the stopping lever 2190 is formed on the dust collection bin 2084 and includes a first contact surface 2196 and a second contact surface 2198. The stopping surface 2192 is a part of the housing 2016 and is configured to selectively contact the first contact surface 2196 of the stopping lever 2190. The actuation feature 2194 is formed on a filter 2088 and is configured to contact the second contact surface 2198 of the stopping lever 2190 when the filter 2088 is properly installed in the dust collection bin 2084. When the stopping lever 2190 is in a first position, the dust collection bin 2084 cannot be installed onto the housing 2016, as the first contact surface 2196 of the stopping lever 2190 impacts the stopping surface 2192 during installation thereby preventing the dust collection bin 2084 to be positioned close enough to the housing 2016 to engage a latch mechanism (not shown) between the dust collection bin 2084 and the housing 2016. When the filter 2088 is installed, the actuation feature 2194 contacts the second contact surface 2198 of the stopping lever 2190, and the stopping lever 2190 moves to a second position. When the stopping lever 2190 is in the second position, the first contact surface 2196 no longer blocks the stopping surface 2192 when installing the dust collection bin 2084, thereby allowing the dust collection bin 2084 to be positioned adjacent to the housing 2016 such that the latch mechanism can engage and connect the dust collection bin 2084 to the housing 2016.

Figure 35A:
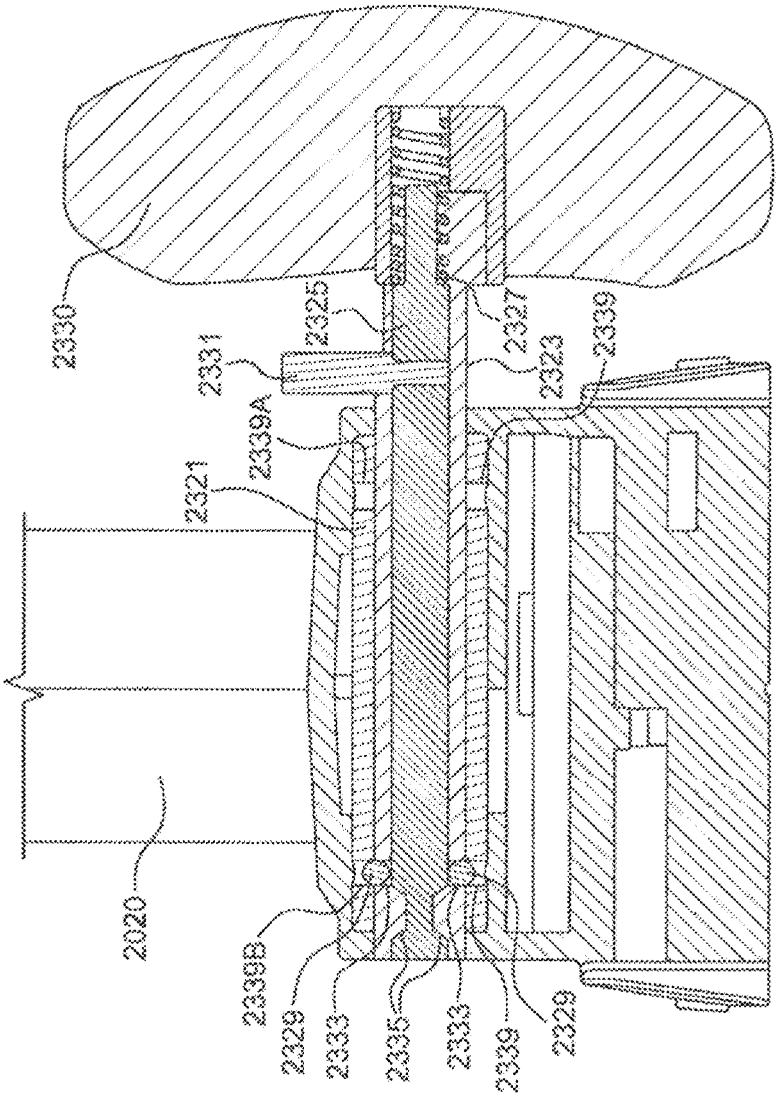
FIG. 35A is a first section view of an auxiliary handle in a collapsed position.
Figure 35B:
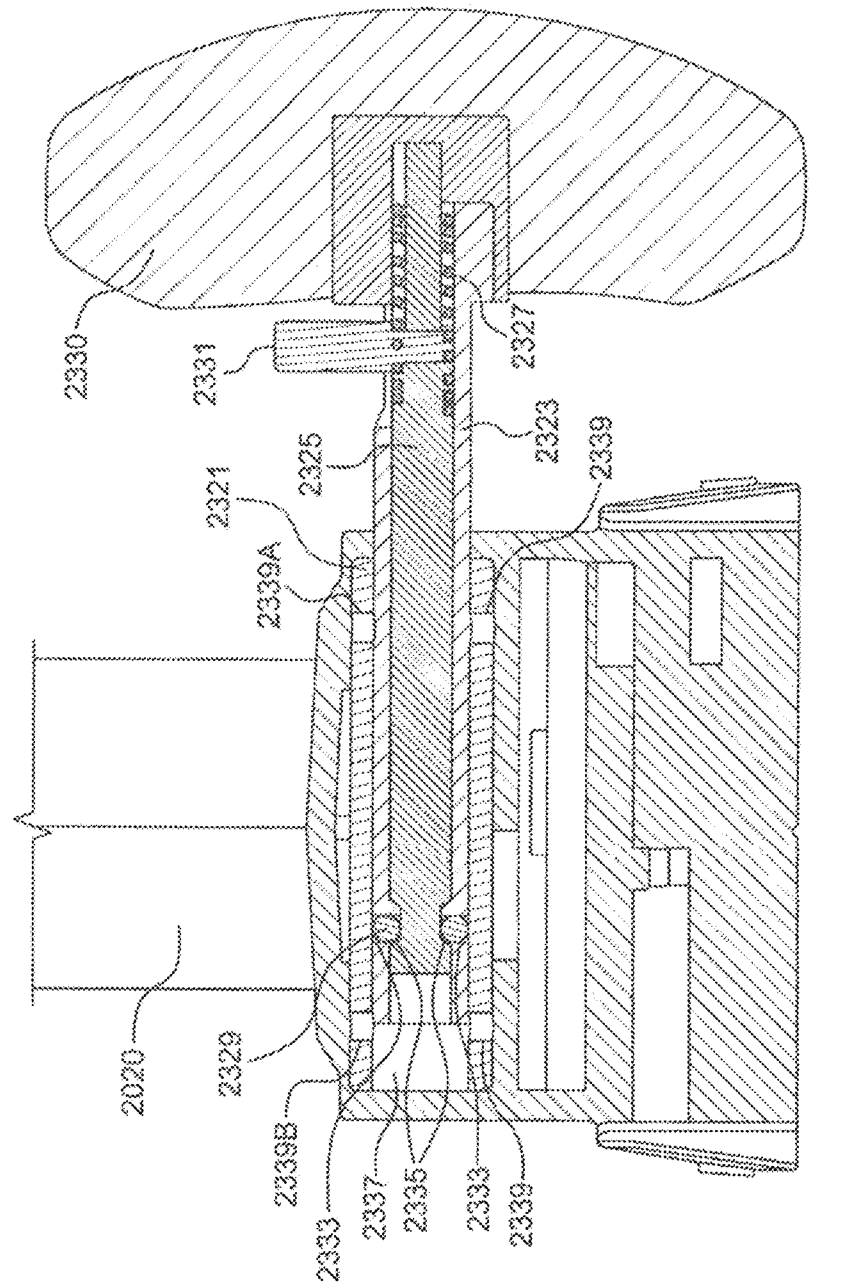
FIG. 35B is a second section view of the auxiliary handle of FIG. 35A in between the collapsed position and an extended position.
Figure 35C:
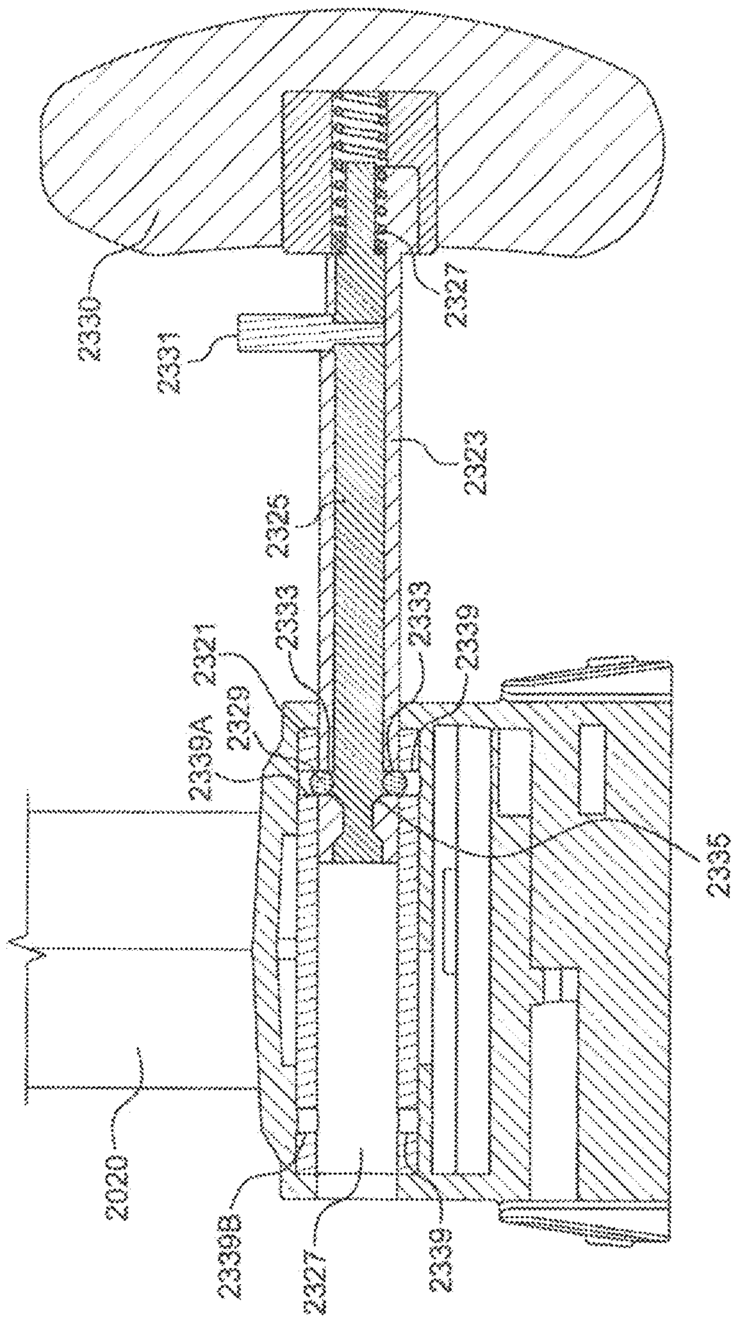
FIG. 35C is a third section view of the auxiliary handle of FIG. 35A in the extended position.

FIGS. 35A, 35B, and 35C show an auxiliary handle 2302, which provides a secondary support for the user to hold when maneuvering the rotary hammer 2004. The auxiliary handle 2302 may optionally be removably attached to the rotary hammer 2004. The auxiliary handle 2302 extends at least partially through the main body 2016 or other housing section of the rotary hammer 2004. In the illustrated embodiment, auxiliary handle 2302 is positioned between the main body 2016 and the handle 2020. The auxiliary handle 2302 extends from the side of the rotary hammer 2004 in a crosswise direction from the primary handle 2020. In some embodiments, the auxiliary handle 2302 may extend generally orthogonal to the handle 2020 and/or the working axis 6A of the rotary hammer 2004. However, in other embodiments, the auxiliary handle 2302 may be positioned in different locations and/or different orientations on the rotary hammer 2004 housing. Additionally, in some embodiments, the auxiliary handle 2302 may be positioned on either the lefthand side or the righthand side of the rotary hammer 2004. Furthermore, in some embodiments, the auxiliary handle 2302 may be positioned in an extended position or a collapsed position.

FIGS. 35A, 35B, and 35C show an exemplary embodiment of an auxiliary handle 2302, which may be removably attached to the rotary hammer 2004. The illustrated auxiliary handle 2302 includes a tube 2321, a pommel grip 2330, a pin case 2323, a pin 2325, a pin spring 2327, a plurality of balls 2329, and an actuator 2331. The tube 2321 is fixed to the rotary hammer 2004 and supports the other components of the auxiliary handle 2302 on the rotary hammer 2004. In some embodiments the tube 2321 is formed as a separate component while in other embodiments, the tube 2321 is integrally formed into the housing of the rotary hammer 2004. The tube 2321 may removably receive the other components of the auxiliary handle 2303 in order to allow the auxiliary handle 2302 to be selectively attachable and removable from the rotary hammer 2004. The tube 2321 extends through at least a portion of the housing of the rotary hammer 2004. In embodiments where the tube 2321 extends through the entire width of the rotary hammer 2004, the auxiliary handle 2302 may be used as ambidextrous handle, which may be positioned on either the lefthand side or the righthand side of the rotary hammer 2004.

The pommel grip 2330 provides an area for the user to grab to stabilize the rotary hammer 2004. In other embodiments, other shapes and styles of grips and handles may be used to provide an area for the user to grip. The pommel grip 2330 is attached to an end of the pin case 2323, which houses the pin 2325 and the plurality of balls 2329. The pin case 2323 and the pin 2325 are slidably received within a port 2337 created by tube 2321.

The auxiliary handle 2302 may be positioned in a variety of different arrangement on the rotary hammer 2004 by changing the position of the pin case 2323 relative to the tube 2321. In the illustrated embodiment, the pin case 2323 and pin 2325 may be inserted into the tube 2321 from either the lefthand side or the righthand side of the tube 2321 to arrange the auxiliary handle on either side of the rotary hammer 2004. Additionally, the auxiliary handle 2302 may be positioned on a lefthand side of the rotary hammer 2004 in either a collapsed or an extended position. Likewise, the auxiliary handle 2302 may be positioned on a righthand side of the rotary hammer 2004 in either a collapse or an extended position. In other embodiments, the auxiliary handle 2302 may be positioned a plurality of positions between the collapsed and extended position.

The various arrangement of the auxiliary handle 2302 may be accomplished by utilizing the balls 2329 and pin 2325 to lock the pin case 2323 in different positions relative to the tube 2321. The pin case 2323 may include ball apertures 2333 to carry the balls 2329. In the illustrated embodiment, the balls 2329 are carried by the pin case 2323, however, it is to be understood that in other embodiments, the balls 2329 may be carried by the tube 2321. The pin 2325 extends through a central bore in pin case 2323 and is slidable relative to the pin case 2323 between a locked position (FIGS. 35A and 35C) and an unlocked position (FIG. 35B). When in the locked position, the pin case 2323 is fixed relative to the tube 2321. When in the unlocked position, the pin case 2323 is slidable relative to the tube 2321.

The pin 2325 may include a pin groove 2335, which selectively receives the balls 2329 when the pin 2325 is in an unlocked position. The balls 2329 are generally retained within the ball apertures 2333 of the pin case 2323. However, the balls 2329 have limited movement radially inward and outward. When the pin 2325 is positioned within the pin case 2323 such that the pin groove 2335 is aligned with the balls 2329 and the ball apertures 2333, the balls 2329 may move radially inward to at least partially recede into the pin groove 2335. When the pin groove 2335 is not aligned with the ball apertures 2333, the balls 2329 are pushed radially outward by the pin 2325 such that the balls 2329 extend beyond the outer perimeter of the pin case 2323. When the balls 2329 extend beyond the outer circumference of the pin case 2323, they may engage with receiving openings 2339 in the tube 2321 to lock the axial position of the pin case 2323 relative to the tube 2321. In this way, the pin 2325 and the balls 2329 function as a locking mechanism.

When in a default position, the auxiliary handle 2302 is biased towards the locked position, as shown in FIGS. 35A and 35C. A pin spring 2327 may bias the pin 2325 axially (towards the left in FIGS. 35A-C) so that the pin groove 2335 is misaligned with the balls 2329, thereby pushing the balls 2329 radially outward towards a locked position. To unlock the auxiliary handle 2302, a user may squeeze an actuator 2331 towards the pommel grip 2330, which slides the pin 2325 axially within the pin case 2323 until the pin groove 2335 is aligned with the balls 2329, thereby allowing the balls 2329 to recede into the pin groove 2335 (as shown in FIG. 35B). When in the unlocked position, the auxiliary handle 2302 may be adjusted to different positions or may be removed entirely from the rotary hammer 2004. Releasing the actuator 2331 causes the pin spring 2327 to bias the pin 2325 back towards the locked position with the pin groove 2335 misaligned with the balls 2329 and the balls 2329 biased radially outward.

The auxiliary handle 2302 may be arranged in a variety of positions on the rotary hammer 2004 or may be removed entirely. The tube 2321 may include one or more receiving opening 2339 for locking the auxiliary handle 2302 in different positions on the rotary hammer 2004. It should be understood that a greater or fewer number of openings in the tube 2321 may be provided to created different positions of the auxiliary handle 2302. The following is a description of some of the possible configurations of the auxiliary handle 2302 based on which openings 2339 are engaged by the balls 2329. In the illustrated embodiment, the tube 2321 includes a first receiving opening 2339A (or right opening—as depicted in FIGS. 35A-C) and a second receiving opening 2339B (or left opening—as depicted in FIGS. 35A-C) for selectively receiving the balls 2329. FIG. 35A illustrates the auxiliary handle 2302 positioned on a righthand side of the rotary hammer 2004 in a collapsed position. In this configuration, the pin case 2323 and pin 2325 are inserted into the tube 2321 from a first side (e.g., a right side—as depicted in FIG. 35A) with the balls 2329 engaged with the second receiving opening 2339B (e.g., on the left side). As such, the pin case 2323 and the pin 2325 are inserted deeper into the tube 2321 with only small portion of the auxiliary handle 2302 extending outside of the rotary hammer 2004. The auxiliary handle 2302 may be pulled further out of the tube 2321 to be placed in an extended position, as shown in FIG. 35C. In the extended position, the balls 2329 engage with a first receiving opening 2339A (e.g., on the right side), with a greater portion of the auxiliary handle 2302 extending out of the rotary hammer 2004.

In this way, the auxiliary handle 2302 functions as a telescoping handle capable of extending to different lengths. When the actuator 2331 is actuated and the balls 2329 receded from the receiving openings 2339, the auxiliary handle 2302 may be removed from the rotary hammer 2004 entirely. This allows a user to insert the auxiliary handle 2302 from both the lefthand side and the righthand side of the rotary hammer 2004. When inserted into the tube 2321 from the lefthand side, the auxiliary handle 2302 may also be positioned in both the collapse and extended position. Before inserting the auxiliary handle 2302 into the tube 2321, a user must actuate the actuator 2331 in order to move the balls 2329 into the unlocked position.

In operation, the pin case 2323 of the pommel grip 2330 can be inserted into either side of the tube 2321, depending on the user's preference. Additionally, the auxiliary handle 2302 can be positioned in a collapsed position (FIG. 35A) or in an extended position (FIG. 35C). Before inserting the pin case 2323, the user must squeeze the actuator 2331 to retract the balls 2329 to allow the pin case 2323 to fit into a port 2337 in the tube 2321. As the pin case 2323 is moved through the port 2337 and the actuator 2331 is released, the balls 2329 eventually catch on the receiving openings 2339 of the tube 2321. When the balls 2329 are engaged with the receiving openings 2339, the auxiliary handle 2302 is axially locked in place. The receiving openings 2339 are positioned to lock the auxiliary handle 2302 in either a collapsed or an extended position depending on which set of receiving openings 2339 the balls 2329 are engaged with. To release the auxiliary handle 2302 from the tube 2321, the actuator 2331 is squeezed, and the balls 2329 retract from the receiving openings 2339. This allows for the pin case 2323 to be slid to another position or out of the tube 2321 entirely.

Figure 36:
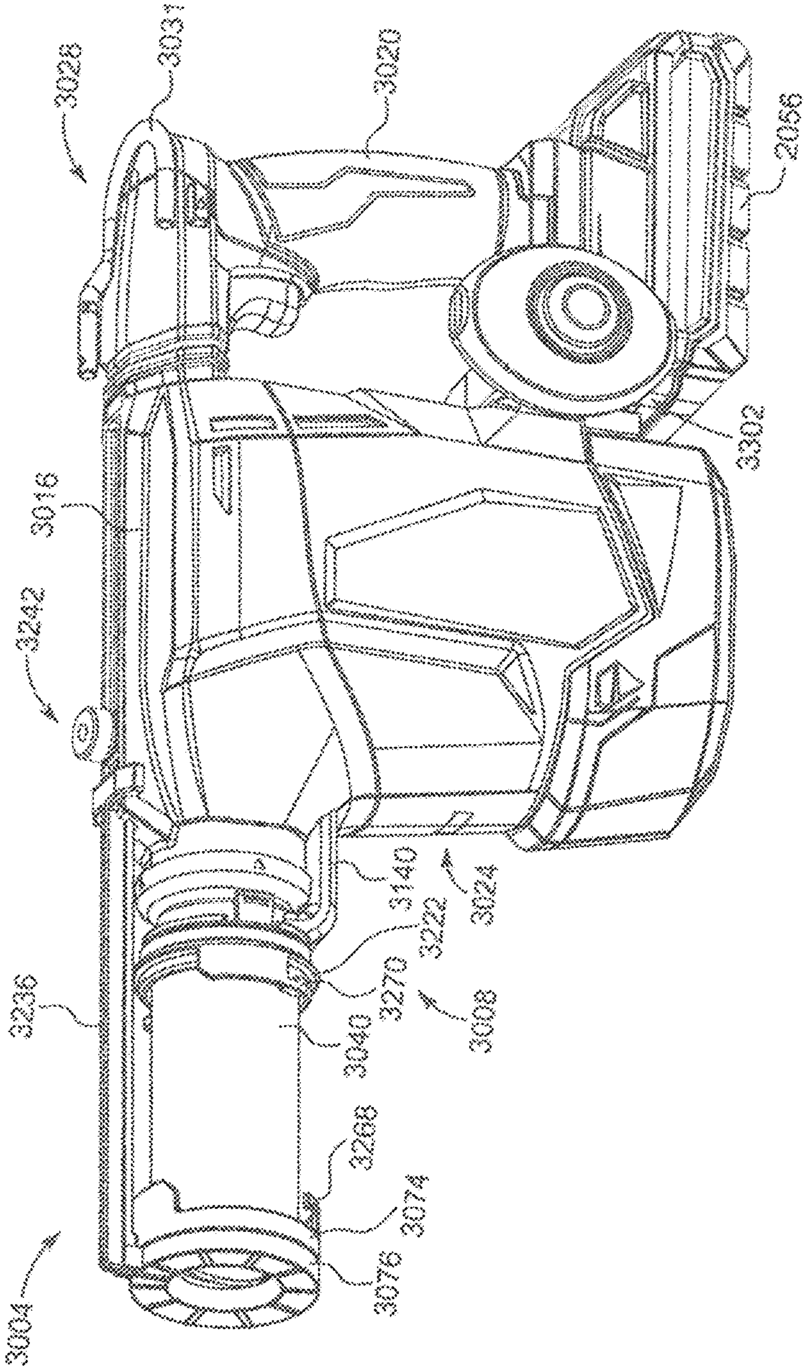
FIG. 36 is a perspective view of another embodiment of a rotary hammer including an integrated dust collection assembly according to yet another embodiment.
Figure 37:
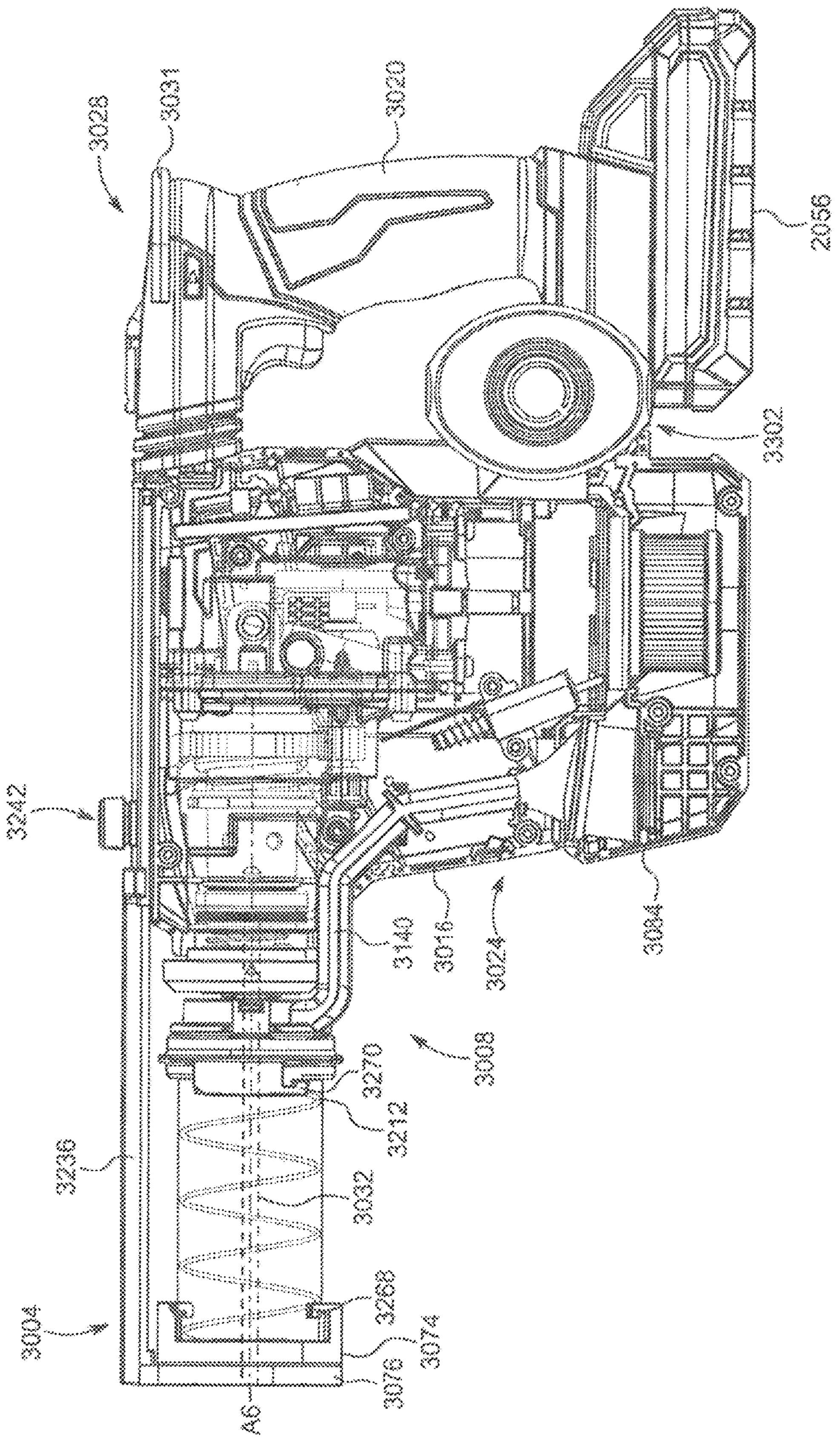
FIG. 37 is a cut away view of a rotary hammer shown in FIG. 36.
Figure 59:
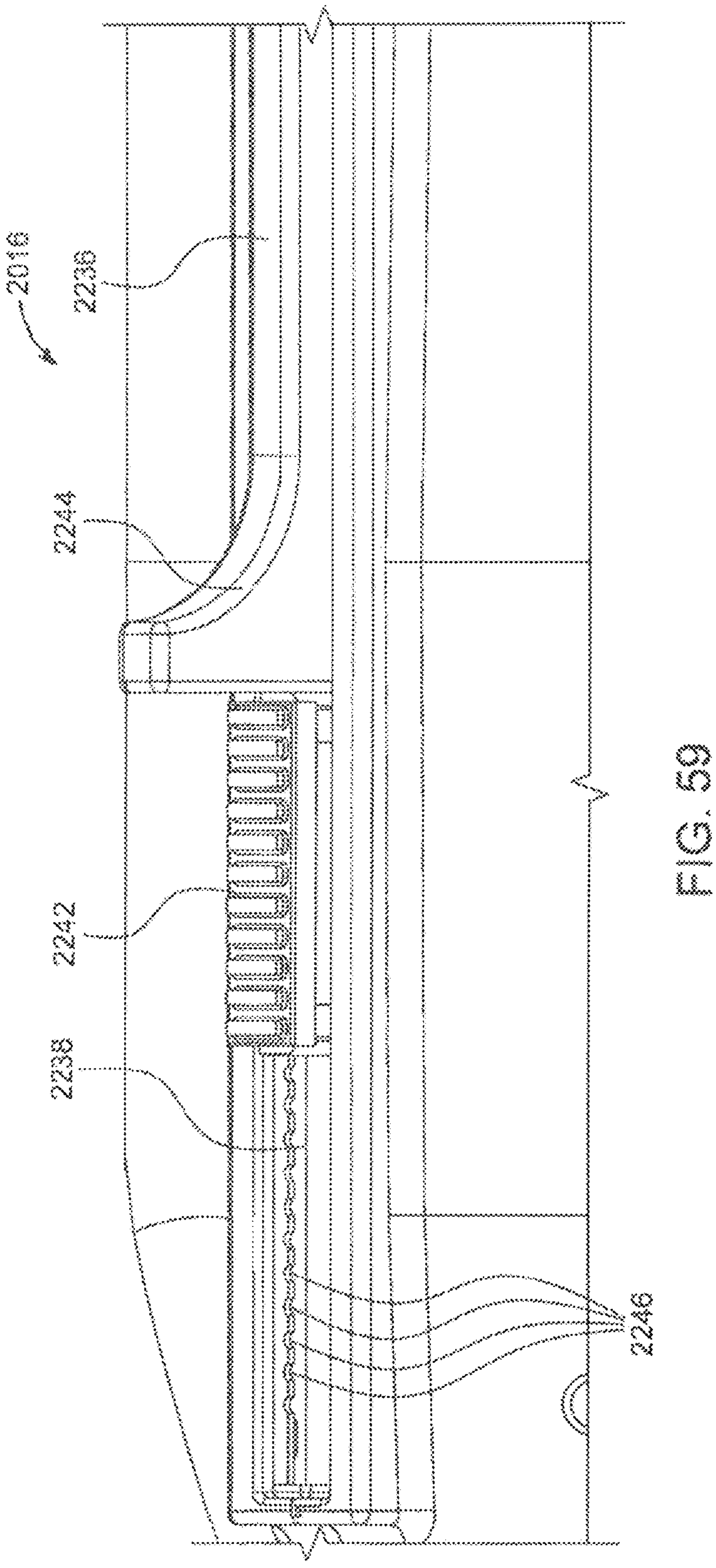
FIG. 59 is a perspective view of a depth setting assembly.

FIGS. 36-37 shows another embodiment of a rotary hammer 3004, with like parts to the rotary hammer 2004. The illustrated embodiment in FIGS. 36-37 having like reference numerals plus "3000", and the following differences explained below. As shown in FIGS. 59-37 the rotary hammer 3004 includes a main body 3016, a handle 3020, a dust collection assembly 3008, an auxiliary handle 3302. The main body 3016 includes a front end 3024 and a rear end 3028. The handle 3020 is formed on the rear end 3028 of the main body 3016 and includes a hook 3031. The hook 3031 can be attached to a harness worn by the user to support the rear end 3028 of the rotary hammer 3004.

Figure 38A:
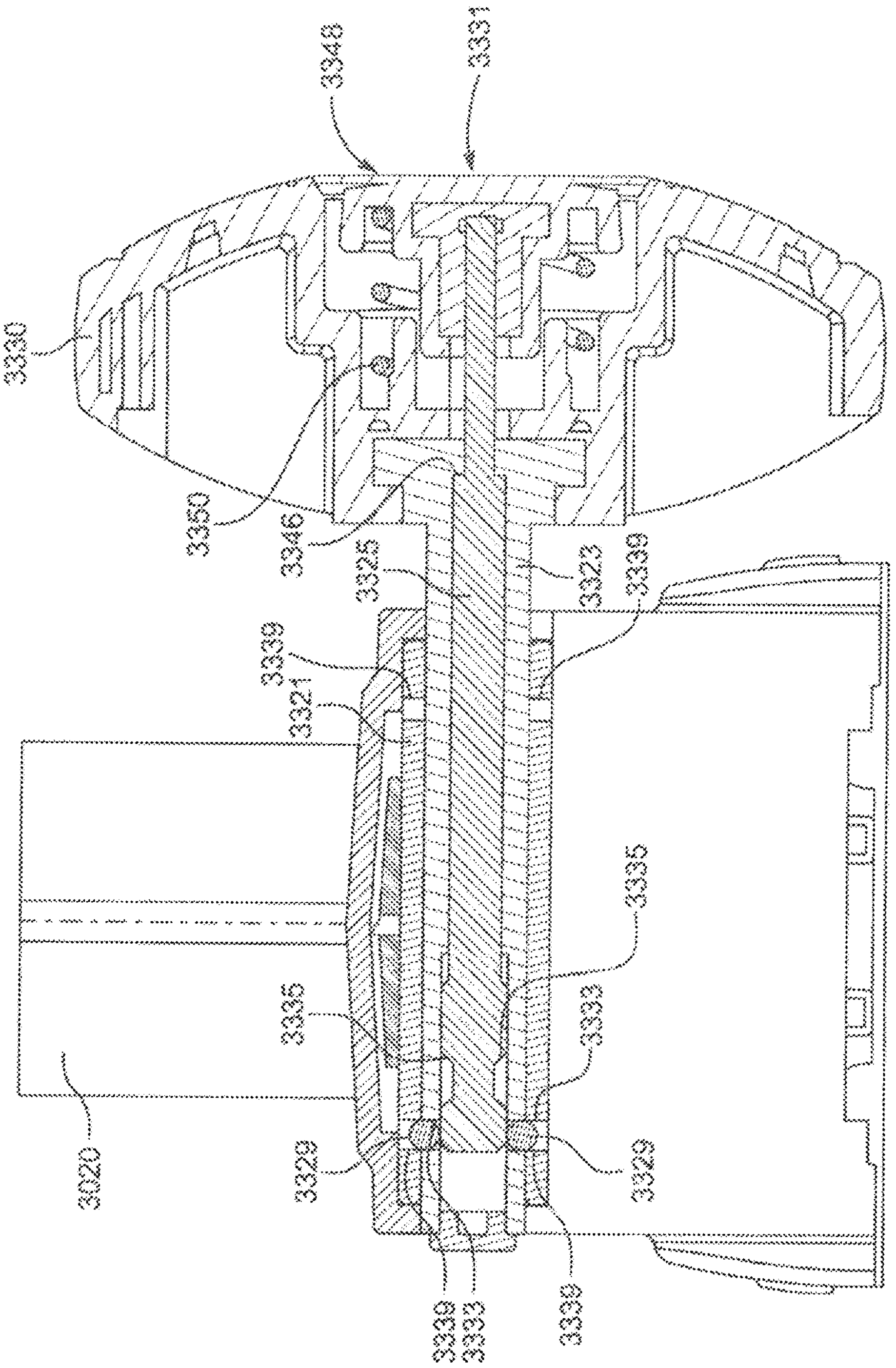
FIG. 38A is a first section view of an alternate embodiment of an auxiliary handle in a collapsed position.
Figure 38B:
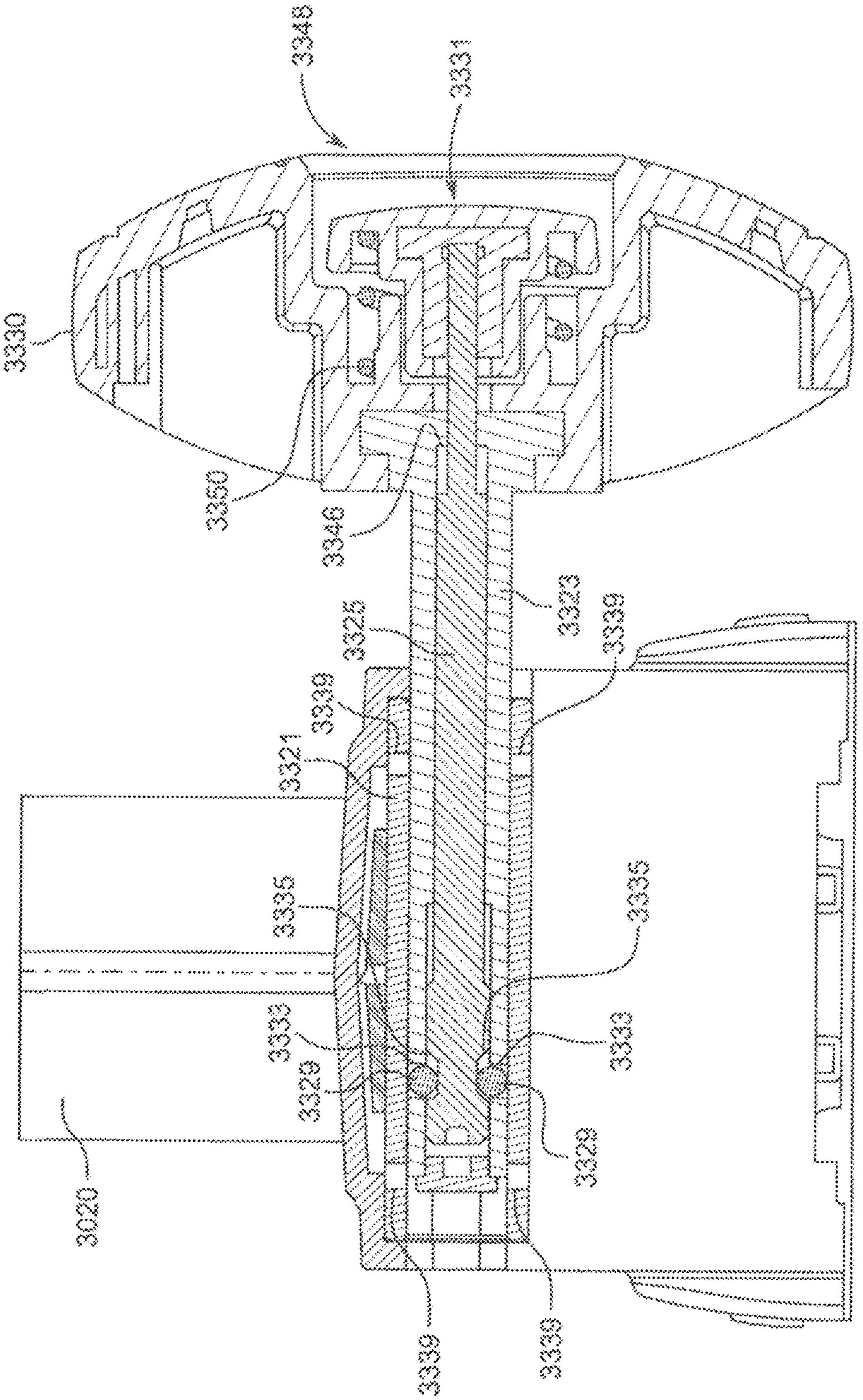
FIG. 38B is a second section view of an auxiliary handle of FIG. 38A in-between the collapsed position and an extended position.
Figure 38C:
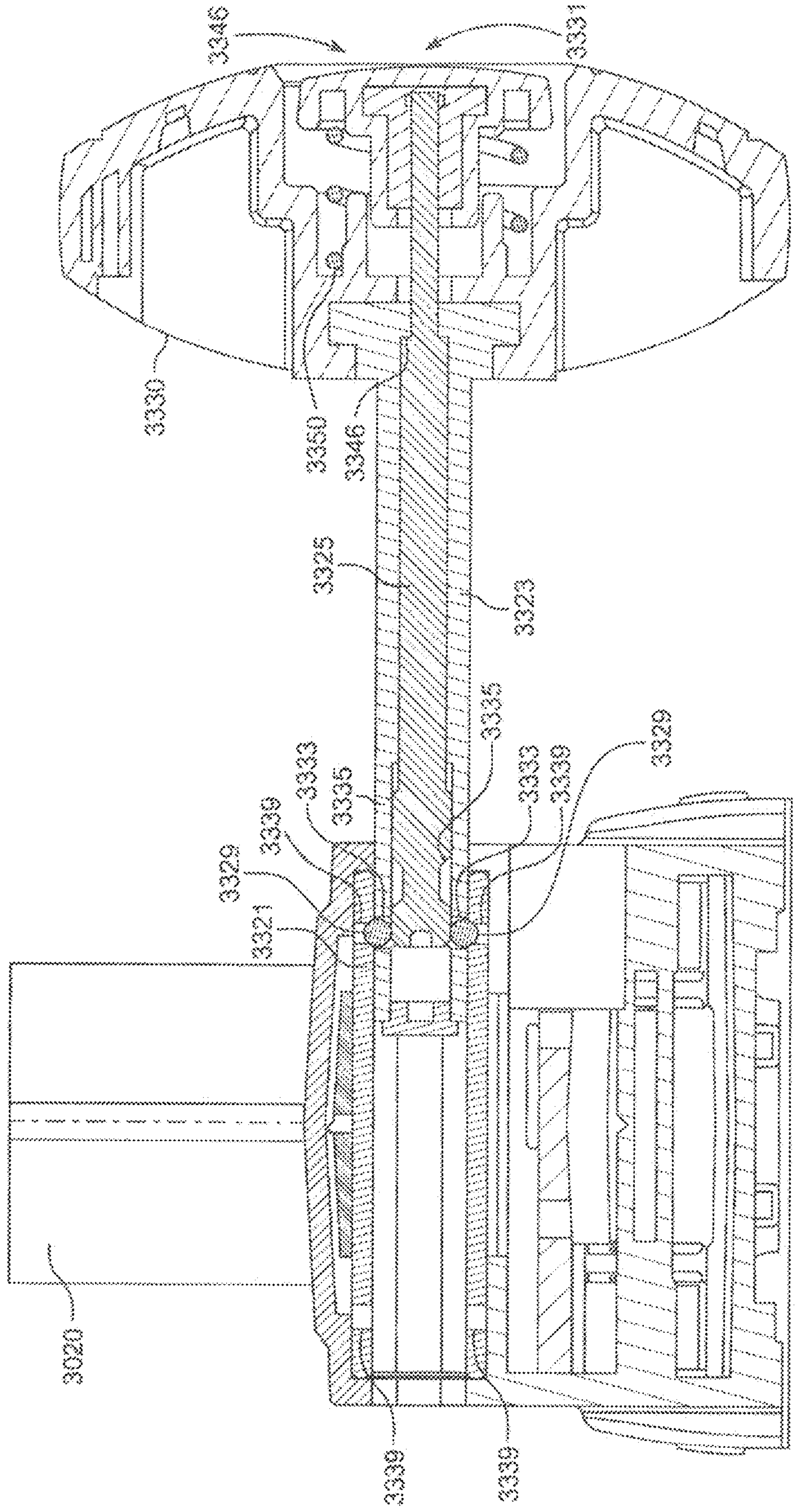
FIG. 38C is a third section view of the auxiliary handle of FIG. 38A in collapsed the extended position.

FIGS. 38A-C illustrates the auxiliary handle 3302, which can replace the auxiliary handle 2302. Accordingly, much of the description of the auxiliary handle 2302 may be applied to the auxiliary handle 3302, with the primary difference being the actuator. The auxiliary handle 3302 is received in a tube 3321 disposed on the rotary hammer 3004 and may be removably coupled to the rotary hammer 3004. The tube 3321 includes a plurality of receiving openings 3339 positioned at various depths to allow the auxiliary handle 3302 to be configured at different lengths/depths or arranged on different sides of the rotary hammer 3004. The auxiliary handle 3302 includes a pommel grip 3330, a pin case 3323, a pin 3325, a set of balls 3329, and an actuator 3331.

The pommel grip 3330 is supported on the pin case 3323 and may be used to better stabilize the rotary hammer 3004. The pin case 3323 and the pin 3325 are slidably received within a port 3337 created by tube 3321. The auxiliary handle 3302 may be positioned in a variety of different arrangement on the rotary hammer 3004 by changing the position of the pin case 3323 relative to the tube 3321. The pin case 3323 slidable supports the pin 3325 such that the pin 3325 may slide axially within the pin case 3323 between a locked position (FIG. 38A—locked and collapsed; FIG. 38C-locked an extended) and an unlocked position (FIG. 38B). The pin case 3323 also supports the balls 3329 within ball apertures 3333 that allow for limited radial movement of the balls 3329. The pin 3325 also includes a pin grove 3335 shaped to at least partially receive the balls 3329 when the pin groove 3335 is axially aligned with the balls 3329.

When in a default position, the auxiliary handle 3302 is biased towards the locked position by a pin spring 3350. The pin spring 3350 may bias the pin 3325 axially (towards the right in FIGS. 38A-C) so that the pin groove 3335 is misaligned with the balls 3329 and the balls 2329 are pushed radially outward towards a locked position. The pin spring 3350 pulls the pin 3325 towards the pommel grip 3330 until a rear end of the pin 3325 engages a limiting surface 3346 formed by either the pin case 3323 or the pommel grip 3330.

An actuator 3331 is mounted in a cavity 3348 of the pommel grip 3330 and is biased by the pin spring 3350 to be flush with an outer surface of the pommel grip 3330. To unlock the auxiliary handle 3302, a user may press the actuator 3331 into the central cavity 3324 so that the actuator 3331 is no longer flush with the outside surface of the pommel grip 3330. The actuator 3331 is coupled to the pin 3325, and therefore, slides the pin 3325 axially (towards the left in FIGS. 38A-C) within the pin case 3323 so that the rear end of the pin 3325 no longer engages with the limiting surface 3364, as depicted in FIG. 38B. Pressing the actuator 3331 also slides the pin 3325 until the pin groove 3335 is aligned with the balls 3329, thereby allowing the balls 3329 to recede into the pin groove 3335, thereby unlocking the auxiliary handle 3302.

To install the auxiliary handle 3302, the user first must depress the actuator 3331. When the set of balls 3329 sit in the pin grooves 2335, the auxiliary handle 3302 can be inserted into either side of the tube 3321. Once in the tube 3321, the auxiliary handle can be positioned in an extended position (FIG. 38C) or a retracted position (FIG. 38B). The actuator 3331 is released and the pin 3325 is moved towards the pommel grip 3330 until it strikes the limiting surface 3346. The balls 3329 are moved radially outward and into engagement with the aligned receiving openings 3339. When the balls 3329 are engaged with the receiving openings 3339, the auxiliary handle 3302 is axially locked, until the actuator 3331 is depressed again.

Figure 39:
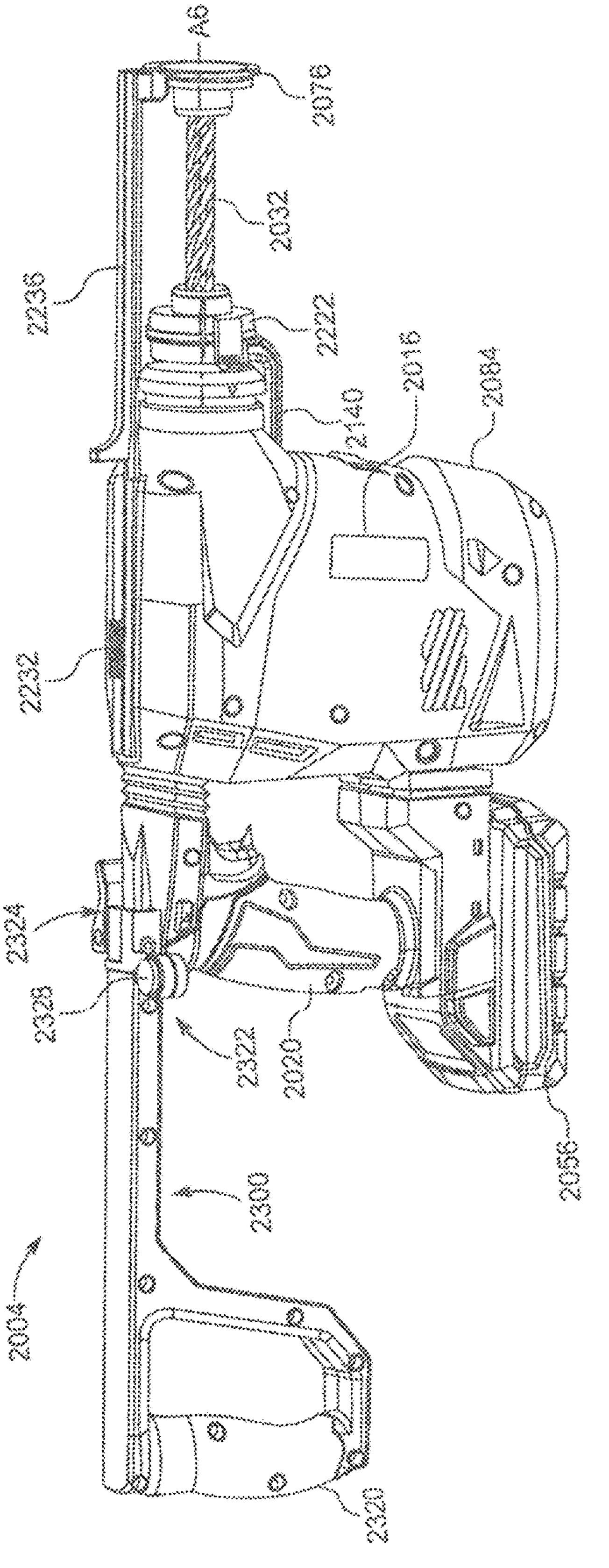
FIG. 39 is a perspective view of a rotary hammer including an auxiliary handle in an operational position.
Figure 40:
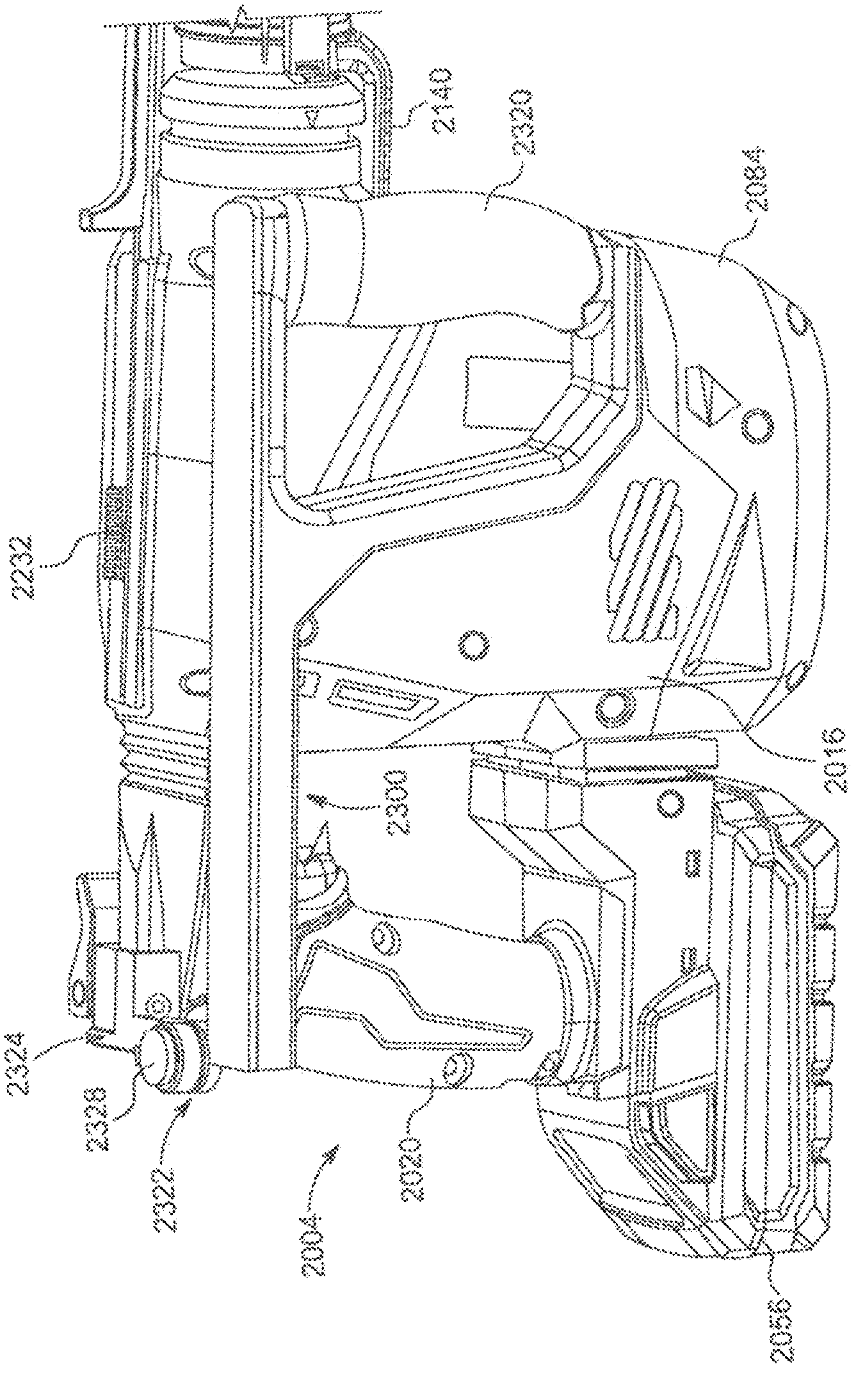
FIG. 40 is a perspective view of the rotary hammer including the auxiliary handle of FIG. 39 in a stowed position.
Figure 41A:
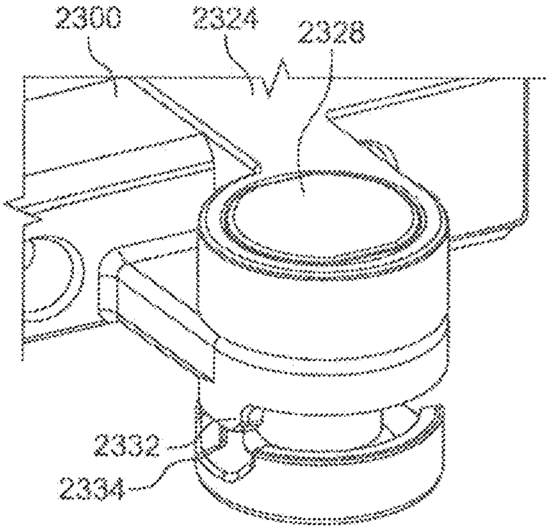
FIG. 41A is a perspective view of a lockable hinge of the auxiliary handle of FIG. 39 with a locking element depressed.
Figure 41B:
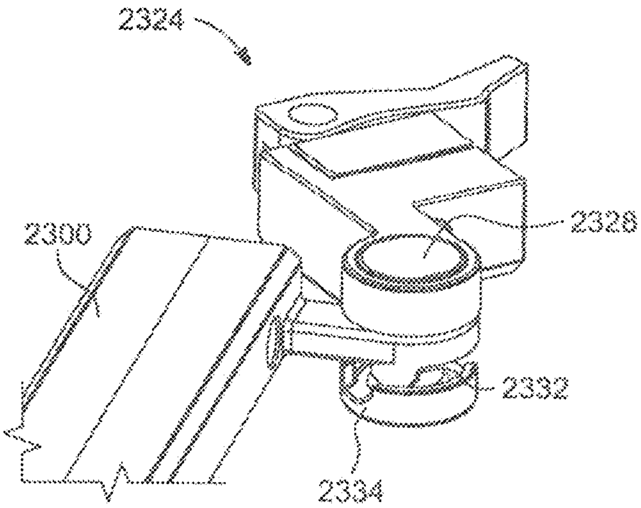
FIG. 41B is a perspective view of the lockable hinge of the auxiliary handle of FIG. 39 as the auxiliary handle is being rotated.
Figure 41C:
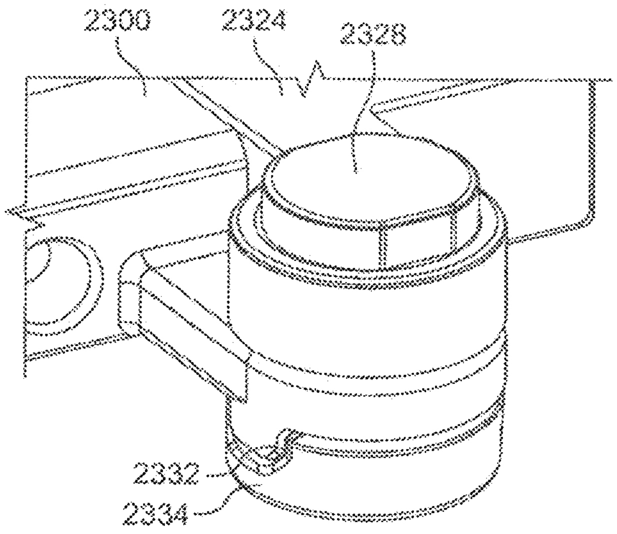
FIG. 41C is a perspective view of the lockable hinge of the auxiliary handle of FIG. 39 with the locking element raised.

In other embodiments, the rotary hammer 2004 may include an auxiliary handle 2300, as shown in FIGS. 39 and 40. The auxiliary handle 2300 includes a D-shaped grip 2320, a lockable hinge 2322, and a coupling mechanism 2324. The D-shaped grip 2320 allows for the user to wrap their hand around a rear of the grip 2320 to better support the rotary hammer 2004. This style of grip 2320 may be helpful when a desired drilling location is above or offset from the user. The lockable hinge 2322 connects the coupling mechanism 2324 and the auxiliary handle 2300 and allows the auxiliary handle to hold either an operational position (FIG. 39) or a stowed position (FIG. 40). In the operational position (FIG. 39), the auxiliary handle 2300 is aligned generally along a working axis A6 of the rotary hammer 2004. In the stowed position (FIG. 40), the auxiliary handle 2300 is located alongside the main housing 2016, and the rotary hammer 2004 has a shorter length than when the auxiliary handle 2300 is in the operational position. As shown in FIGS. 41A-C, the lockable hinge 2322 includes a button 2328, a set of locking cams 2332, a locking element 2334, and a button spring (not shown). To transition between the operational and stowed positions, the button 2328 is depressed by a user (FIG. 41A), and then the locking element 2334 is pushed outward and out of engagement with the set of locking cams 2332 formed into the auxiliary handle 2300. The user rotates the auxiliary handle 2300 to either the operational or stowed position (FIG. 41B), and when either position is reached the locking element 2334 is biased back into engagement with the locking cams 2332 by the button spring (not shown). Lastly, the locking element 2334 pushes the button 2328 upward, as seen in FIG. 41C, and the auxiliary handle 2300 can no longer be rotated.

Figure 42:
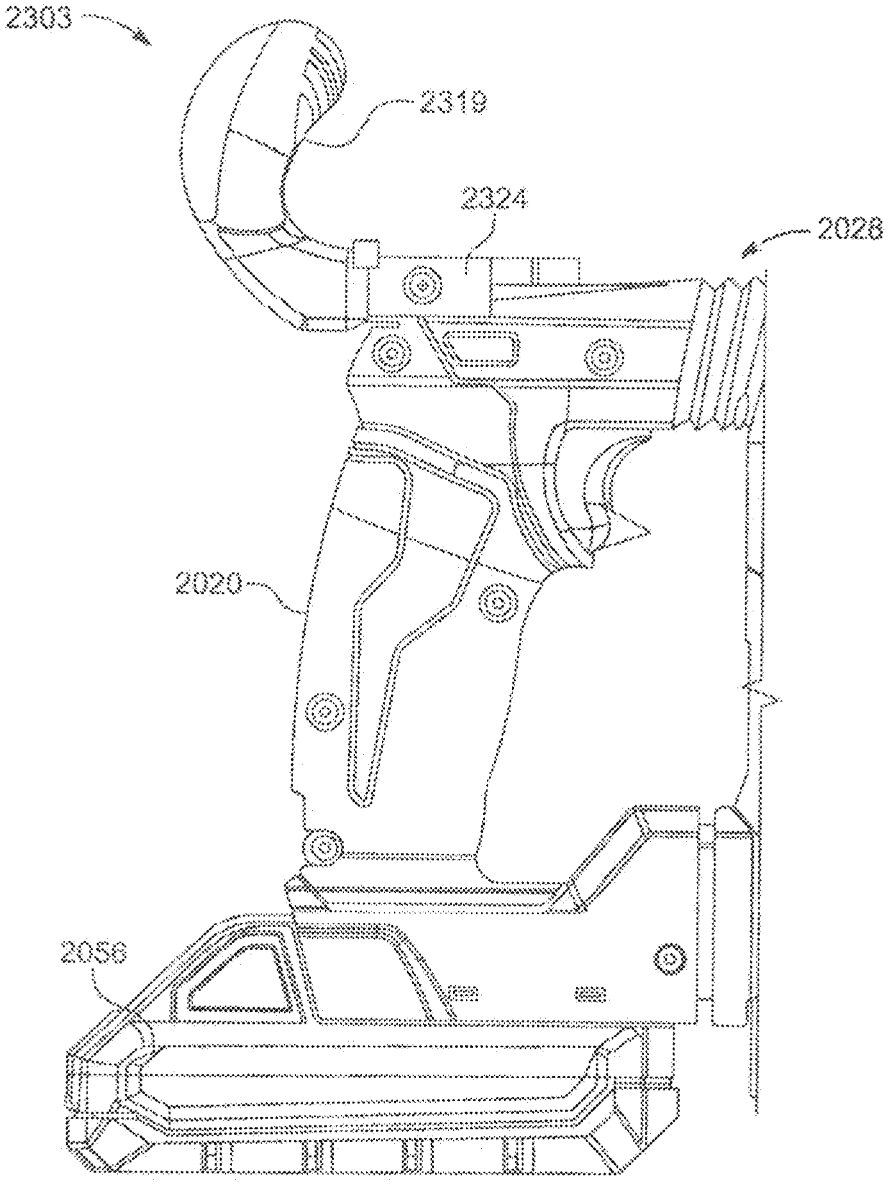
FIG. 42 is a side view of an alternate embodiment of an auxiliary handle.

FIG. 42 illustrates a compact auxiliary handle 2303 including a curved grip 2319 and the coupling mechanism 2324. The compact auxiliary handle 2303 with the curved grip 2319 creates a space for a user's second hand and is more compact allowing for the rotary hammer 2004 to fit in tighter spaces. Additionally, the more compact rotary hammer 2004 allows for the user to apply more pressure during a drilling operation.

Figure 43:
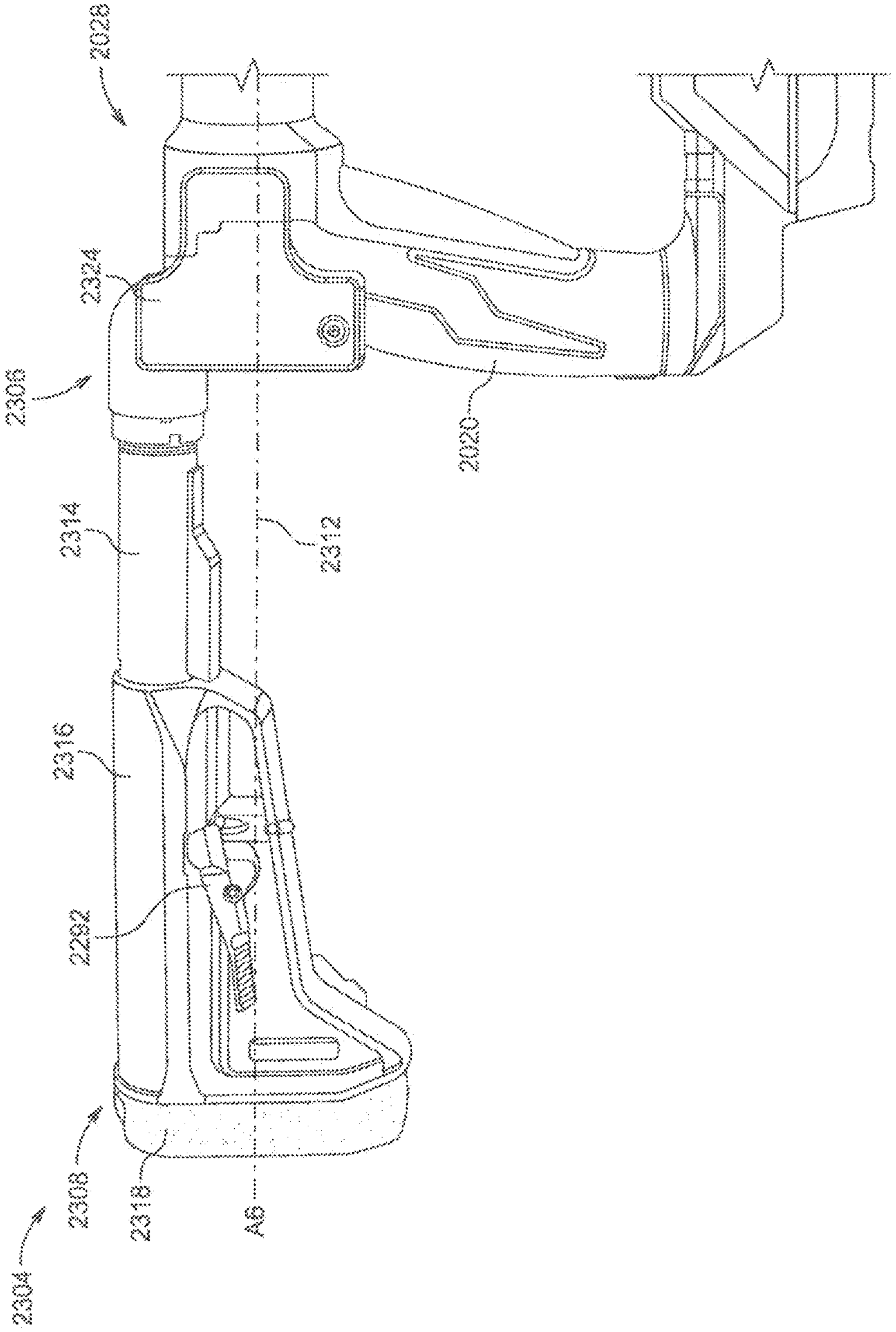
FIG. 43 is a side view of an alternate embodiment of an auxiliary handle.

FIG. 43 illustrates a shoulder stock auxiliary handle 2304 for use with the rotary hammer 2004. The shoulder stock auxiliary handle 2304 includes a first end 2306 adjacent the handle 2020 and a back end 2308 opposite the first end 2306. An alternate embodiment of coupling mechanism 2324 selectively couples the shoulder stock auxiliary handle 2304 to the rear of the handle 2020 adjacent the first end 2306. The shoulder stock auxiliary handle 2304 extends from the back end 2028 in the same direction as the working axis A6. In some embodiments, the shoulder stock assembly 2304 may be coaxially arranged with the tool bit axis 2312 while in other embodiments, the shoulder stock auxiliary handle 2304 may be arranged parallel to the working axis A6. In some embodiments, the coupling mechanism 2324 may include a snap-fit or rotational connection (e.g., including threads or a lock ring to restrict rotation). The shoulder stock auxiliary handle 2304 includes a telescoping tube 2314 and a stock 2316. The telescoping tube 2314 extends between the first end 2306 and the second end 2308 and connects the coupling mechanism 2324 to the stock 2316. Additionally, the stock 2316 is movable relative to the telescoping tube 2314 to adjust the position of the stock 2316 relative to the rotary hammer 2004 to accommodate users having different length arms. In other embodiments, the shoulder stock auxiliary handle 2304 may include additional telescoping tubes to further extend the stock 2316. In the illustrated embodiment, the telescoping tube 2314 is formed of a first material, such as a rigid plastic, and the stock 2316 is formed of a second material that may be the same or different from the first material, such as another plastic or metal. In some embodiments, the shoulder stock assembly 2304 may be formed using an additive manufacturing process such as 3D printing. In other embodiments, the shoulder stock assembly 2304 may be formed from other processes, such as a plastic molding process or the like.

With continued reference to FIG. 43, the shoulder stock auxiliary handle 2304 includes a cushion 2318 coupled to the rear end of the stock 2316 and a locking actuator 2292 operable to adjust the position of the stock 2316 along the telescoping tube 2314 between an extended position and a retracted position, and subsequently lock the stock 2316 in the selected position. In the illustrated embodiment, the locking actuator 2292 is a spring-biased lever that may be pivoted to adjust the position of the stock 2316 relative to the telescoping tube 2314. In other embodiments, the locking actuator 2292 may be a push button or the like. The cushion 2318 provides comfort to the user by providing additional shock absorption, thus preventing bruising and fatigue while applying pressure to the rotary hammer 2004. In some embodiments, the cushion 2318 may be formed of a polyurethane gel pad or polyethylene foam. The stock 2316 further may be placed against a user's arm or shoulder to support the rotary hammer 2004 during operation. When against a user's shoulder, the stock 2316 adds additional stability, control, and comfort by adding additional contact area. Specifically, the additional contact area benefits the user for drilling or chiseling applications to counteract the impacts caused by the impact mechanism 2058. In addition, the shoulder stock assembly 2304 allows the user to grip the stock 2316 directly from behind to help support the weight of the rotary hammer 2004 when engaging in overhead drilling.

Figure 44:
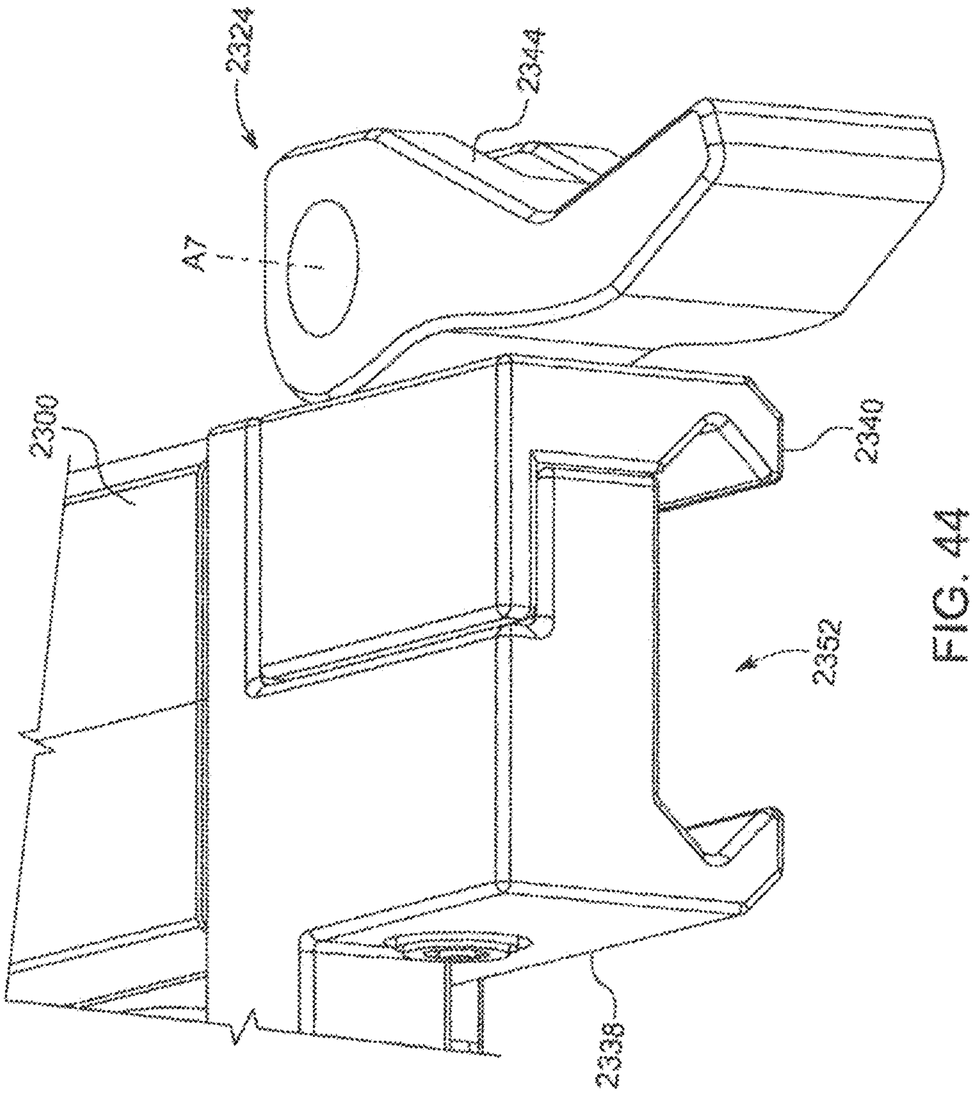
FIG. 44 is a perspective view of a coupling system of the auxiliary handle of FIG. 39 or FIG. 42.

The coupling mechanism 2324, shown in FIG. 44, attaches either one of the auxiliary handles 2300 or 2303 to the dovetail rail 2030 and includes a rail support 2338, a rail grip 2340, and a lever 2344. The rail support 2338 and the rail grip 2340 form a rail opening 2352 that is shaped to fit the dovetail rail 2030. The rail opening 2352 is slightly larger than the dovetail rail 2030 to allow for the coupling mechanism 2324 to slide on. Then, the lever 2344 is rotated around a lever axis A7 to compress the rail grip 2340 onto the dovetail rail 2030. As a result, the rail opening 2352 shrinks and holds the auxiliary handle 2300 onto the rotary hammer 2004. To release the auxiliary handle 2300, the lever 2344 is rotated in a opposite direction and the rail grip 2340 expands the opening 2352, which allows the auxiliary handle 2300 to be removed from the rotary hammer 2004.

Figure 45:
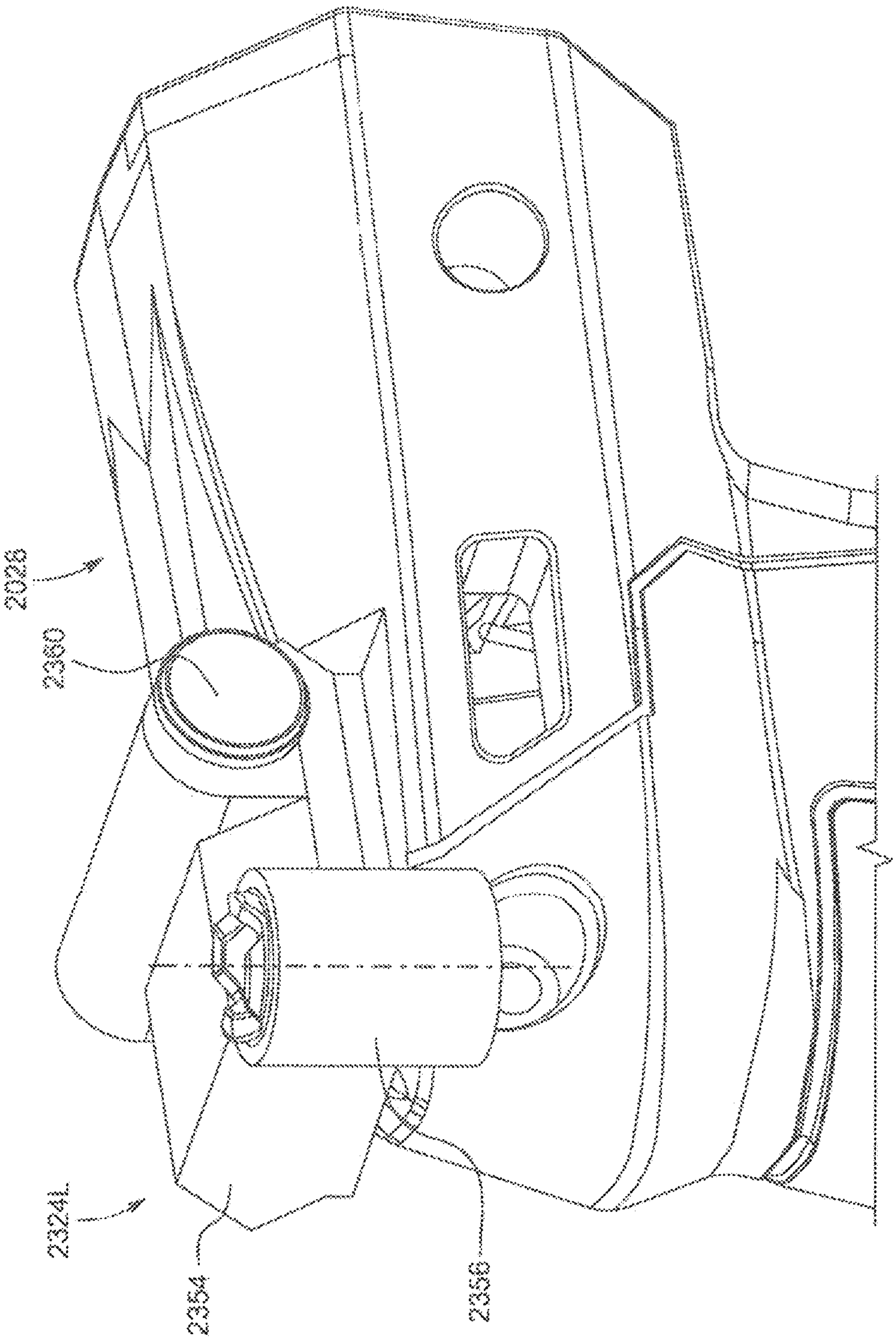
FIG. 45 is a perspective view of an alternate embodiment of a coupling system.
Figure 46:
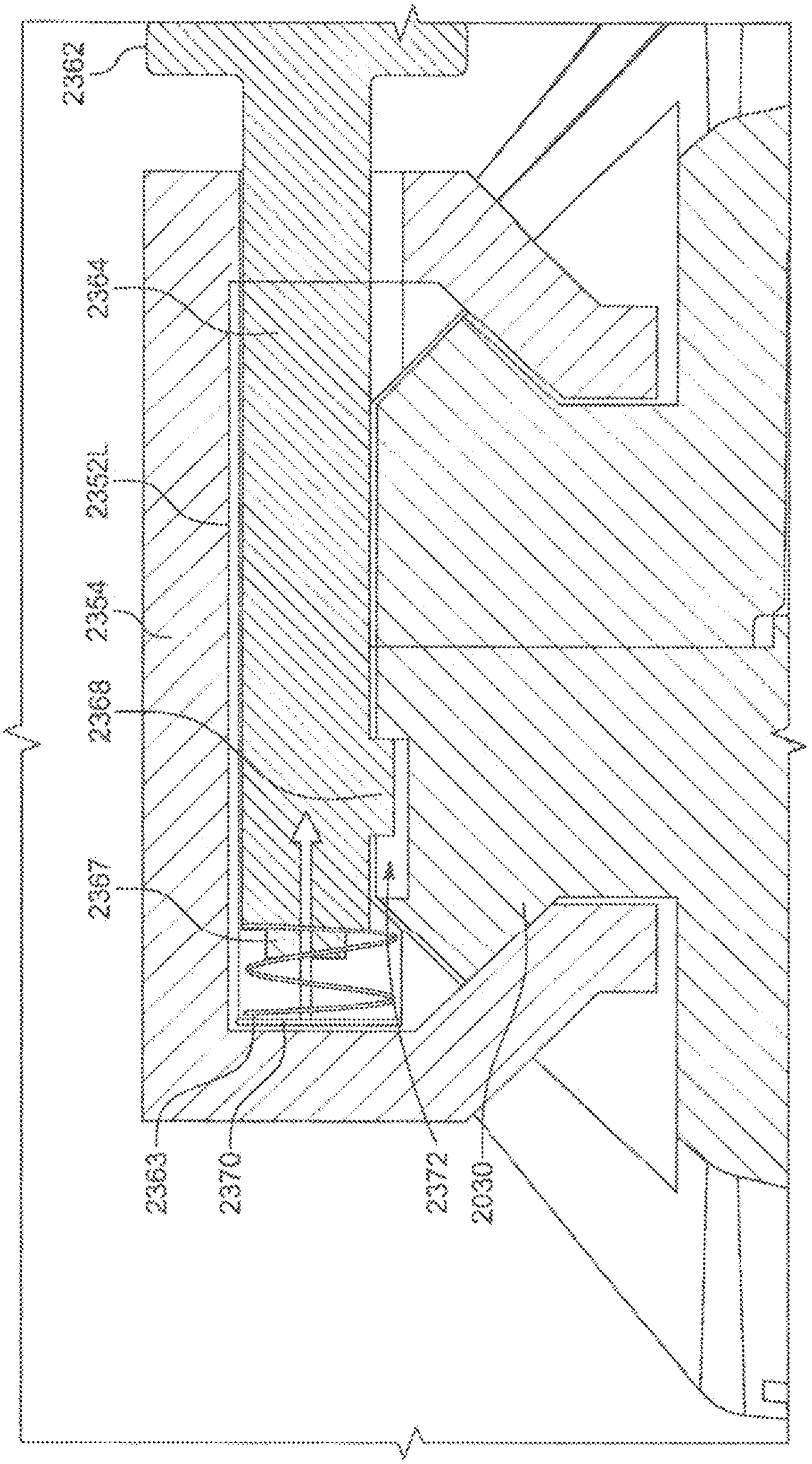
FIG. 46 is a section view the coupling system of FIG. 45.
Figure 47:
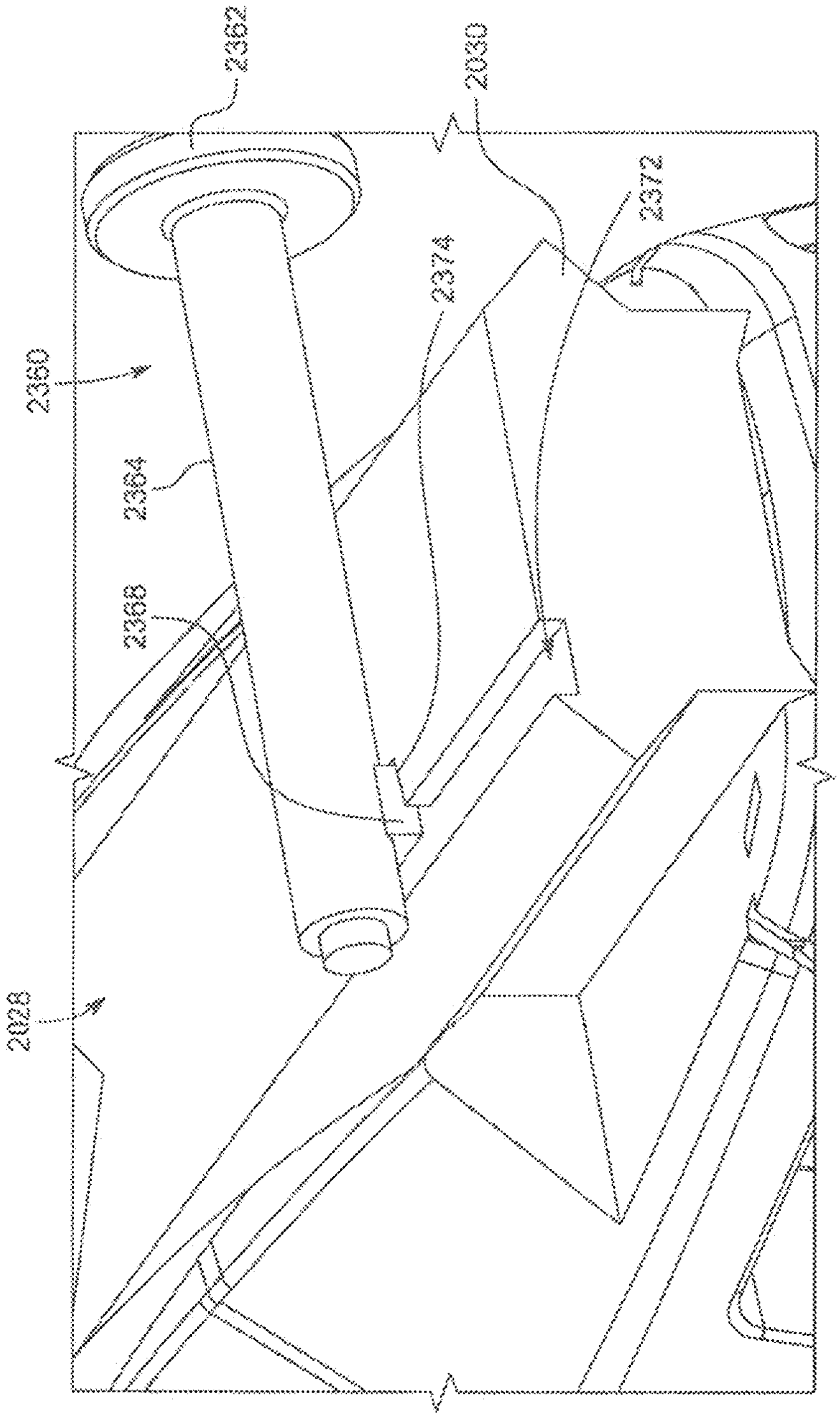
FIG. 47 is an internal view of the coupling system of FIG. 45.

An alternate embodiment of a coupling mechanism 2324L is shown in FIGS. 45-47. In the illustrated embodiment, the coupling mechanism 2324L includes a coupler body 2354, a slidable button 2360, and a button spring 2363. The coupler body 2354, as shown in FIG. 46, has a rail opening 2352L shaped to fit the dovetail rail 2030, and an auxiliary handle support 2356. The slidable button 2360 includes a button handle 2362, a button shaft 2364, a spring support 2367, and a locking extrusion 2368. The button spring 2363 is positioned between an inner wall 2370 of the coupler body 2354 and the spring support 2367. A locking notch 2372 is formed on the dovetail rail 2030 and is L-shaped. To begin the coupling process, the slidable button 2360 is pushed against the button spring 2363 so the locking extrusion 2368 is aligned with the locking notch 2372 in the dovetail rail 2030. When aligned, the coupling body 2354 is slid onto the dovetail rail 2030 via the rail opening 2352L, until the locking extrusion 2366 cannot be slid any further. At an end of the locking notch 2372, the button spring 2362 biases the slidable button 2360 outward, and the locking extrusion 2368 fits into a locking portion 2374 of the locking notch 2372, as seen in FIG. 47. To decouple the coupling mechanism 2324L, the slidable button 2360 is pushed inward against the button spring 2363, and the coupling body 2354 can be slid off the dovetail rail 2030 of the rotary hammer 2004.

Figure 48:
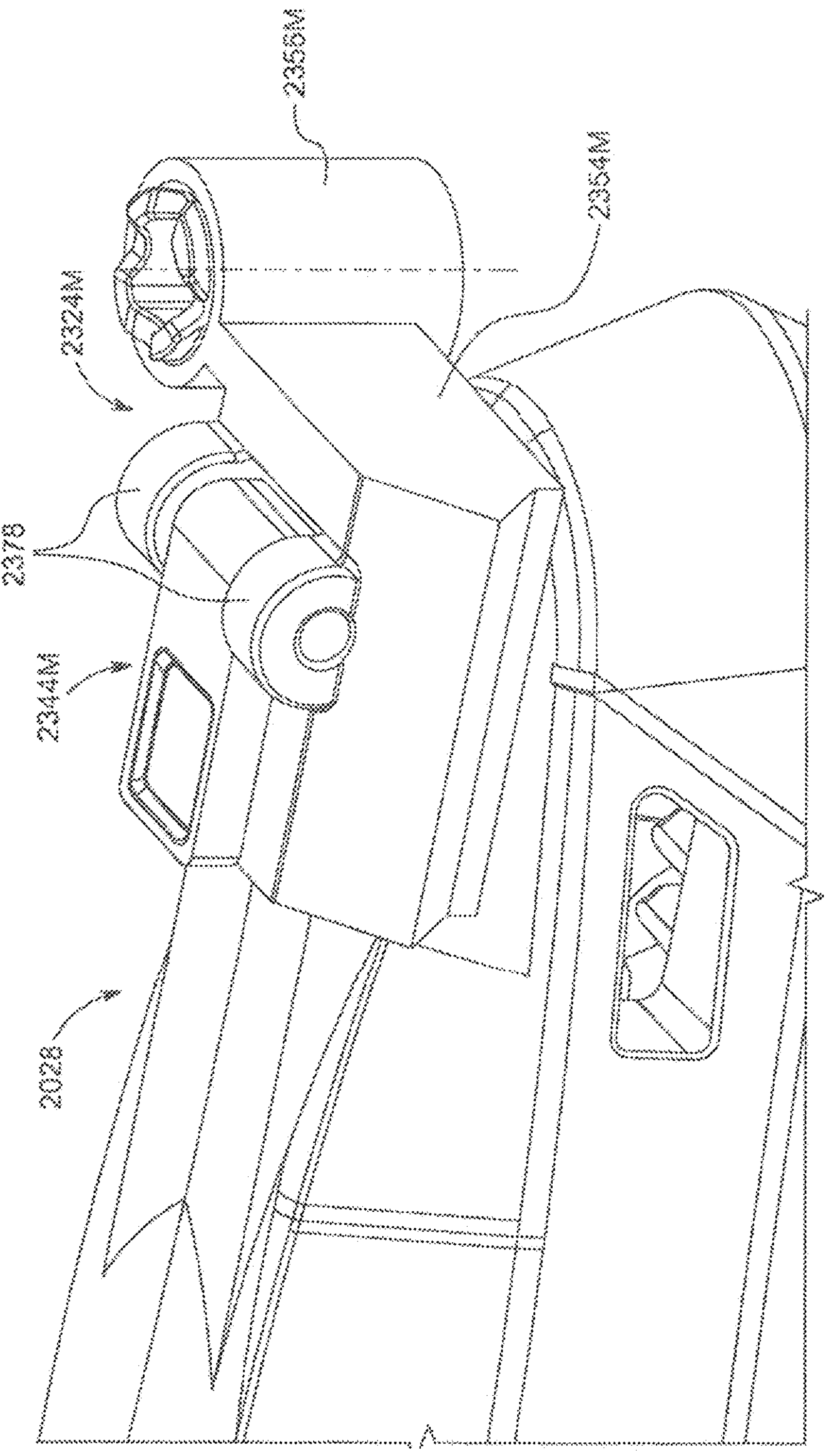
FIG. 48 is a perspective view of an alternate embodiment of a coupling system.
Figure 49:
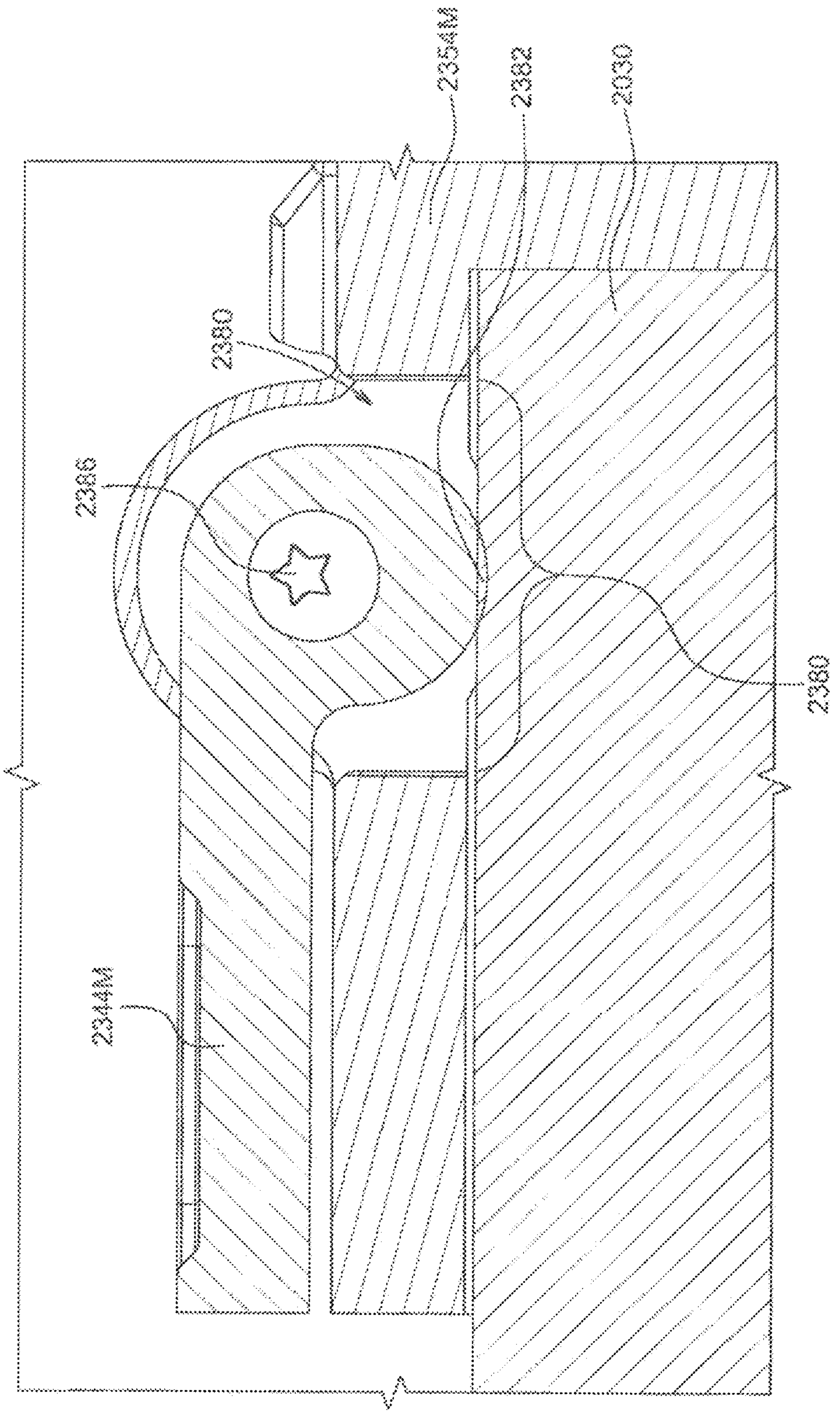
FIG. 49 is a section view the coupling system of FIG. 48.

Another embodiment of a coupling mechanism 2324M is shown in FIGS. 48 and 49. In the illustrated embodiment, the coupling mechanism 2324M includes a coupler body 2354M, a shaft (not shown), and a locking lever 2344M. The coupler body 2354M includes a pair of shaft supports 2378 configured to receive the shaft, a rail opening (not shown) for the dovetail rail 2030, an engagement opening 2380 and an auxiliary handle support 2356M. The locking lever 2344M includes an engagement surface 2382 and a through hole 2384 configured to receive the shaft. The shaft supports 2376 are positioned on top of the coupler body 2354M, and the locking lever 2344M fits in between the shaft supports 2376. In operation, the rail opening (not shown) is slid onto the dovetail rail 2030, and the user rotates the locking lever 2344M. When rotated, the engagement surface 2384 presses against the dovetail rail 2030 through the engagement opening 2380 of the coupler body 2354M, as seen in FIG. 49. When the engagement surface 2384 is pressed against the rail 2030, the friction between the rail 2030 and the coupling body 2354M increases, effectively locking the rail 2030 and coupling body 2354M together. To release the coupling body 2354M from the rail 2030, the locking lever 2344M is rotated in a opposite direction and then the coupling body 2354M can be slid off the rail 2030.

Figure 50A:
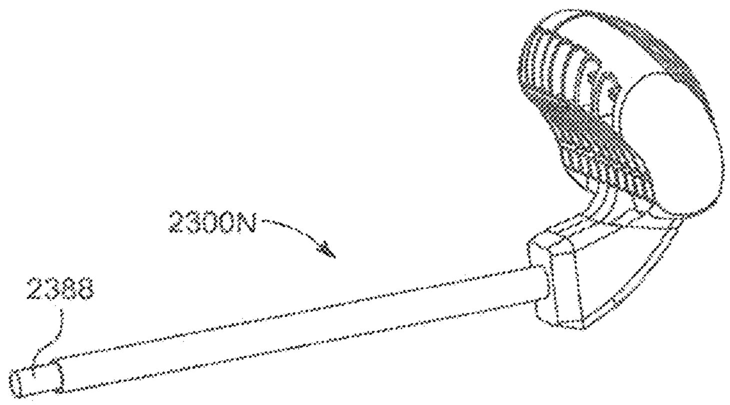
FIG. 50A is a perspective view an alternate embodiment of an auxiliary handle.
Figure 50B:
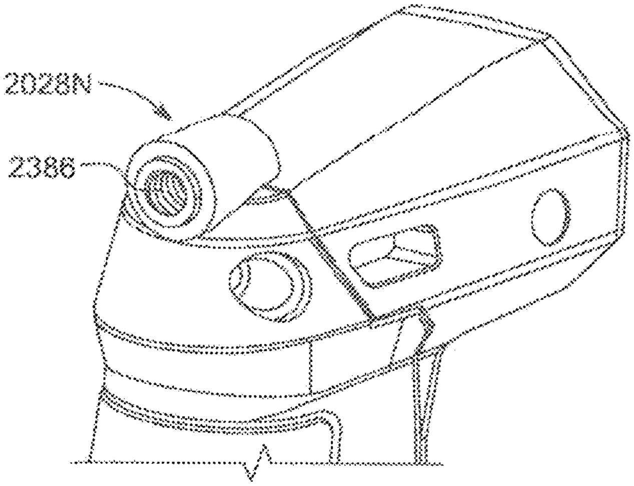
FIG. 50B is a perspective view of an alternate embodiment a back end of the rotary hammer.
Figure 51:
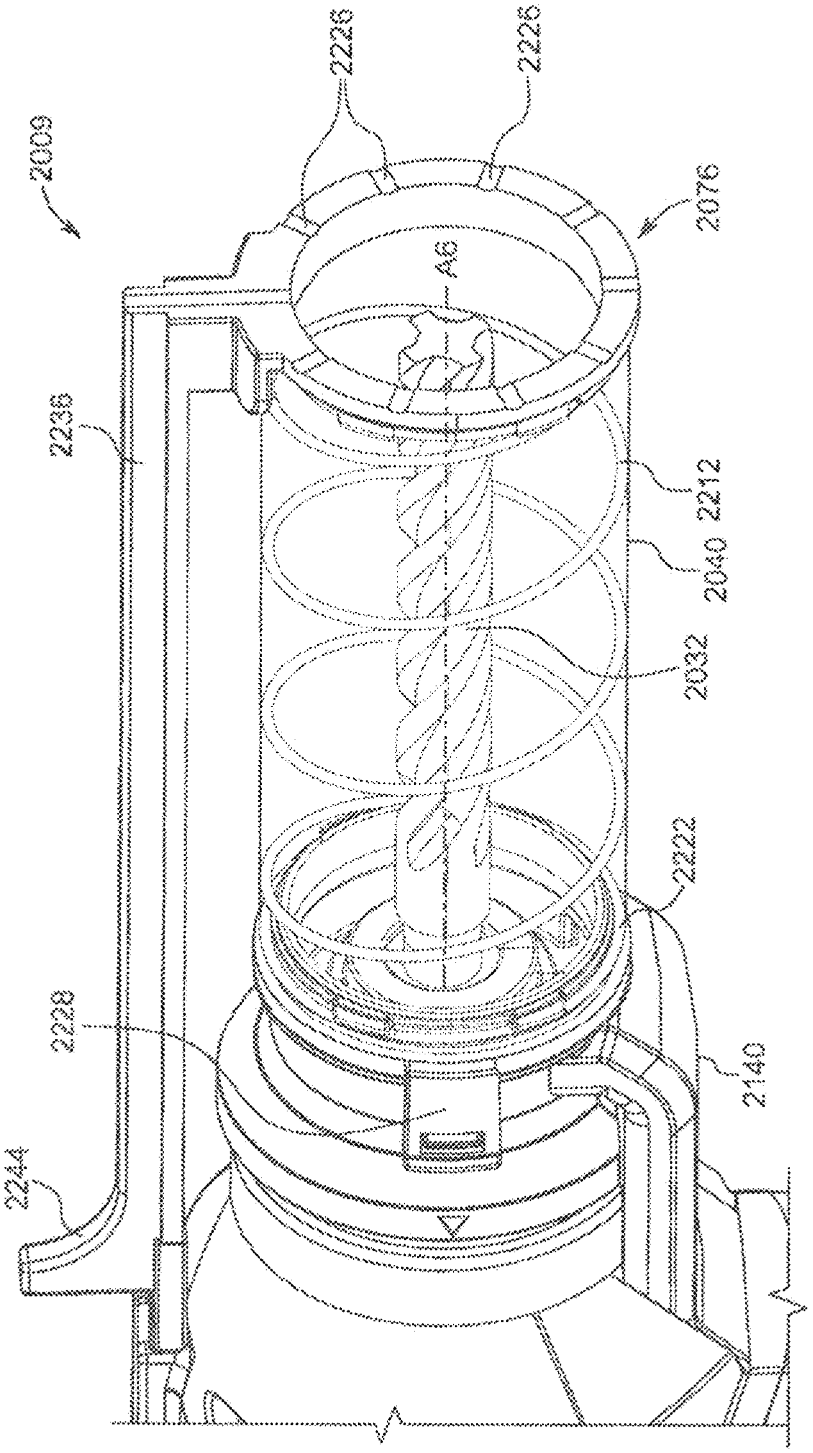
FIG. 51 is a perspective view of the dust tube assembly.

Another embodiment of a coupling mechanism 2324N is shown in FIGS. 50A and 50B. In the illustrated embodiment, the back end 2028N of the rotary hammer 2004 can include a threaded insert 2386. An auxiliary handle 2300N includes a threaded portion 2388 that can be screwed into the threaded insert 2386. To release the auxiliary handle 2300N, the threaded portion 2388 is unscrewed from the threaded insert 2386.

FIG. 48 shows the dust collection assembly 2008, which includes a dust tube 2040, a tube spring 2212, a nozzle 2076, and a tube coupler 2222. It is noted that the illustrated dust tube 2040 is a collapsible style dust tube, however, other types of dust tubes may be used. The dust tube 2040 surrounds the tool bit 2032 and prevents debris from a tooling operation from entering a surrounding environment. Instead, the debris is collected by a suction airflow generated by a suction fan 2092 and is transported from a work surface to a dust container 2084 through the dust tube 2040 and the exterior transfer tube 2140 (see FIG. 33). The tube spring 2212 is fit in between the nozzle 2076 and the tube coupler 2222 and serves to bias the dust tube 2040 into the work-surface. The nozzle 2076 is positioned on a first end of the dust tube 2040 and includes a plurality of airflow grooves 2226. The air flow grooves 2226 are formed radially around the dust tube 2040 and allow for intake of air when pressed against the work surface.

Figure 52:
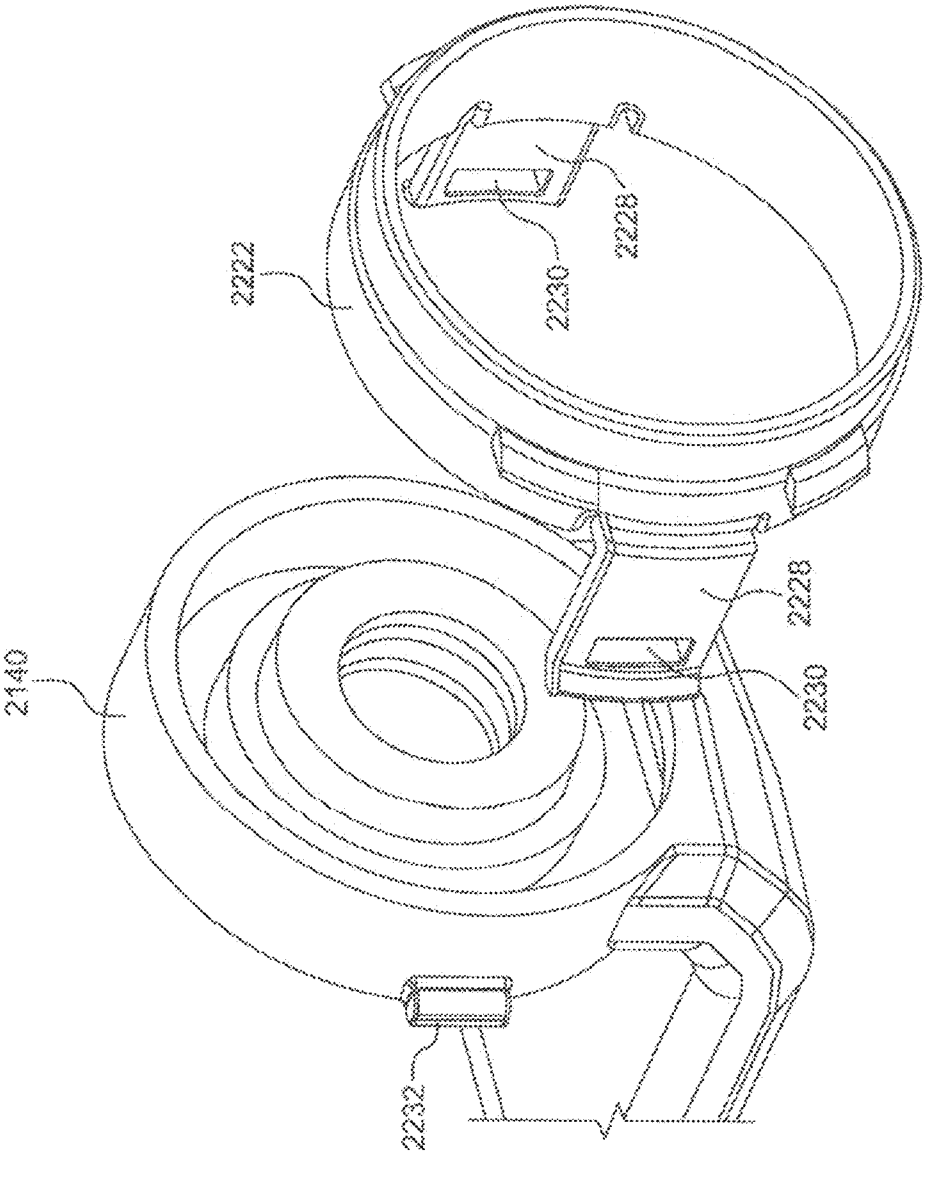
FIG. 52 is an exploded view of a tube coupler and an exterior transfer tube.

FIG. 52 shows how the tube coupler 2222 attaches a second end of the dust tube 2040 to the exterior transfer tube 2140, which creates the suction airflow path. FIG. 52 shows the tube coupler 2222, which includes a set of locking tabs 2228 formed radially on the tube coupler 2222 and each locking tab 2228 includes a locking aperture 2230. On the exterior transfer tube 2140, a set of locking protrusions 2232 are formed radially and are shaped to fit into the locking apertures 2230. To connect the tube coupler 2222 and the second end of the dust tube 2040, the user aligns the locking apertures 2230 on the locking tabs 2228 with the locking protrusions 2232 and slides the tube coupler 2222 along working axis A6. When the locking tabs 2228 reach the locking protrusions 2232, the locking tabs 2228 flex outward until the locking protrusions 2232 fit into the locking apertures 2230. To detach the tube coupler 2222, the user must manually flex the locking tab 2228 outward so the locking protrusion 2232 is no longer inserted into the locking aperture 2220 and slide the tube coupler 2222 outward along working axis A6.

Figure 53A:
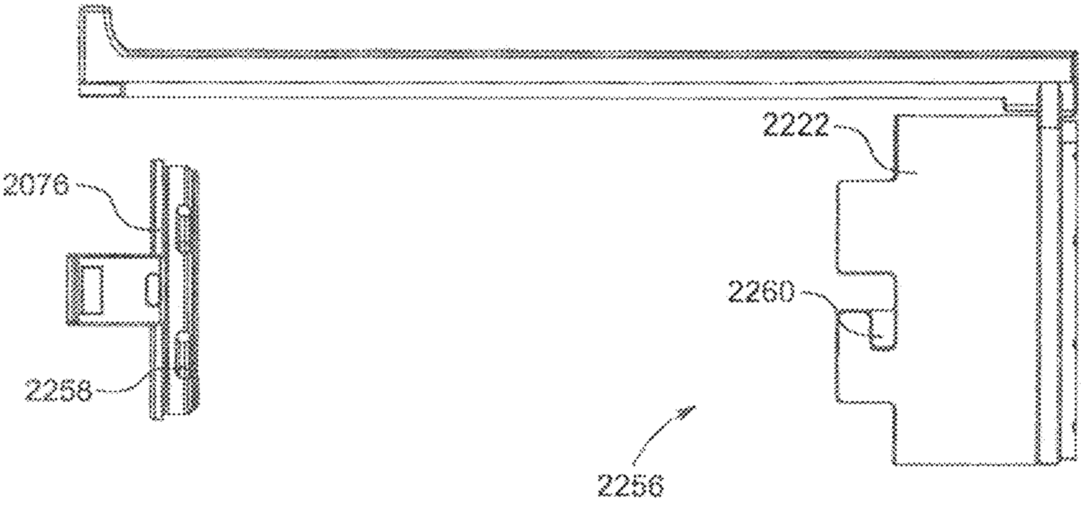
FIG. 53A is a side view of a storage locking assembly in a home position.
Figure 53B:
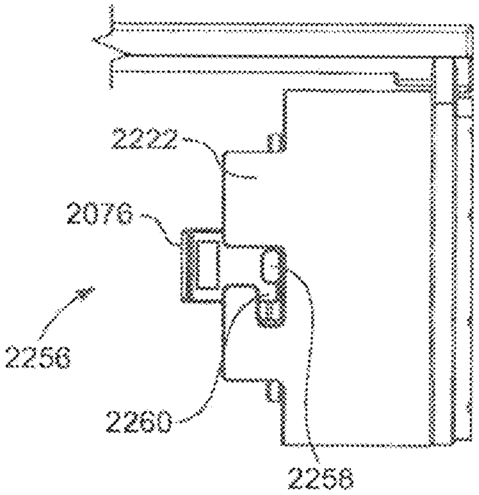
FIG. 53B is a side view of the storage locking assembly with a plurality of radial cams aligned with a plurality of locking slots.
Figure 53C:
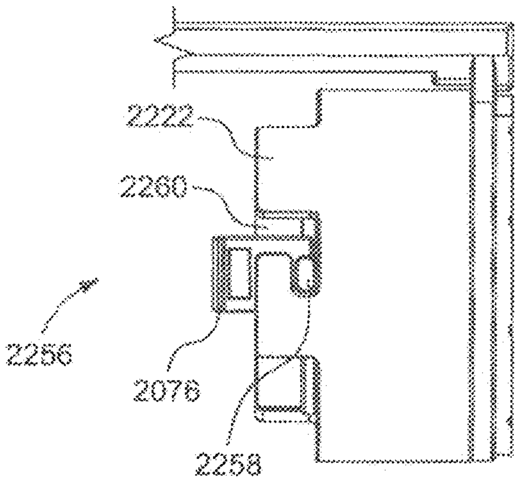
FIG. 53C is a side view of the storage locking assembly in a retracted position.

FIGS. 53A, 53B, and 53C show a storage locking assembly 2256 of the dust collection assembly 2008. When storing the rotary hammer 2004, the user may want to retract the dust tube 2040 to reduce the overall length of the rotary hammer 2004. The storage locking assembly 2256 includes a plurality of radial cams 2258 on the tube end cap 2074 and a plurality of locking slots 2260 on the tube coupler 2222. To move the dust tube 2040 into a collapsed configuration from an expanded configuration (FIG. 53A), the user must compress the dust tube 2040 against the biasing force of the tube spring 2212 using the tube end cap 2074. As the tube end cap 2074 moves closer to the tube coupler 2222, the user must rotate the tube end cap 2074 so the plurality of radial cams 2258 align with the plurality of locking slots 2260, as shown in FIG. 53B. Next, the user inserts the radial cams 2258 into the locking slots 2260 and twists the nozzle 2076 until the radial cams 2258 contact the end of the locking slots 2260, as shown in FIG. 53C. Now, the dust tube 2040 is in a retracted position, and holds this position until the tube end cap 2074 is twisted in the opposite direction.

Figure 54A:
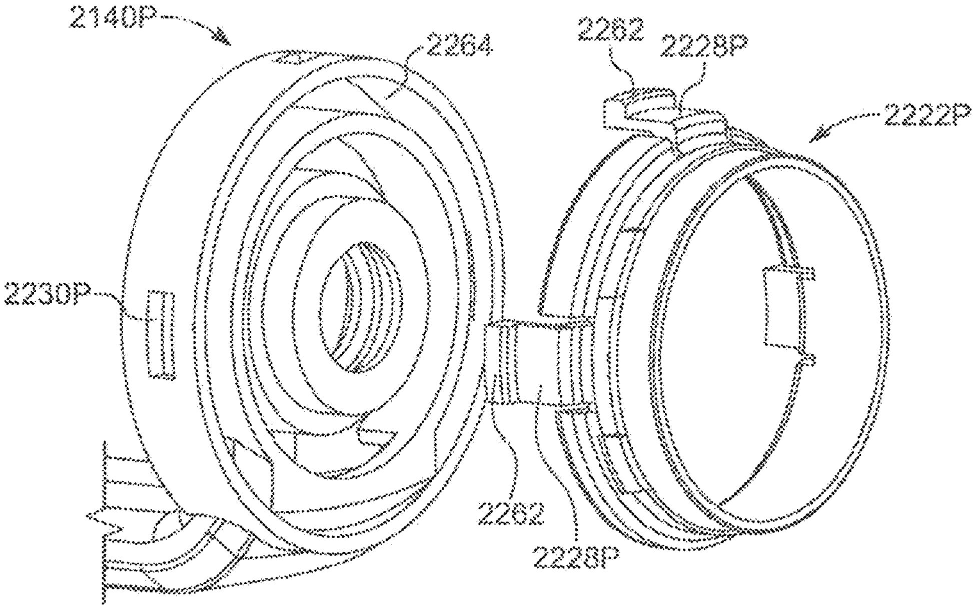
FIG. 54A is an exploded view of an alternate embodiment of a tube coupler and a transfer tube.
Figure 54B:
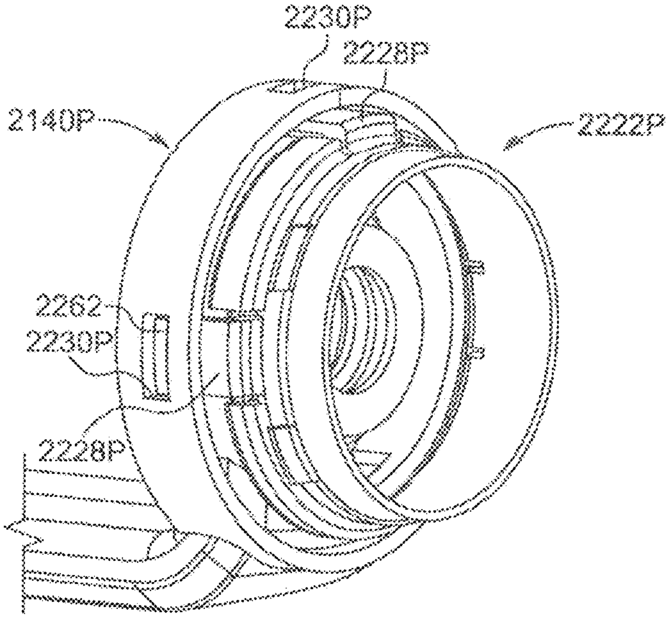
FIG. 54B is a perspective view the tube coupler and the transfer tube of FIG. 54A.

In another embodiment shown in FIGS. 54A and 54B, a tube coupler 2222P including a plurality of locking tabs 2228P and a plurality of locking extrusions 2262. As shown in FIG. 54A, a transfer tube 2140P includes an annular recess 2264 and a plurality of apertures 2230P shaped to fit the locking extrusions 2228P of the tube coupler 2222P. To couple the tube coupler 2222P and the transfer tube 2140P, the user slides the tube coupler 2222P into the annular recess 2264 and aligns the apertures 2230P with the locking extrusions 2262. When properly aligned, the locking extrusions 2228P are inserted into the apertures 2230P and lock rotatably and axially onto the transfer tube 2140P, as shown in FIG. 54B. To remove the tube coupler 2222P, the operator will flex the locking extrusions 2228P inwardly out of engagement with the apertures 2230P.

Figure 55A:
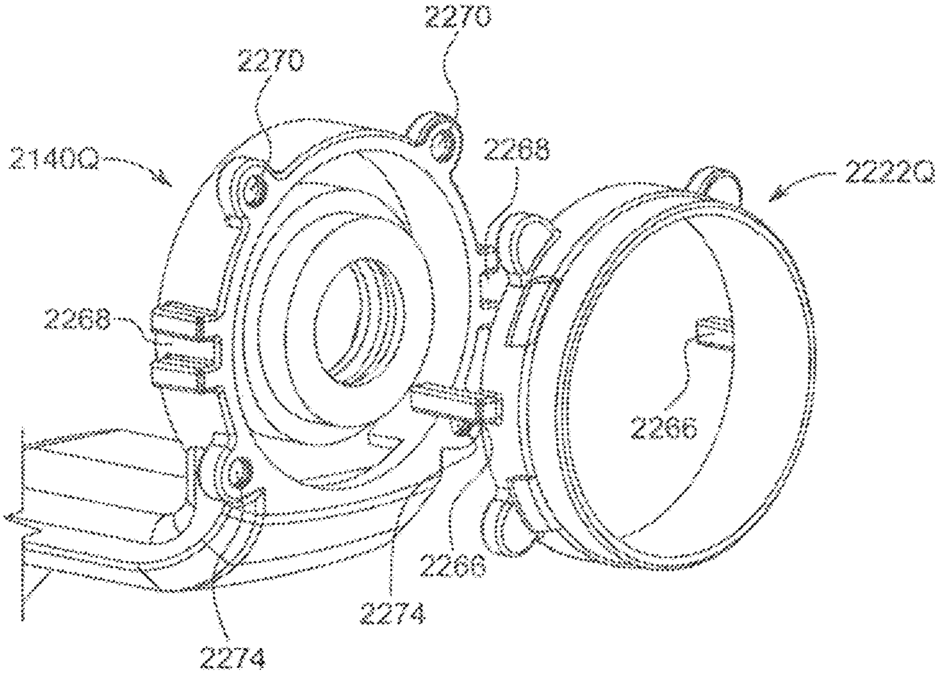
FIG. 55A is an exploded view of an alternate embodiment of a tube coupler and a transfer tube.
Figure 55B:
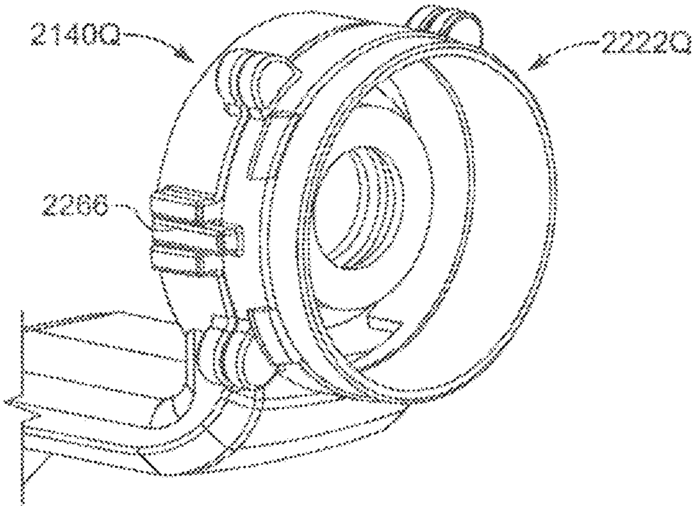
FIG. 55B is a perspective view the tube coupler and the transfer tube of FIG. 55A.

In another embodiment shown in FIGS. 55A and 55B, a tube coupler 2222Q includes a set of alignment extrusions 2266, a first plurality of magnets (not shown), and a first plurality of magnet pockets (not shown) to receive the first plurality of magnets. A transfer tube 2140Q includes a set of alignment slots 2268 shaped to receive the alignment extrusions 2266, a second plurality of magnets (not shown), and a second plurality of pockets 2270 to receive a second plurality of magnets. To couple the tube coupler 2222Q and the transfer tube 2140Q, the user must match the alignment extrusions 2266 on the tube coupler 2222Q with the alignment slots 2268 of the transfer tube 2140Q and slide the tube coupler 2222Q until the first plurality of magnets attracts the second plurality of magnets, or vice versa. When the first and second plurality of magnets contact each other, the tube coupler 2222Q is coupled axially and rotatably to the transfer tube 2140Q, as shown in FIG. 55B.

Figure 56A:
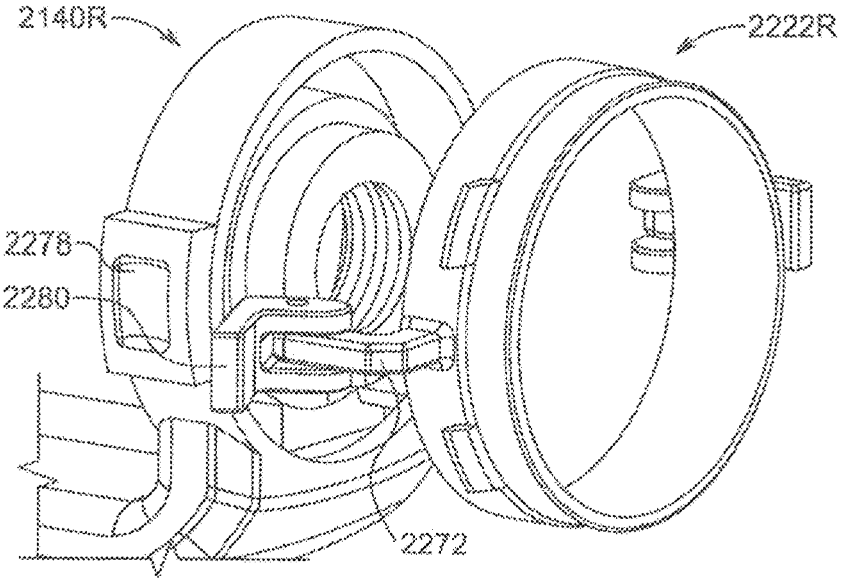
FIG. 56A is an exploded view of an alternate embodiment of a tube coupler and a transfer tube.
Figure 56B:
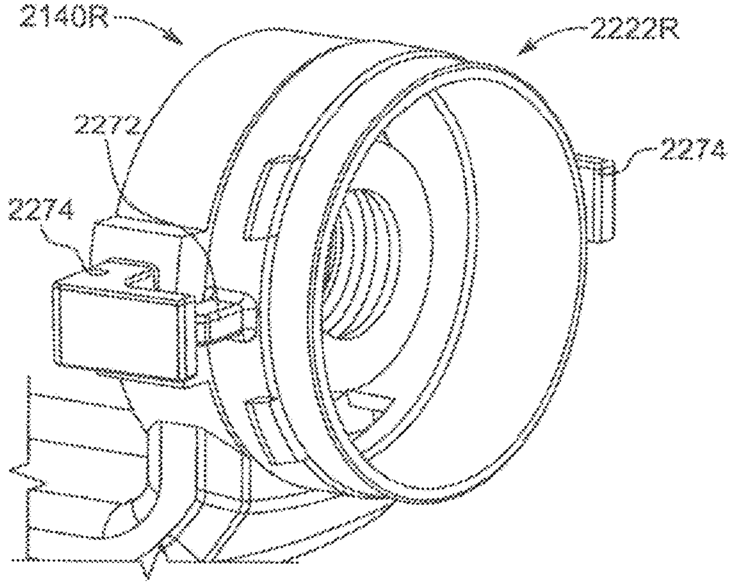
FIG. 56B is a perspective view the tube coupler and the transfer tube of FIG. 56A.

In another embodiment shown in FIGS. 56A and 56B a tube coupler 2222R includes a set of cam levers 2274, and a set of cam lever supports 2272, The cam levers 2274 are hinged on the cam lever supports 2272. A transfer tube 2140R includes a cam opening 2278 shaped to receive an insertion end 2280 of the cam lever 2274. To couple the tube coupler 2222R to the transfer tube 2140R, the user aligns the cam levers 2274 with the cam openings 2278. The user then rotates each of the cam levers 2274 and presses the insertion end 2280 of the cam lever 2274 into the corresponding cam opening 2278. When the insertion end 2280 is pressed into the cam opening 2278, the tube coupler 2222R is locked axially and rotatably onto the transfer tube 2140R.

Figure 57A:
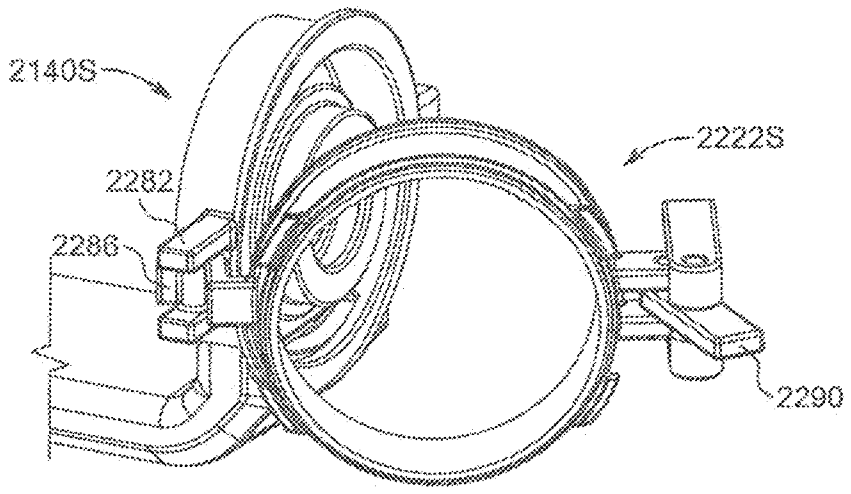
FIG. 57A is a perspective view of an alternate embodiment of a tube coupler and a transfer tube that are partially assembled.
Figure 57B:
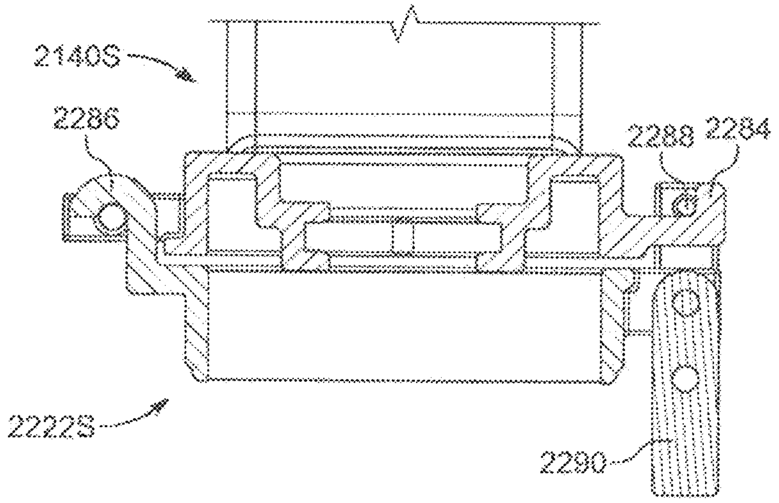
FIG. 57B is a fully assembled top view the tube coupler and the transfer tube of FIG. 57A.
Figure 57C:
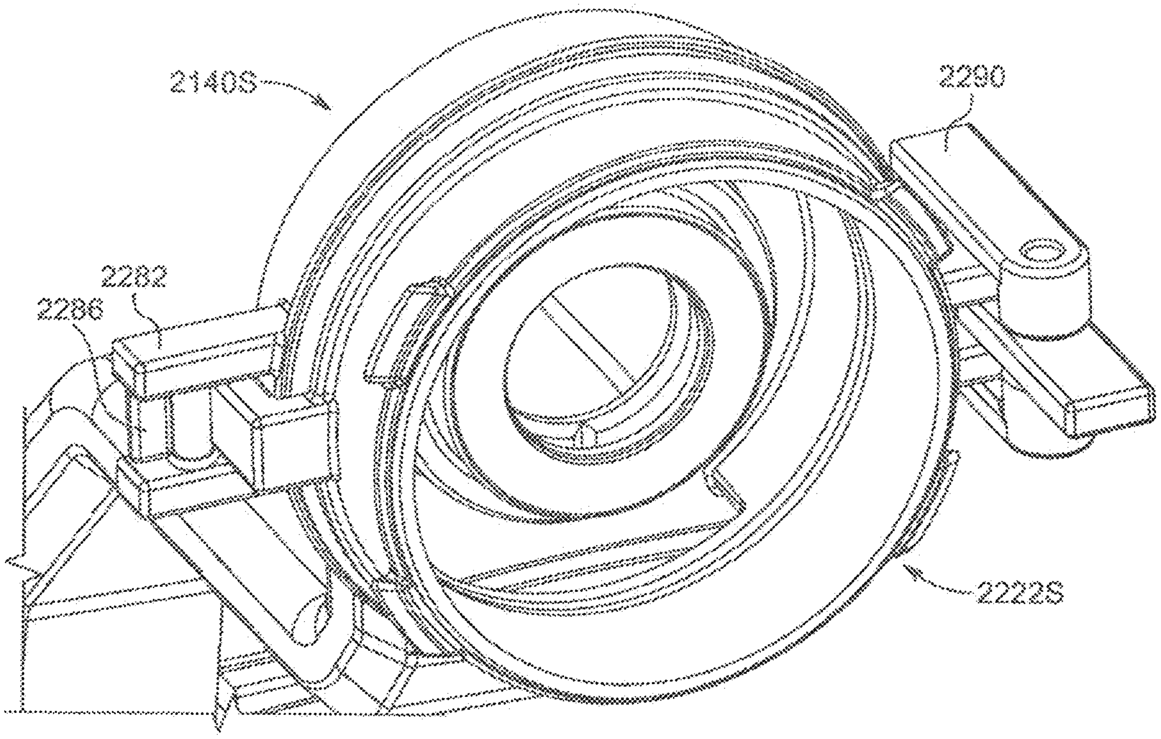
FIG. 57C is a fully assembled perspective view the tube coupler and the transfer tube of FIG. 57A.

In another embodiment shown in FIGS. 57A, 57B, and 57C, a transfer tube 2140S includes an open hinge 2282 and a retaining member 2284. A tube coupler 2222S includes a hinge hook 2286, a locking pin 2288, and a latch 2290. The open hinge 2282 on the transfer tube 2140S can receive a hinge hook 2286, as shown in FIG. 57A. Once the open hinge 2282 receives the hinge hook 2286, the tube coupler 2222S can be rotated to sit flat against the transfer tube 2140S, and the locking pin 2288 can engage with the retaining member 2284 of the transfer tube 2140S, as shown in FIG. 57B. Once the locking pin 2288 is engaged, the latch 2290 can be rotated to surround the retaining member 2284 and lock the rotational position of the tube coupler 2222S. When the latch 2290 is closed and the hinge hook 2286 is engaged, the tube coupler 2222S is axial and rotatably locked to the transfer tube 2140S, as shown in FIG. 57C.

Figure 58B:
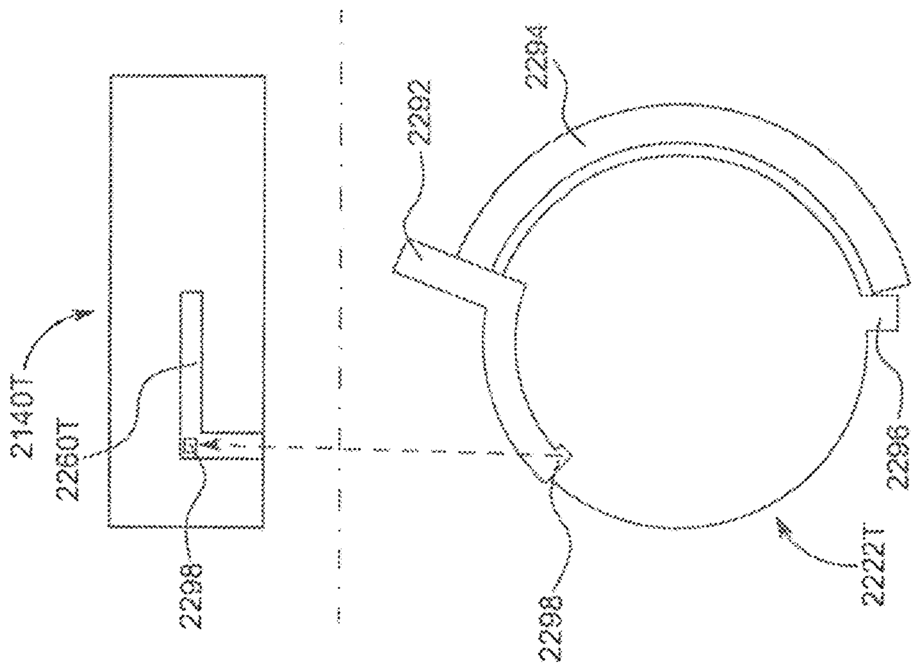
FIG. 58B is a plan view of the tube coupler and the transfer tube of FIG. 58A with the locking feature partially inserted into the locking notch.
Figure 58A:
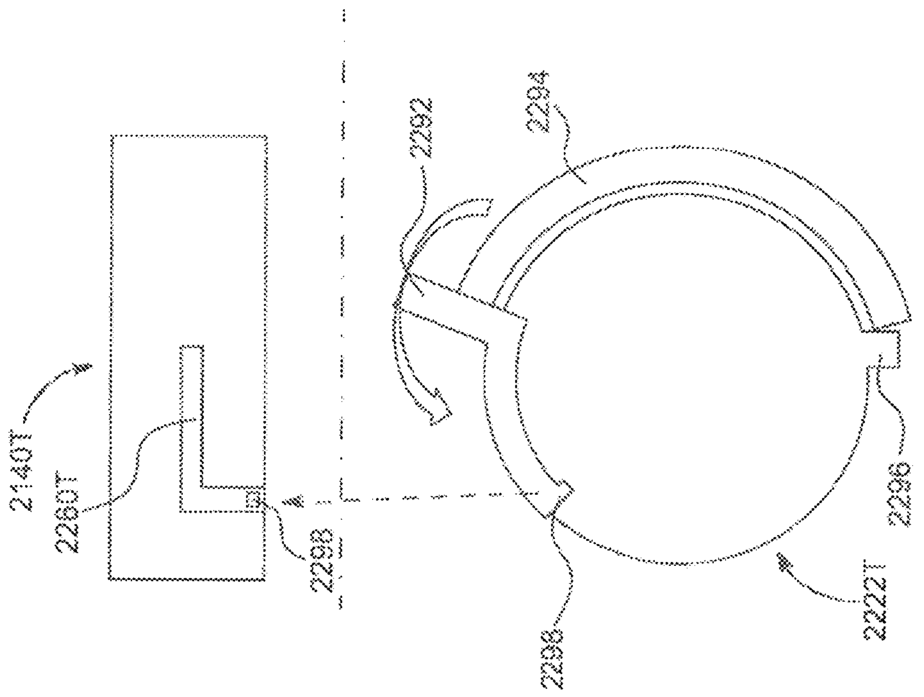
FIG. 58A is a plan view of an alternate embodiment of a tube coupler and a transfer tube with a locking feature aligned with a locking notch.
Figure 58C:
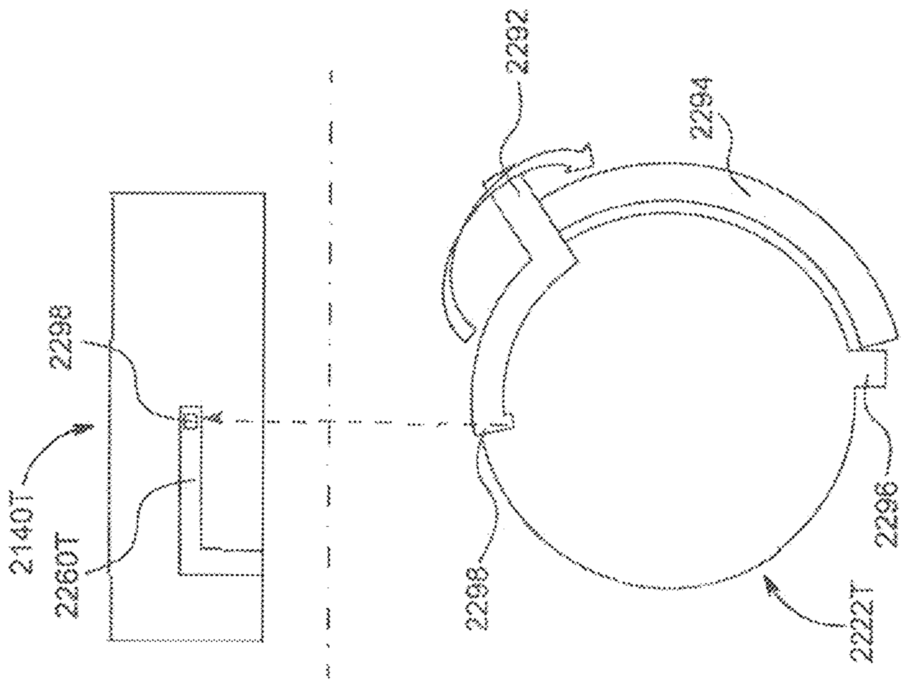
FIG. 58C is a plan view of the tube coupler and the transfer tube of FIG. 58A with the locking feature fully inserted into the locking notch.

In another embodiment shown in FIGS. 58A-C, a transfer tube 2140T includes a locking notch 2260T, and a tube coupler 2222T includes a latch 2290T, a latch spring 2294, and a spring anchor 2296. The locking notch 2260T is formed radially around transfer tube 2140T and can receive a locking feature 2298 of the latch 2290T. To couple the tube coupler 2222T with the transfer tube 2140T, the user rotates the latch 2290T, so the locking feature 2298 lines up with the locking notch 2260T, as shown in FIG. 58A. Once lined up, the user slides the tube coupler 2222T into the locking notch 2260T (FIG. 58B) and releases the latch 2290T. When the latch 2290T is released, the latch spring 2294, connected to both the latch 2290T and the spring anchor 2296, radially biases the locking feature 2298 into the rest of the locking notch 2260T, as shown in FIG. 57C. To uncouple the transfer tube 2140T and the tube coupler 2222T, the user rotates the latch 2290T in an opposite direction and slides the locking feature 2298 outward out of the locking notch 2260T.

Figure 60:
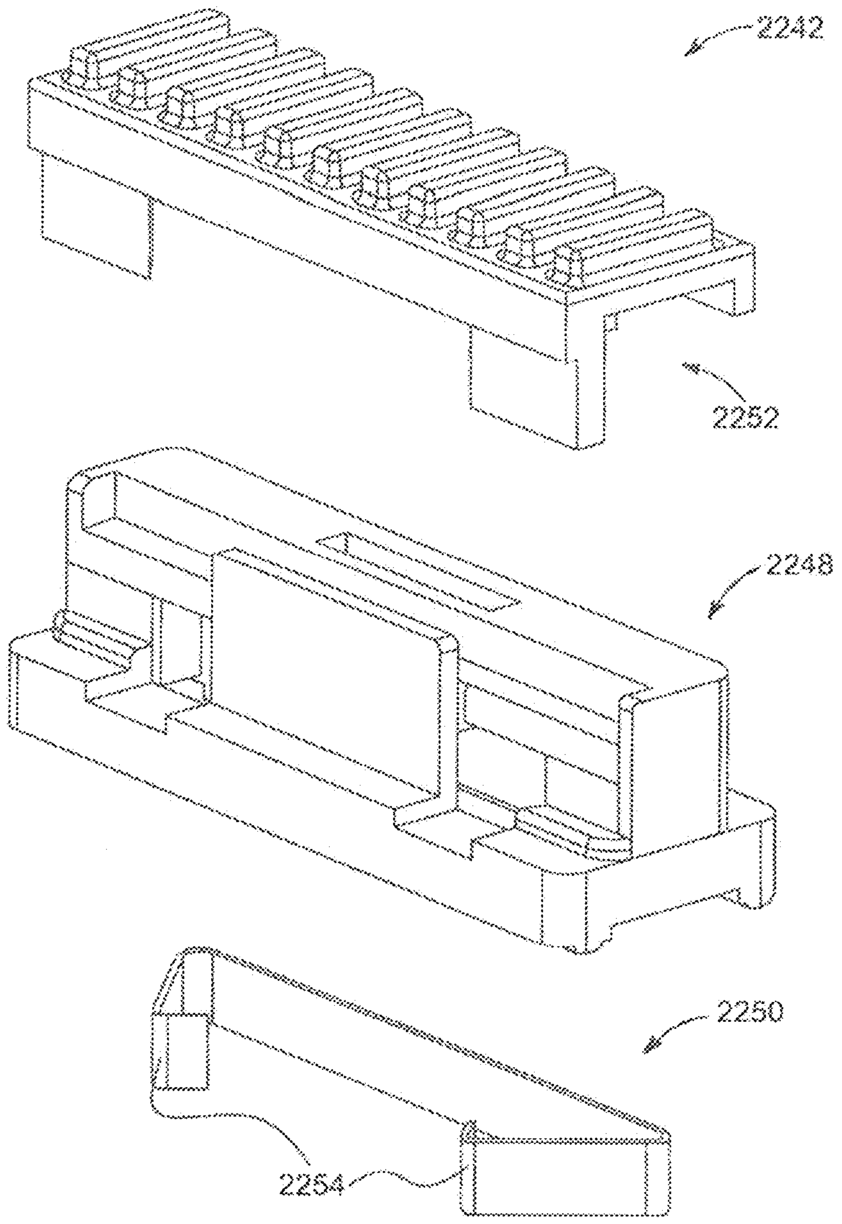
FIG. 60 is an exploded view of an adjustable stop.

FIGS. 59 and 60 show a depth setting assembly 2234, which allows the user to set a maximum drill depth for the tool bit 2032 by preventing the compression of the dust tube 2040. To accomplish this, the depth setting assembly 2234 includes a slidable feature (e.g., slidable feature 2236) axially fixed to the dust tube 2040 and slidable therewith. For example, the slidable feature may be fixed to a first end of the dust tube 2040 and slidable when the dust tube 2040 collapses. A guide member (e.g., guide rail 2238) is configured to guide the slidable feature. For example, the guide rail maybe be an elongated channel, a tubular member (long or short) that guides the slidable feature, or the like capable of guiding the slidable feature for axially movement along the direction of the working axis. The axial movement of the slidable feature relative to the guide rail defines the maximum drill depth for the tool bit 2032. Accordingly, the depth setting assembly 2234 also includes an adjustable stop (e.g., 2242), which is capable of limiting axial movement of the slidable feature, thereby limiting the drill depth for the tool bit 2032.

FIGS. 59 and 60 provide one exemplary embodiment of a depth setting assembly 2234. The illustrated depth setting assembly 2234 includes a slidable feature 2236 on the nozzle 2076, a guide rail 2238, and an adjustable stop 2242, as shown in FIG. 59. The slidable feature 2236 on the nozzle 2076 moves along the guide rail 2238 as the dust tube 2040 is compressed. Also, the user can compress the dust tube 2040 with a manual slide feature 2244 formed into the slidable feature 2236. The guide rail 2238 mounts to a top of the main housing 2016, but in other embodiments the guide rail 2238 could be mounted on a left or right side of the main housing 2016. Additionally, the guide rail 2238 includes a plurality of adjustment notches 2246 that hold the adjustable stop 2242 in place. The adjustable stop 2242 slides along the guide rail 2238 when unlocked and holds its position in the guide rail 2238 when locked. The adjustable stop 2242 comprises of a stop body 2248, a leaf spring 2250, and a direction slider 2252, as shown in FIG. 60. The stop body 2248 holds the leaf spring 2250 and the direction slider 2252 and blocks the slidable feature 2236 from moving further into the guide rail 2238. The leaf spring 2250 provides a locking force to prevent the movement of the adjustable stop 2242 and consists of a set of engagement features 2254. The engagement features 2254 are shaped to fit the adjustment notches 2246 in the guide rail 2238 and are more resilient in one direction along the working axis A6 than the other. The direction slider 2252 is attached to the top of the stop body 2248 and can move in a first direction or a second direction. When moved in either a first or second direction, the direction slider 2252 decouples one of the engagement features 2254 to unlock the adjustable stop 2242. When unlocked, the user moves the adjustable stop 2242 to a new desired location, and then moves the direction slider 2252 in an opposing direction to re-couple the engagement feature 2254 to the adjustment notches 2246 and lock the position of the adjustable stop 2242.

Figure 61A:
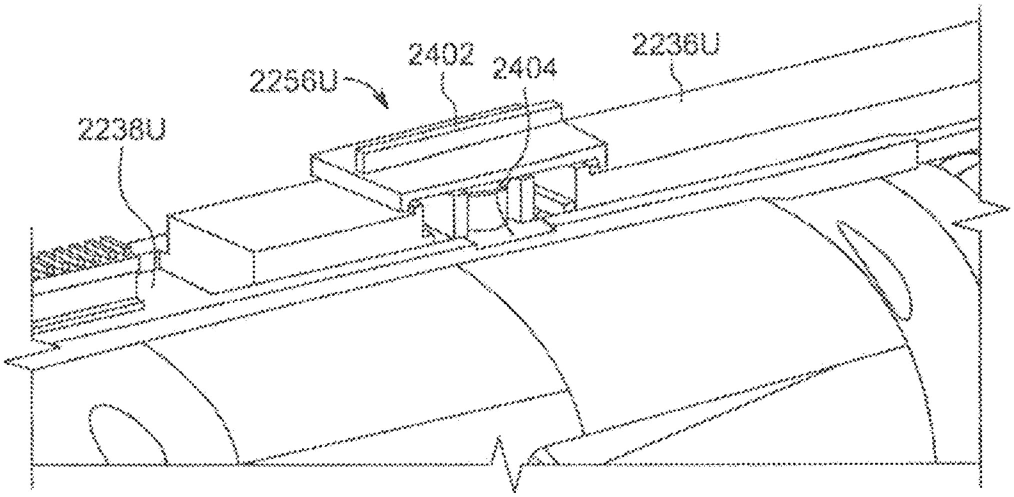
FIG. 61A is a perspective view of an alternate embodiment of a storage locking mechanism in an unlocked configuration.
Figure 61B:
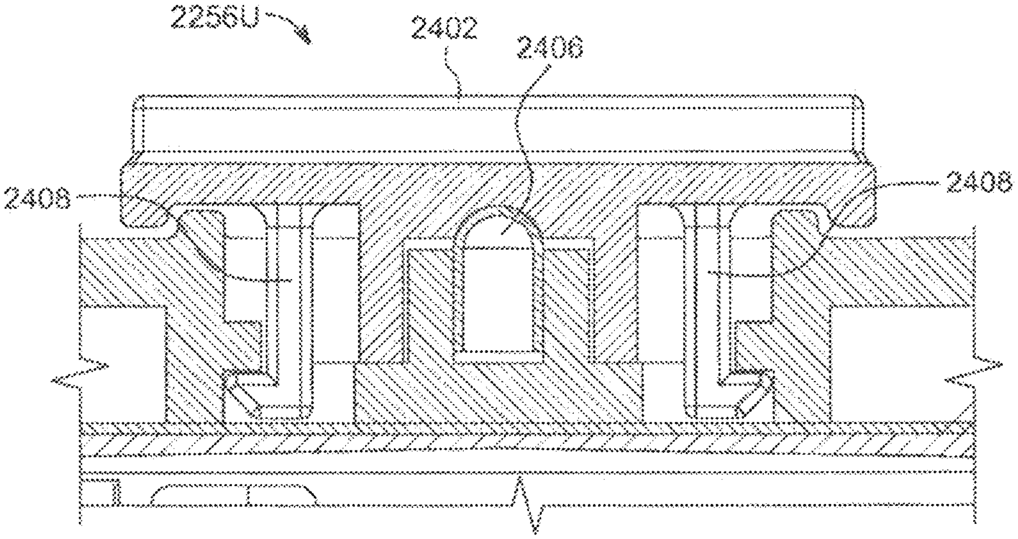
FIG. 61B is a section view of a slidable lock of the storage locking assembly of FIG. 61A.
Figure 61C:
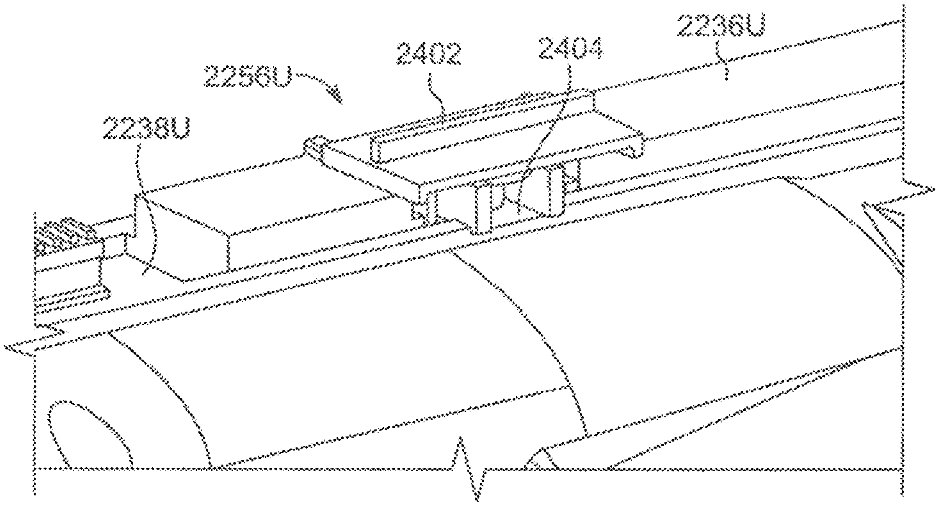
FIG. 61C is a perspective view of the storage locking assembly of FIG. 61A in a locked configuration.

Another embodiment of a storage locking mechanism 2256U is shown in FIGS. 61A-C. The storage locking mechanism 2256U keeps the dust tube 2040 in a retracted state for storage, and includes a slidable lock 2402, a lock retainer 2404, and a spring-loaded detent 2406. To engage the storage locking mechanism 2256U, a slidable feature 2236U is slid along the guide rail 2238U into the minimum position. At the minimum position, the slidable lock 2402, fitted to the slidable feature 2236U via a pair of snap tabs 2408, is aligned to the lock retainer 2404 formed into the guide rail 2238U, as shown in FIG. 58A. To lock the slidable feature 2236U, the user must push the slidable lock 2402 laterally toward the lock retainer 2404, thereby moving the spring-loaded ball detent 2406 (FIG. 61B) downward away from the slidable lock 2402 to release the slidable lock 2402. Further pressing will then move the slidable lock 2402 outward into engagement with the lock retainer 2404. When the slidable lock is in engagement with the lock retainer 2404, as shown in FIG. 61C, the slidable feature 2236U cannot slide along the guide rail 2238U.

Figure 62A:
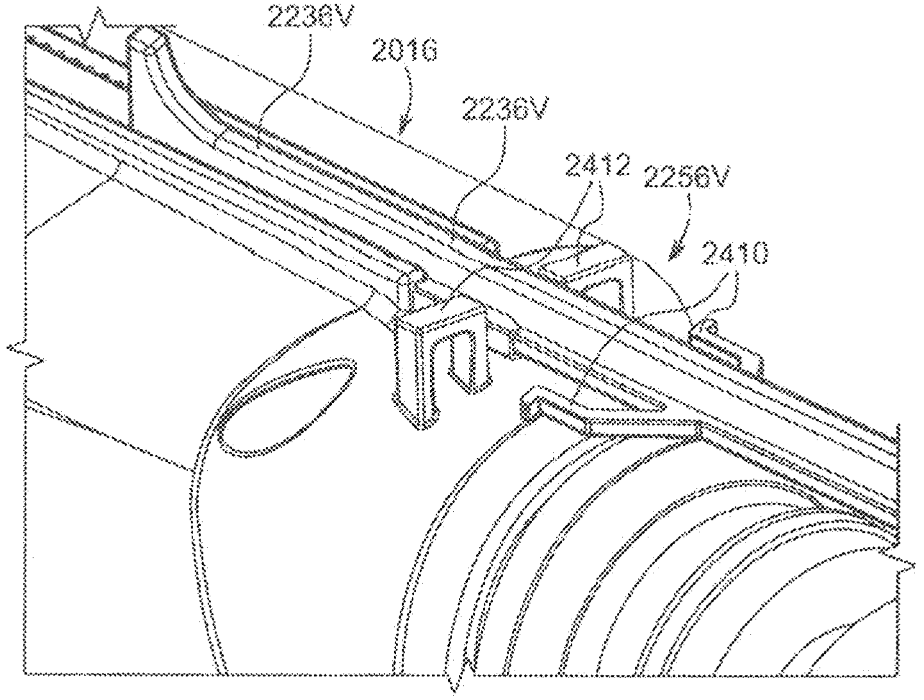
FIG. 62A is a perspective view of an alternate embodiment of a storage locking mechanism in an unlocked configuration.
Figure 62B:
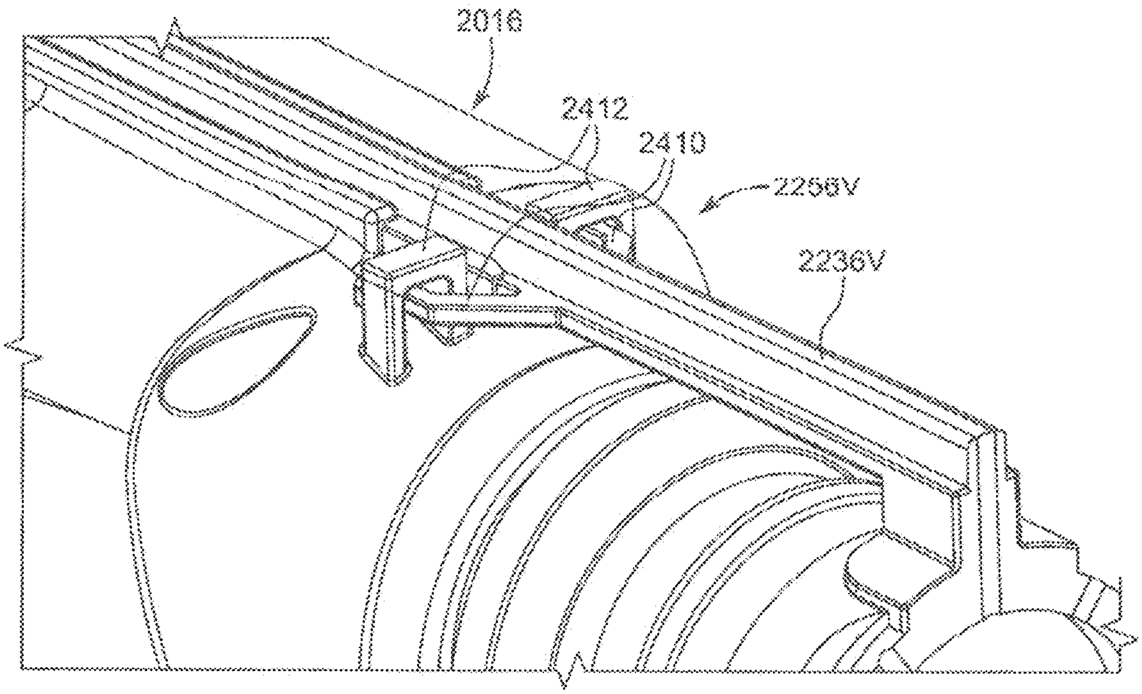
FIG. 62B is a perspective view of the storage locking assembly of FIG. 62A in a locked configuration.

Another embodiment of a storage locking mechanism 2256V is shown in FIGS. 62A and 62B. The storage locking mechanism 2256V includes a pair of snap arms 2410 and a pair of receiving receptacles 2412, as shown in FIG. 62A. The snap arms 2410 are formed into a slidable feature 2236V, which can be slid along a guide rail 2238V to adjust the position of the collapsible dust tube 2040. To engage the storage locking mechanism 2256V, the slidable feature 2236V is slid along the guide rail 2238V to the minimum position. At the minimum position, the snap arms 2410 engage with the receiving receptacles 2412 and prevent the movement of slidable feature 2236V along the guide rail 2238V, as shown in FIG. 62B. To unlock the slidable feature 2236V, the user must simultaneously press on both snap arms 2410 and slide the slidable feature 2236V away from the receiving receptacles 2412.

Figure 63A:
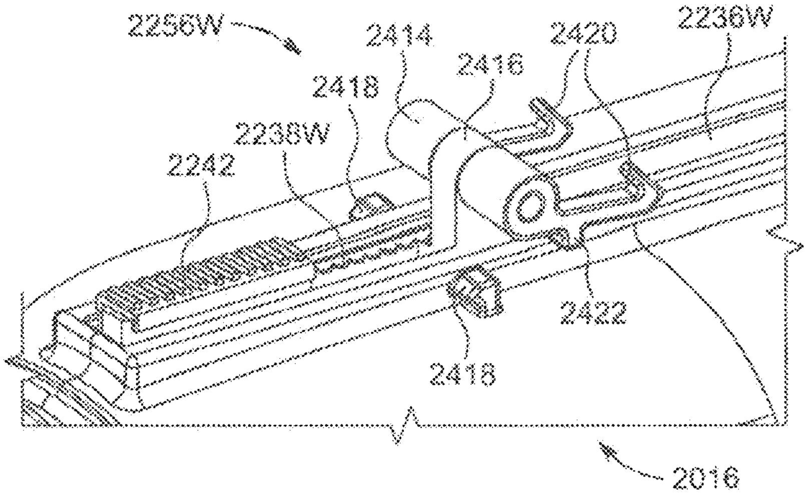
FIG. 63A is a perspective view of an alternate embodiment of a storage locking mechanism in an unlocked configuration.
Figure 63B:
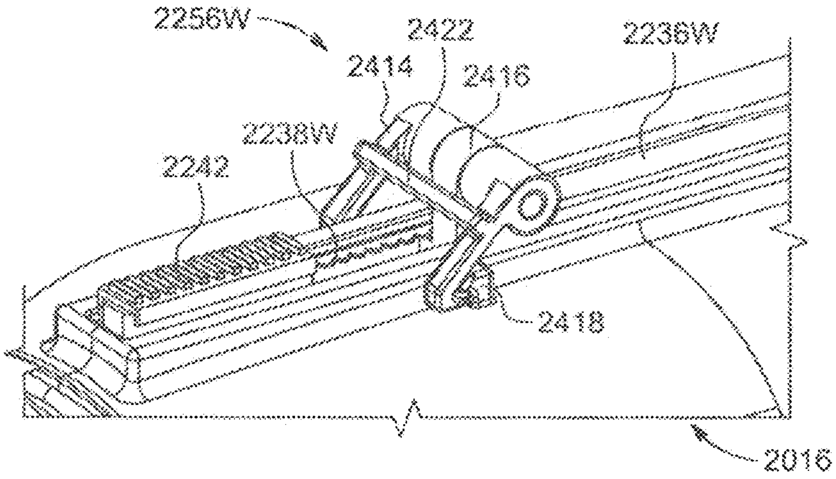
FIG. 63B is a perspective view of the storage locking assembly of FIG. 63A in a locked configuration.

Another embodiment of a storage locking mechanism 2256W is shown in FIGS. 63A and 63B The storage locking mechanism 2256W includes a rotational locking element 2414, mounting interface 2416, and a pair of stationary hooks 2418. The rotational locking element 2414 includes is rotatably coupled to the mounting interface 2416, and includes a pair of lock hooks 2420, and a cross bar 2422 connecting the pair of lock hooks 2420, as shown in FIG. 63A. The mounting interface 2416 is formed onto a slidable feature 2236W, which can be slid along a guide rail 2238W to a minimum position. Once at the minimum position, a user can pivot the rotational locking element 2414 via the cross bar 2422 and to engage the lock hooks 2420 with the stationary hooks 2418 formed into a main housing 2016 of a rotary hammer 2004, as shown in FIG. 64B. When the lock hooks 2420 are engaged with the stationary hooks 2418, the slidable feature 2236W cannot slide along the guide rail 2238W. To unlock the slidable feature 2236W, the user must pivot the rotational locking element 2414 in an opposite direction, and out of engagement with the stationary hooks 2418.

Figure 64A:
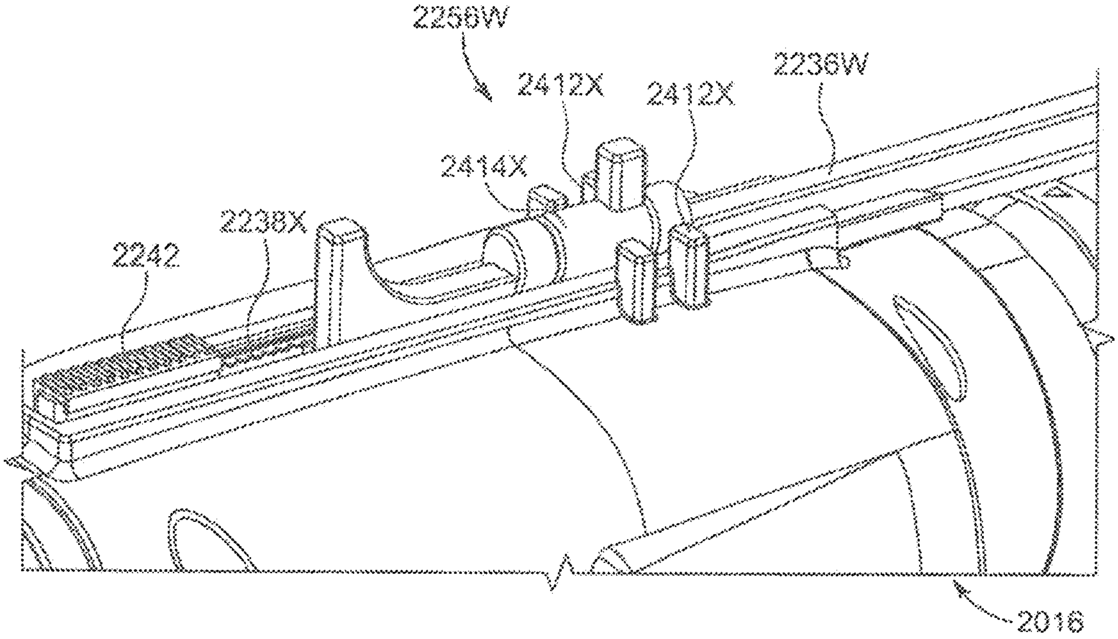
FIG. 64A is a perspective view of an alternate embodiment of a storage locking mechanism in an unlocked configuration.
Figure 64B:
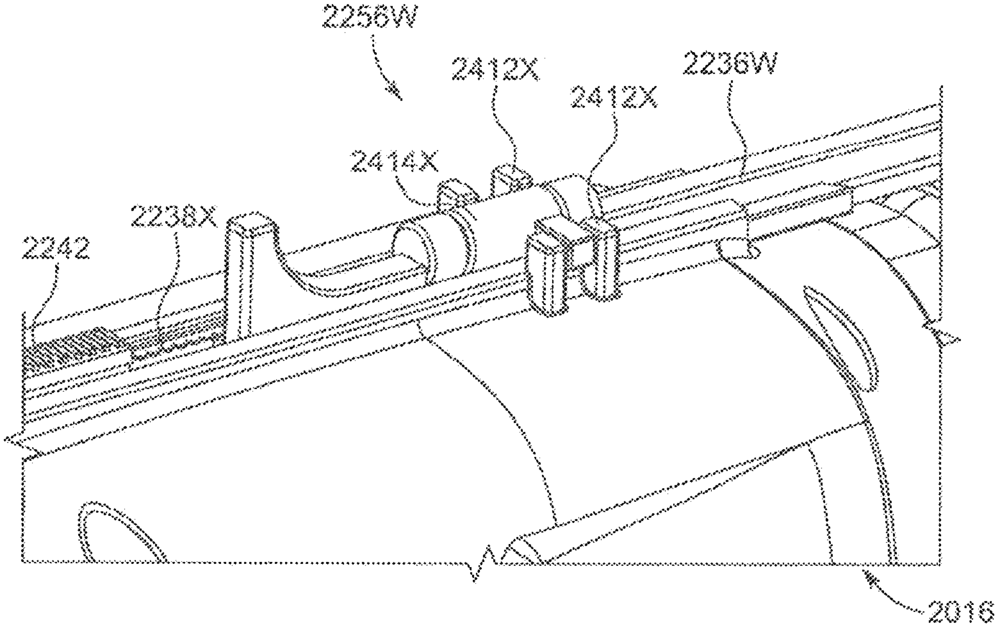
FIG. 64B is a perspective view of the storage locking assembly of FIG. 64A in a locked configuration.

Another embodiment of a storage locking mechanism 2256X is shown in FIGS. 64A and 64B. The storage locking mechanism 2256X includes a rotational locking element 2414X, and a pair of receiving receptacles 2412X, as shown in FIG. 64. The rotational locking element 2414X is mounted to a slidable feature 2236X. The receiving receptacles 2414X are formed on the main housing 2016 of a rotary hammer tool 2004 and are shaped to fit the rotational locking element 2414X. To engage the rotational locking element 2414X, the slidable feature 2236X is slid along a guide rail 2238X to a minimum position. Once at the minimum position, a user can rotate the rotational locking element 2414X either clockwise or counterclockwise 90 degrees and engage the rotational locking element 2414X with one of the pair of receiving receptacles 2412X, as shown in FIG. 64B. When the rotational locking element 2414X is engaged with one of the pair of receiving receptacles 2412X, the slidable feature 2236X can no longer be slid along the guide rail 2238X. To unlock the slidable feature 2236X, the user pivots the rotational locking element 2414X in 90 degrees in an opposite direction, and out of engagement with the receiving receptacles 2412X.

Figure 65A:
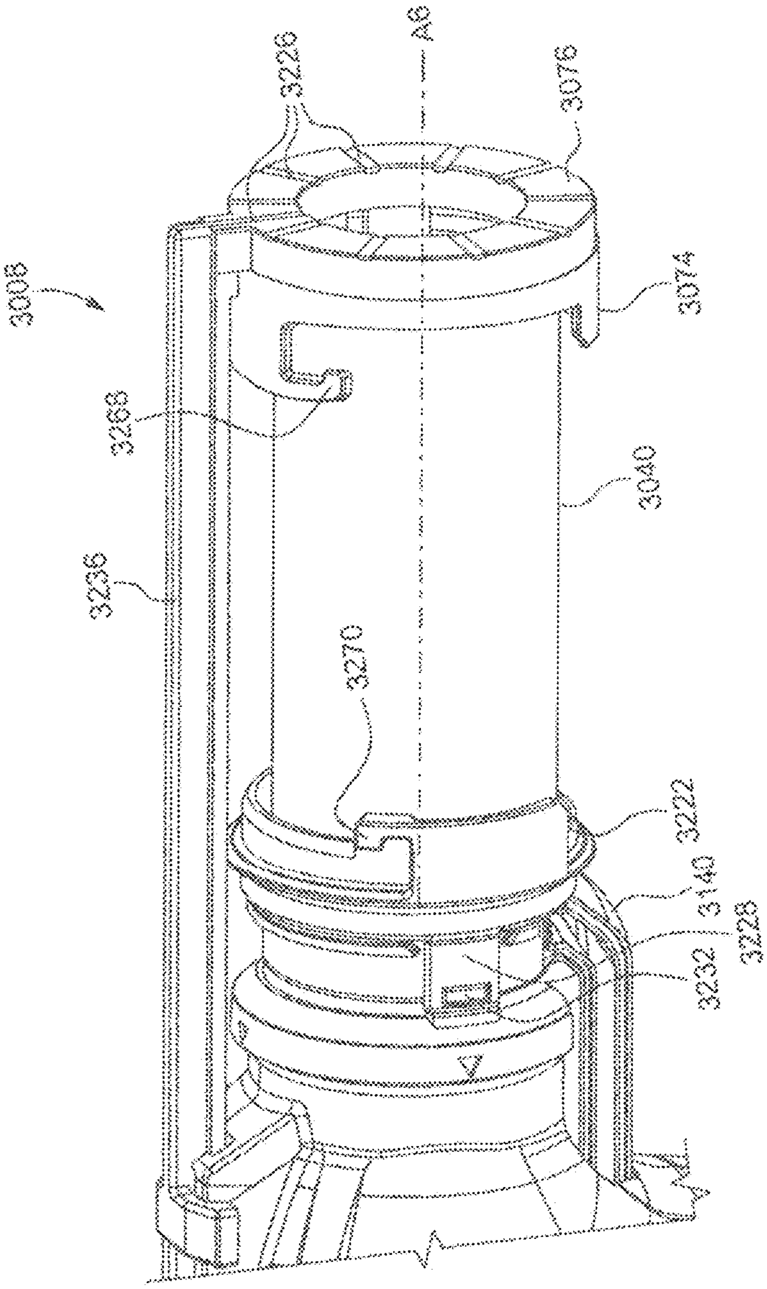
FIG. 65A is a perspective view of an alternate embodiment of a dust tube assembly in an expanded configuration.
Figure 65B:
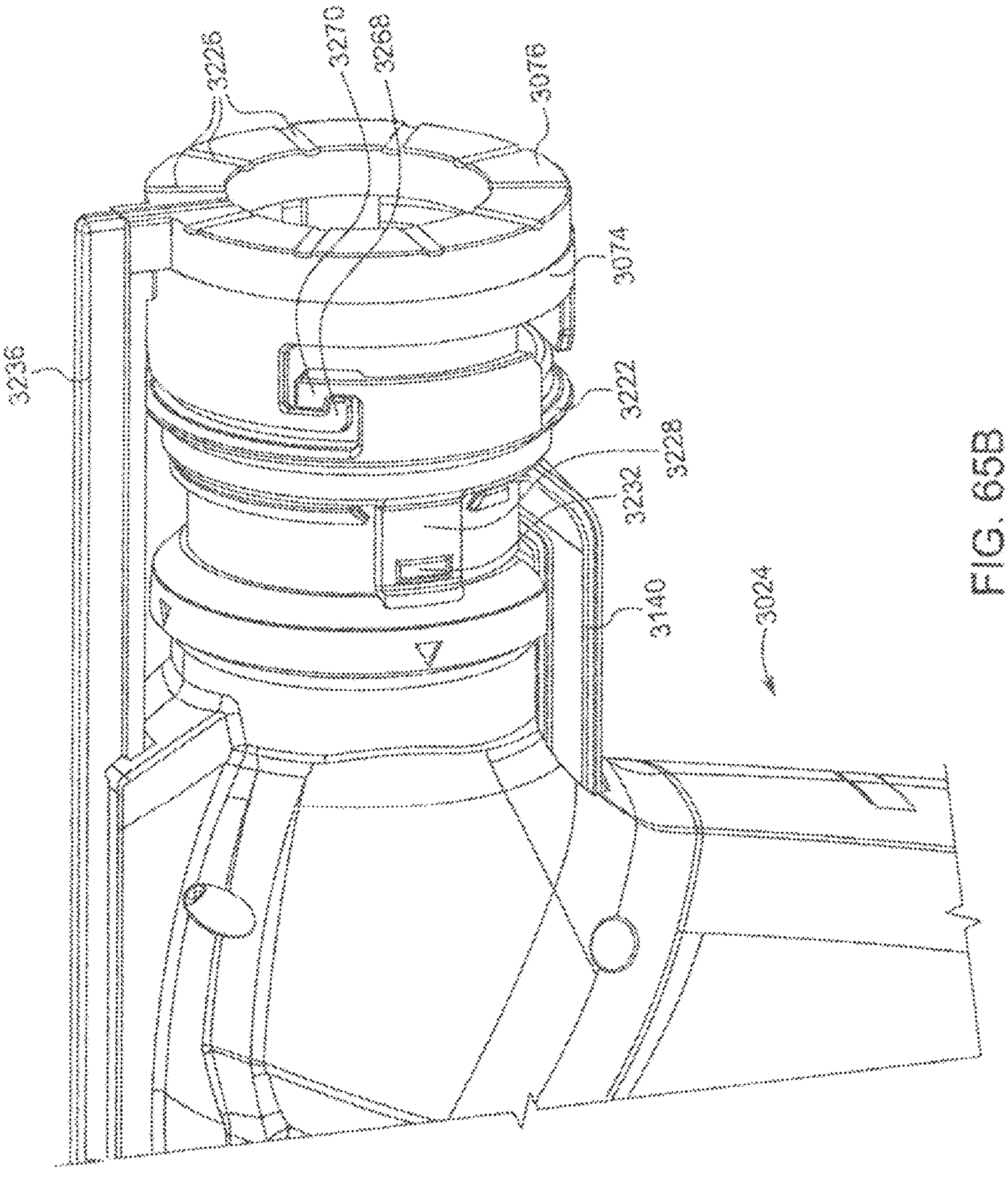
FIG. 65B is a perspective view the dust tube assembly of FIG. 65A in a collapsed position.

FIGS. 65A-B illustrates a dust collection assembly 3008, which can replace the dust collection assembly 2008. The dust collection assembly 3008 includes a dust tube 3040, a tube spring 3312 (FIG. 37), a nozzle 3076, a tube coupler 3222, a tube end cap 3074, and a transfer tube 3140. However, it should be understood that in some embodiments the dust collection assembly 2008 may not include all of these components.

In the illustrated embodiment, the dust tube 3040 is composed of a flexible material, such as a fabric (e.g., nylon) or flexible plastic able to be compressed as the dust tube 3040 is moved along working axis A6 between an expanded configuration and a collapsed configuration. In other embodiments, the dust tube 3040 may be a rigid tube or a telescoping tube. The dust tube 3040 is biased towards the expanded configuration and is moved towards the collapsed position either during a drilling operation or for storage. The tube spring 3312 is disposed between the tube coupler 3222 and tube end cap 3074 and biases the dust tube 3040 to an expanded configuration (FIG. 65A). The nozzle 3076 and the tube end cap 3074 are disposed on a second end of the dust tube 3040. It should be understood that in some embodiments, the nozzle 3076 may be integrally formed on the end cap 3074 while in other embodiments, the nozzle 3076 and the end cap 3074 are formed as separate pieces. The nozzle 3076 may further includes a plurality of airflow grooves 3226.

The dust tube 3040 is removably coupled to the housing of the power tool by the tube coupler 3222. The tube coupler 3222 is positioned on the first end of the dust tube 2040 and includes a set of locking tabs 3228 that selectively couple to a set of locking protrusions 2232 on the transfer tube 3140. In some embodiments, the locking tabs 3228 may be coupled directly to the housing of the power tool. Likewise, in some embodiments, there may be a greater or fewer number of locking tabs 3228. In other embodiments, the dust tube 3040 may not be removably coupled to the housing.

The tube coupler 3222 and the tube end cap 3074 may also form another embodiment of a storage locking assembly 3256. The storage locking assembly 3256 is configured to hold the dust tube 3040 in a collapsed configuration for storage and transport, wherein the length of the dust tube 3040 is less than the length of the dust tube 3040 when in the expanded configuration. The tube end cap 3074 includes a first locking feature 3268, which may be selectively coupled to a second locking feature 3270 on the tube coupler 3222. In the illustrated embodiment, the first locking features is in the form of a pair of first locking arms 3268 and the second locking feature is in the form of a pair of second locking arms 3270. The first pair of locking arms 3268 is selectively engageable with the second pair of locking arms 3270 to selectively lock the dust tube 3040 in the collapsed position. In some embodiments, there may be a greater or few number of locking arms 3268 and 3270. Furthermore, in other embodiments, the first locking feature 3268 and the second locking feature 3270 may be other types of locking features, such as detent members, hooks, snap fit connectors, etc. that are capable of selectively locking the axial position of the tube end cap 3074 relative to the tube coupler 3222 in order to maintain the dust tube 3040 in the collapsed position.

In a default position, the dust tube 3040 is biased towards the expanded configuration and the first pair of locking arms 3268 and the second pair of locking arms 3270 are not engaged. To transition the dust tube 3040 into the collapsed configuration, the user compresses the dust tube 3040 along working axis A6, which also moves first pair of locking arms 3268 and the tube end cap 3074 along the working axis A6. Once the dust tube 3040 is fully compressed, the user can rotate the tube end cap 3074 in a first direction (e.g., counterclockwise) around the working axis A6 until the first locking arms 3268 contact the tube coupler 3222. Next, the user releases the tube end cap 3074, and the tube spring 3312 biases the first locking arms 3268 partially outward and into engagement with the second pair of locking arms 3270, as shown in FIG. 65B. The dust tube 3040 is now in a collapsed configuration.

To transition the dust tube 3040 to the expanded configuration, the user once again compresses the dust tube along working axis A6 and twists the tube end cap 3074 in a second direction (e.g., clockwise) until the second locking arms are no longer in line with the first locking arms 3268. Then, the user can release the dust tube 3040 and the tube spring 3212 will bias the dust tube 3040 outward along working axis A6. In other embodiments, the tube end cap 3074 is rotated in a clockwise direction around the working axis A6 to hold the dust tube 3040 in a collapsed position and the dust tube is released by rotating the tube end cap 3074 in a counterclockwise direction. The tube end cap 3074 may be rotated about the working axis and relative to the nozzle 3076, which may remain stationary as the tube end cap 3074 rotates.

Figure 66:
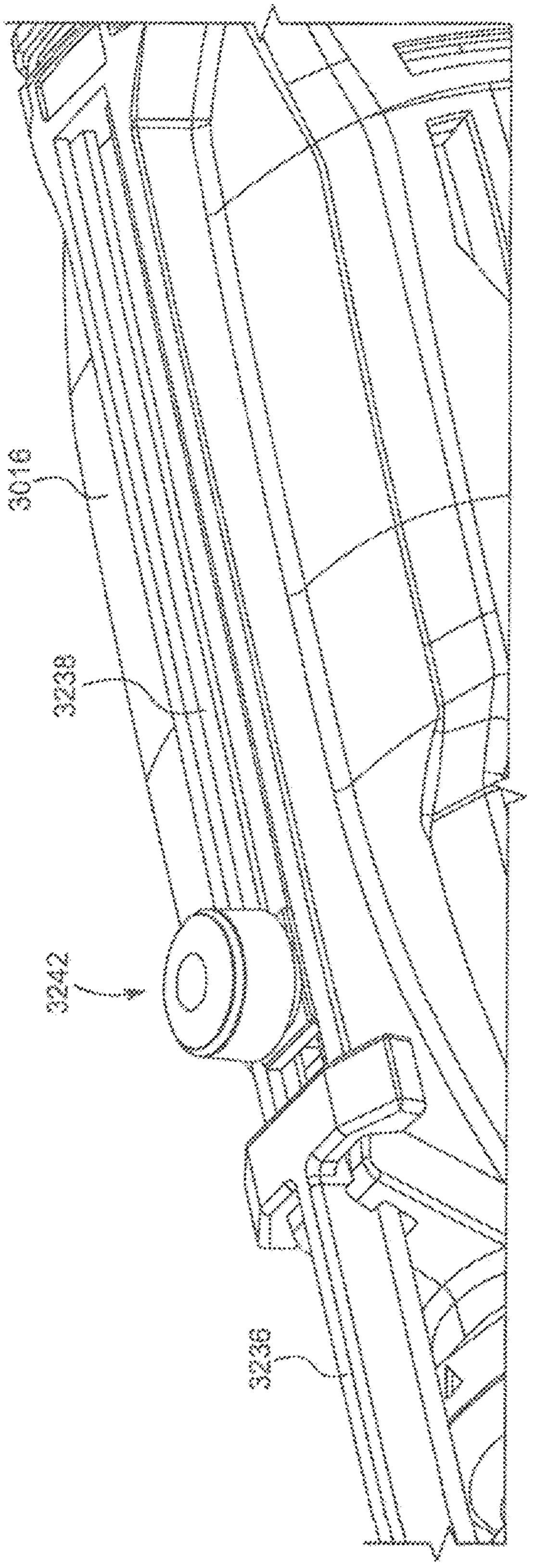
FIG. 66 is a perspective view of an alternate embodiment of a depth setting assembly.
Figure 67:
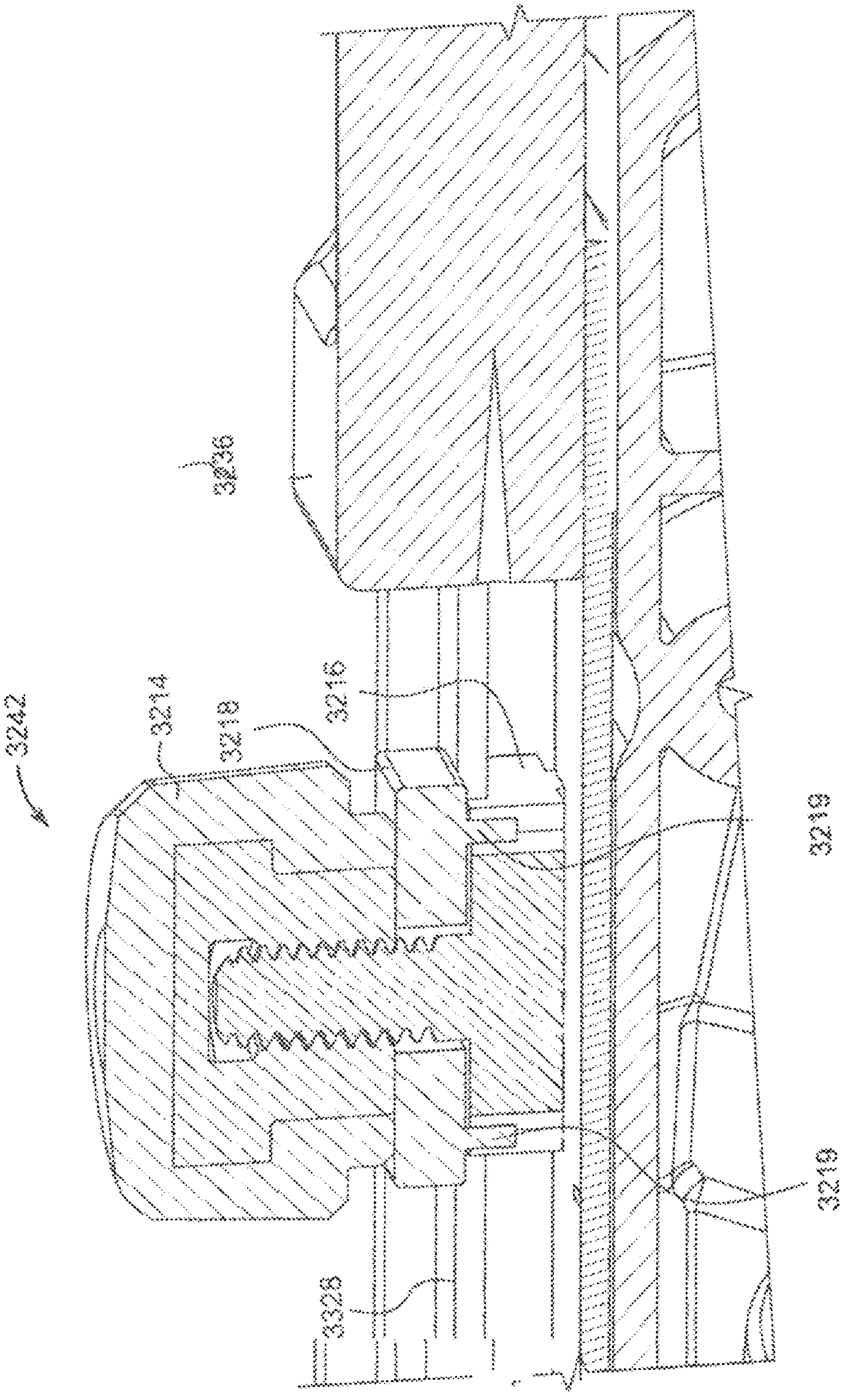
FIG. 67 is a section view of the depth setting assembly of FIG. 66.
Figure 68:
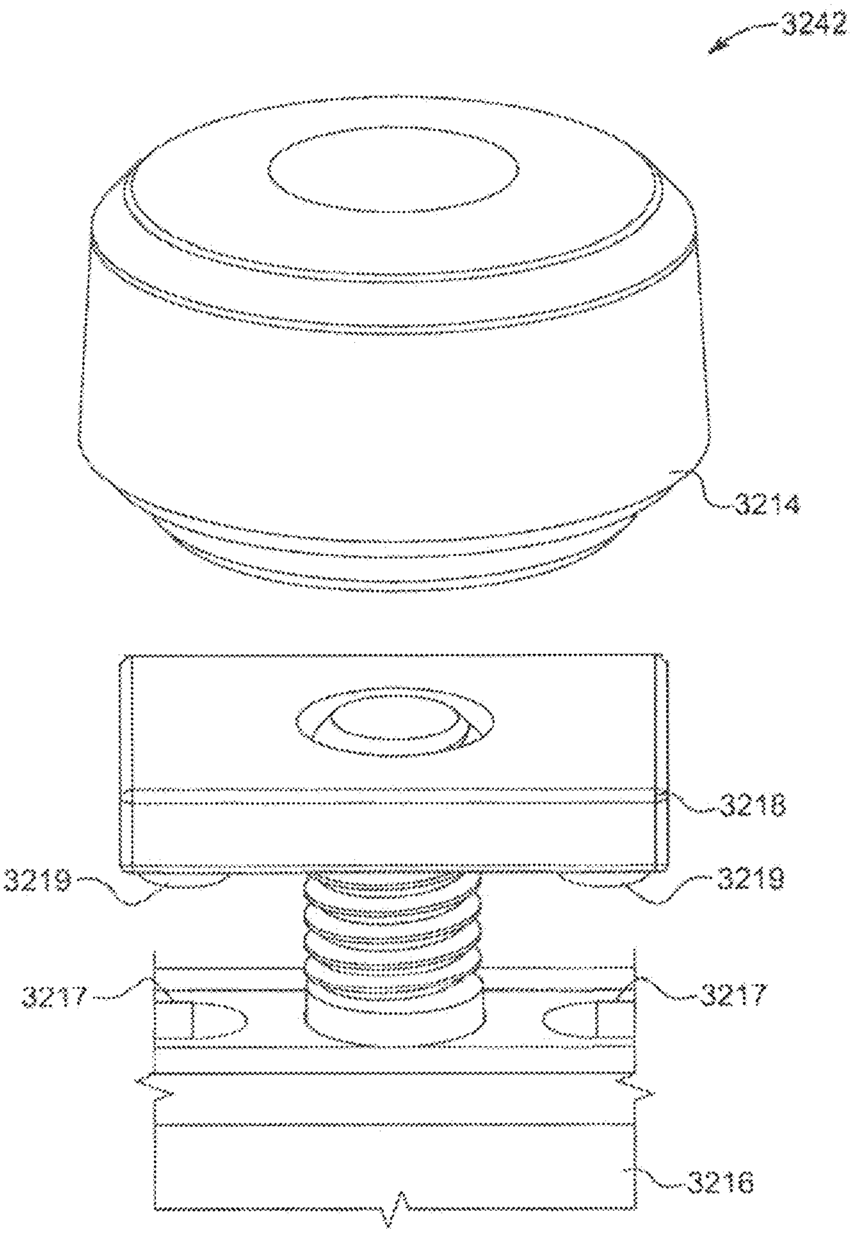
FIG. 68 is an exploded view of an alternate embodiment of an adjustable stop.

FIGS. 66-68 illustrate another embodiment of a depth setting assembly 3234, which includes a slidable feature 3236 and an adjustable stop 3242. The slidable features 3236 is formed on the nozzle 3076 and fits into a guide rail 3238 formed into the main housing 3016. The adjustable stop 3242 is slidable along the guide rail 3238 and can selectively be locked at any point on the guide rail 3238. The adjustable stop includes a thumb nut 3214, a T-nut 3216, and a spacer 3218, as shown in FIG. 68. The thumb nut 3214 is screwed to the T-nut 3216 and includes knurled outer surface in some embodiments. The T-nut fits in the guide rail 3238 and includes a set of alignment notches 3217. The spacer 3218 sits in-between the T-nut 3216 and the thumb nut 3214 and includes a set of alignment extrusions 3219. The alignment extrusions 3219 are shaped to fit the alignment notches 3217, when the thumb nut 3214 is fully tightened.

When locked on the guide rail 3238, the adjustable stop 3242 limits the insertion depth of the slidable feature 3236 to where the adjustable stop 3242 is secured on the guide rail 3238. To adjust the position of the adjustable stop 3242, the user rotates the thumb nut 3214 to increase the spacing between the spacer 3218 and the T-nut 3216. The increased spacing reduces the friction between the spacer 3218 and the guide rail 3238 and allows the user to freely move the adjustable stop 3242. Once the user finds a new desired position, the thumb nut 3214 can be tightened and the alignment extrusions 3219 of the spacer 3218 are lowered into the alignment notches 3217 of the T-nut 3218. When the spacer 3218 is fully lowered, the adjustable stop 3242 is frictionally locked against guide rail 3238.

Figure 69:
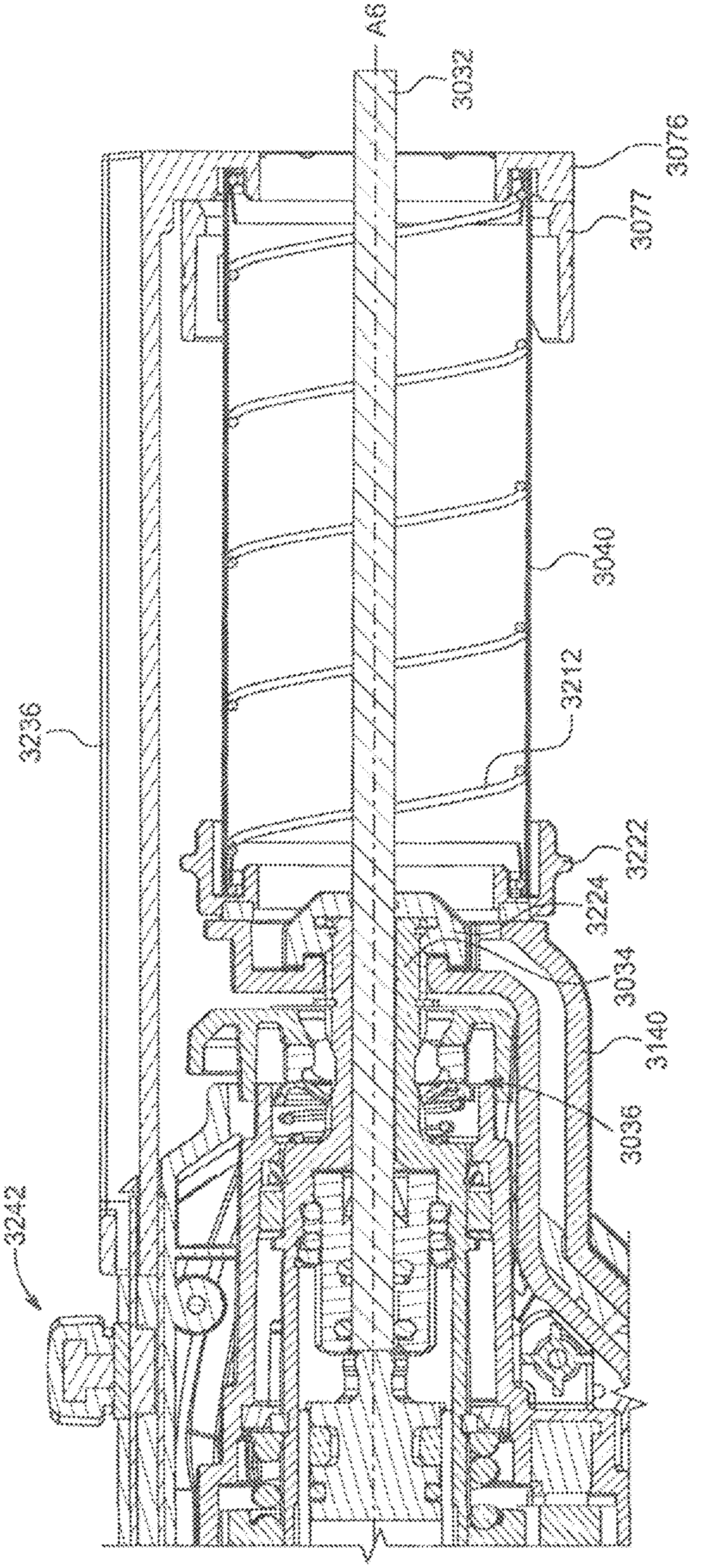
FIG. 69 is a section view of the dust tube assembly.

As shown in FIG. 69, the rotary hammer 3004 further includes a dust cap 3224 disposed within the dust tube. More specifically, the dust cap 3224 is coupled to a spindle 3034 of a chuck assembly 3036 through an interference fit. The spindle 3034 and the dust cap 3224 are configured to receive a tool bit 3032 and are all configured to rotate together while the dust tube 3040 is stationary. When the tool bit 3032 is inserted into the spindle 3034, the dust cap 3224 removes dust and debris from the tool bit 3032 from previous operations to prevent dust and debris from entering the main body 3016. The dust cap 3224 also seals gaps in between the spindle 3034 and the transfer tube 3140 and is configured to rotate with the spindle 3034 to maintain the seal during operation. As result, the dust generated during the operation of the rotary hammer 3004 will not travel past the transfer tube 3140 and into the main body 3016 or into the air outside the dust tube 2040 3040. In the illustrated embodiments, the dust cap 3224 is made of nitrile rubber (NBR). In other embodiments, the dust cap 3224 may be made of other elastomers, such as silicon, polyurethane, neoprene, or a combination of multiple elastomers. Various features of the disclosure are set forth in the following claims.

What is claimed is:

1. A power tool comprising:
- a housing;
- a guide rail fixed to the housing;
- a slide that is moveable along the guide rail; and
- a stop that is lockable at a plurality of positions along the guide rail to limit a range of movement of the slide along the guide rail to a first range of movement of the slide at a first position of the plurality of positions and a second range of movement of the slide at a second position of the plurality of positions, which is different from the first range of movement.

2. The power tool of claim 1, wherein the guide rail is positioned within a channel formed in the housing.

3. The power tool of claim 2, wherein the guide rail is formed as a single piece with the housing.

4. The power tool of claim 2, wherein the stop includes a first nut that is received in the channel and a second nut that is screwed to the first nut and can be tightened to lock the stop at a desired position and loosened to allow the stop to be moved along the guide rail.

5. The power tool of claim 4, wherein the first nut is a T-nut and the second nut is a thumb nut.

6. The power tool of claim 4, wherein the stop further includes a spacer between the first nut and the second nut.

7. The power tool of claim 6, wherein the spacer includes an alignment extrusion that is received in an alignment notch defined in the first nut.

8. The power tool of claim 6, wherein the guide rail is positioned between the spacer and the first nut so that loosening the second nut increases a space between the spacer and the first nut to reduce friction on the guide rail.

9. The power tool of claim 1, wherein an end of the slide that engages the guide rail includes a flange.

10. The power tool of claim 1, wherein the slide is coupled to move with a dust collection assembly that is attachable to the housing.

11. The power tool of claim 10, wherein the dust collection assembly includes:
- a coupler configured to couple to the housing;
- an end cap that is coupled to the slide; and
- a dust tube that is collapsible between the coupler and the end cap.

12. The power tool of claim 11, wherein the coupler includes a first locking member and the end cap includes a second locking member that engages the first locking member to selectively lock the dust tube in a collapsed configuration.

13. A rotary hammer comprising:
- a housing defining a channel in an external surface of the housing;
- a chuck supported on and rotatable relative to the housing;
- a slide that is moveable within the channel; and
- a stop that is lockable at a plurality of positions along the channel to limit movement of the slide along the channel.

14. The rotary hammer of claim 13 further comprising:
- a handle coupled to the housing opposite the chuck,
- wherein the channel extends from the chuck to the handle in parallel with a rotational axis of the chuck.

15. The rotary hammer of claim 14 further comprising:
- a dust container positioned along a bottom end of the housing,
- wherein the channel is positioned along a top end of the housing that is opposite the bottom end of the housing.

16. The rotary hammer of claim 15, wherein the dust container is coupled directly to the housing.

17. A method of using a depth stop assembly of a power tool, the method comprising:
- loosening a depth stop that is at a first position along a channel that is formed in an exterior surface of a housing of the power tool;
- moving the depth stop to a second position along the channel that is spaced away from the first position;
- tightening the depth stop to lock the depth stop at the second position; and
- moving a slide along the channel toward the depth stop, the depth stop preventing further movement of the slide when the slide contacts the depth stop.

18. The method of claim 17, wherein loosening the depth stop includes turning a thumb nut that is screwed to a T-nut to reduce friction between a spacer and a guide rail that is positioned within the channel.

19. The method of claim 17 further comprising:
- attaching a dust collection assembly over a chuck that is rotatable relative to the housing; and
- inserting the slide into an open end of the channel that faces the chuck.

20. The method of claim 19, wherein the second position is at a closed end of the channel that is opposite the open end of the channel, and further comprising:
- locking the dust collection assembly in a collapsed configuration; and
- moving the slide to a fully-inserted position within the channel.

* * * * *